US012005337B2

(12) United States Patent
Imes

(10) Patent No.: US 12,005,337 B2
(45) Date of Patent: Jun. 11, 2024

(54) AUTONOMOUS DIGITAL MEDIA PROCESSING SYSTEMS AND METHODS

(71) Applicant: Hole-In-One Media, Inc., Austin, TX (US)

(72) Inventor: Kevin R. Imes, Austin, TX (US)

(73) Assignee: Hole-In-One Media, Inc., Austin, TX (US)

( * ) Notice: Subject to any disclaimer, the term of this patent is extended or adjusted under 35 U.S.C. 154(b) by 0 days.

(21) Appl. No.: 18/233,428

(22) Filed: Aug. 14, 2023

(65) Prior Publication Data

US 2023/0381625 A1 Nov. 30, 2023

Related U.S. Application Data

(63) Continuation-in-part of application No. 17/884,905, filed on Aug. 10, 2022, now Pat. No. 11,729,490, which is a continuation-in-part of application No. 17/339,771, filed on Jun. 4, 2021, now Pat. No. 11,558,585.

(60) Provisional application No. 63/034,667, filed on Jun. 4, 2020.

(51) Int. Cl.
| | |
|---|---|
| *A63B 71/06* | (2006.01) |
| *G01S 13/58* | (2006.01) |
| *G01S 13/86* | (2006.01) |
| *G06K 7/14* | (2006.01) |
| *G06Q 20/38* | (2012.01) |
| *G06V 20/40* | (2022.01) |
| *G06V 40/20* | (2022.01) |
| *H04N 23/60* | (2023.01) |
| *H04N 23/61* | (2023.01) |
| *H04N 23/69* | (2023.01) |
| *H04N 23/695* | (2023.01) |

(52) U.S. Cl.
CPC ...... *A63B 71/0616* (2013.01); *A63B 71/0622* (2013.01); *G06K 7/1417* (2013.01); *G06Q 20/3825* (2013.01); *A63B 2220/806* (2013.01); *A63B 2220/89* (2013.01)

(58) Field of Classification Search
None
See application file for complete search history.

(56) References Cited

U.S. PATENT DOCUMENTS

| 5,884,913 A * | 3/1999 | Cohen | A63B 69/3694 |
| | | | 473/192 |
| 10,946,243 B1 * | 3/2021 | Smith | A63B 24/0062 |

(Continued)

FOREIGN PATENT DOCUMENTS

| WO | 2019229748 A1 | 12/2019 | |
| WO | WO-2019229748 A1 * | 12/2019 | A63B 1/00 |

*Primary Examiner* — Hung Q Dang
(74) *Attorney, Agent, or Firm* — Dickinson Wright PLLC

(57) ABSTRACT

A system for monitoring and recording and processing an activity includes one or more cameras for automatically recording video of the activity. A remote media system is located at the location of the activity. A network media processor and services is communicatively coupled with the remote media system. The remote media system includes one or more AI enabled cameras. The AI enabled camera is configured to record the activity. The network media processor is configured to receive an activation request of the AI enabled camera and validate the record request.

27 Claims, 33 Drawing Sheets

(56) References Cited

U.S. PATENT DOCUMENTS

| | | | |
|---|---|---|---|
| 2004/0260467 A1* | 12/2004 | Wehrlen | G05D 1/0291 |
| | | | 701/36 |
| 2009/0305803 A1* | 12/2009 | Reid | A63B 24/0021 |
| | | | 473/150 |
| 2014/0114451 A1* | 4/2014 | Kerr | H04L 67/306 |
| | | | 700/91 |
| 2014/0359060 A1* | 12/2014 | Lucas | A63F 13/80 |
| | | | 709/217 |
| 2017/0053542 A1* | 2/2017 | Wilson | G09B 5/02 |
| 2021/0089761 A1* | 3/2021 | Tyomkin | A63B 69/3605 |

* cited by examiner

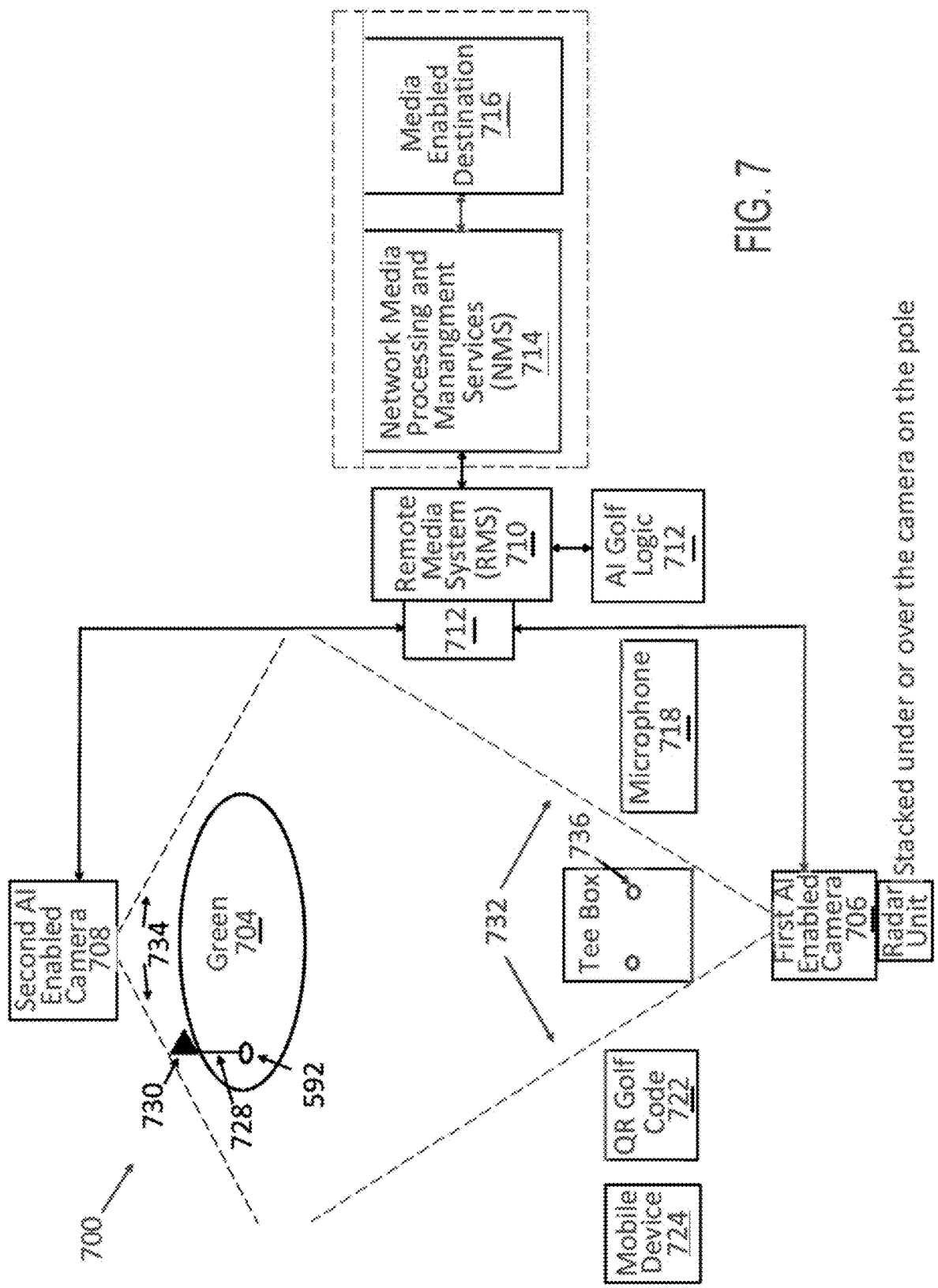

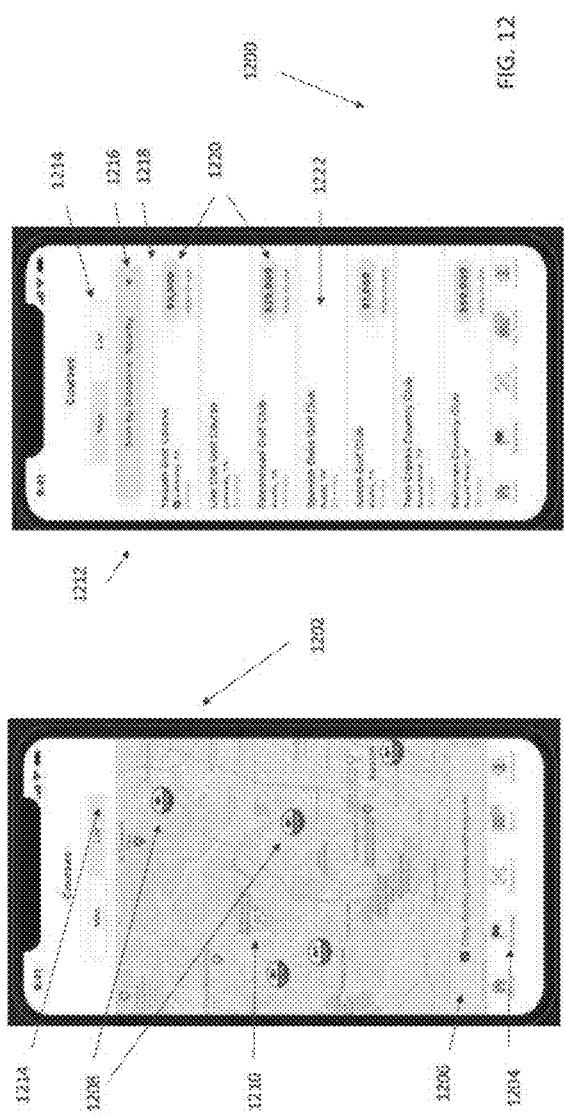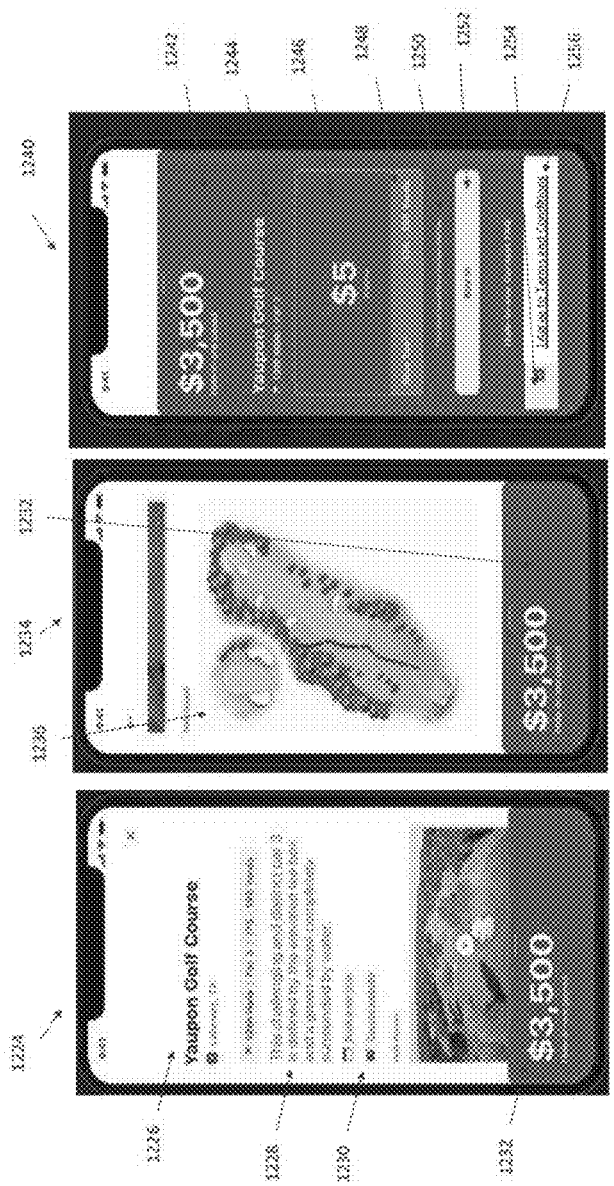
FIG. 12

AUTONOMOUS DIGITAL MEDIA PROCESSING SYSTEMS AND METHODS

CROSS-REFERENCE TO RELATED APPLICATIONS

This application is a continuation-in-part of U.S. patent application Ser. No. 17/884,905, entitled "Autonomous Digital Media Processing Systems and Methods" filed Aug. 10, 2022, which is a continuation-in-part of U.S. patent application Ser. No. 17/339,771, entitled "Autonomous Digital Media Processing Systems and Methods" filed Jun. 4, 2021, now U.S. Pat. No. 11,558,585 issued Jan. 17, 2023, which claims the benefit of U.S. Provisional Patent Application No. 63/034,667, entitled "Autonomous Activity Monitoring and Lottery System and Method" filed Jun. 4, 2020, the entire content of which are hereby incorporated by reference in their entirety.

FIELD OF THE INVENTION

The present disclosure is directed to digital media production. More particularly, the present disclosure is directed to autonomous digital media processing systems and methods.

BACKGROUND OF THE INVENTION

Various forms of video recording and production exist in today. For example, motion picture video production is a very labor intense effort, with a director taking multiple shots from multiple view angles, and post production taking months to produce a final video. Such video recording is very expensive and requires a large amount of human resources. In sports, video streaming technology is used to capture real-life events, and does so with cameramen and women moving cameras in the direction of where the play is occurring. This can allow for a real-time recording with camera cuts being made to different aspects of play. Although the length of time is very compressed, there still exists a need to manually record and follow the field of play to capture the desired footage. In another aspect, for live sports video, the video is streamed in near real-time using a dedicated, high speed network configured to broadcast televised sporting events. However, what each of these systems is lacking an automatic means to process and communicate video footage without the need of having a director or videographer capture relevant footage, and an automated way to produce and communicate video to viewers in an efficient manner.

SUMMARY

It is an aspect of the disclosure to provide a system for automatically recording an athletic event.

In one aspect, a system for autonomously providing digital media is provided, comprising: a remote media system (RMS) located at a golf course having a golf hole, wherein the RMS includes: a first AI enabled camera configured to record a video of a golfer detected at the golf hole; and a communication interface configured to receive an input to activate a video recording of the golfer at the golf hole, wherein the video recording includes a plurality of images of the golfer having objects within the images that are detectable using an AI logic; a network media processor and services (NMS) communicatively coupled to the RMS and located remote to the RMS, the NMS including: a network communication interface configured to initiate a record event request including the input to activate the video recording, the record event request communicated to the RMS; and a network media processor configured to receive an activation request of the AI enabled camera and to validate the record request; and a digital media enabled destination including a mobile application configured to send the session request to the NMS to activate the video recording, wherein the request includes a unique identifier of the digital media enabled destination, a location of the golf hole, and a user profile identifier.

In another aspect, a method for autonomously providing digital media is provided, comprising: detecting a presence of golfer at a golf hole on a golf course; receiving an activation request in response to the detected presence, the activation request including a user profile identifier of the golfer; validating the golfer using the user profile identifier and the location of the golf hole; sending an activation request and activating a recording of the golfer using an AI enabled camera at the golf hole upon the golfer being valid; and not activating the recording upon the golfer not being valid.

In another aspect, an AI enabled golf course is provided, comprising: a first golf hole having a green, a tee box, and a hole with a flagstick positioned within the hole; and an AI enabled camera positioned near the tee box and configured to automatically record a golfer present on the golf hole, wherein the recording is in response to detecting the golfer near the tee box.

In another aspect, an AI enabled golf course is provided, comprising: a first golf hole having a green, a tee box, and a hole with a flagstick positioned within the hole; and a remote media system (RMS) located at the golf course having a golf hole, wherein the RMS includes: a first AI enabled camera configured to record a video of a golfer detected at the golf hole, wherein the first AI enable camera is located in a fixed and permanent location at the golf hole; and a communication interface configured to receive an input to activate a video recording of the golfer at the golf hole, wherein the video recording includes a plurality of images of the golfer having objects within the images that are detectable using an AI logic; wherein the input to activate the video recording is received from a network media processor and services (NMS) communicatively coupled to the RMS and located remote to the RMS, the NMS including: a network communication interface configured to initiate a record event request including the input to activate the video recording, the record event request communicated to the RMS; and a network media processor configured to receive an activation request of the AI enabled camera and to validate the record request; and wherein the NMS is in communication with a digital media enabled destination including a mobile application configured to send the session request to the NMS to activate the video recording, wherein the request includes a unique identifier of the digital media enabled destination, a location of the golf hole, and a user profile identifier.

BRIEF DESCRIPTION OF THE DRAWINGS

Other aspects of the present disclosure will be readily appreciated, as the same becomes better understood by reference to the following detailed description when considered in connection with the accompanying drawings wherein:

FIG. 7 is a block diagram illustrating an AI enabled golf hole according to an aspect of the present disclosure;

FIG. 12 illustrates graphical user interfaces of a golf competition mobile application according to an aspect of the present disclosure;

FIG. 1313 illustrates a second portion of the block diagram of a method of providing an autonomous golf competition within a mobile application according to an aspect of the present disclosure;

DETAILED DESCRIPTION OF THE DISCLOSURE

Figure 1:
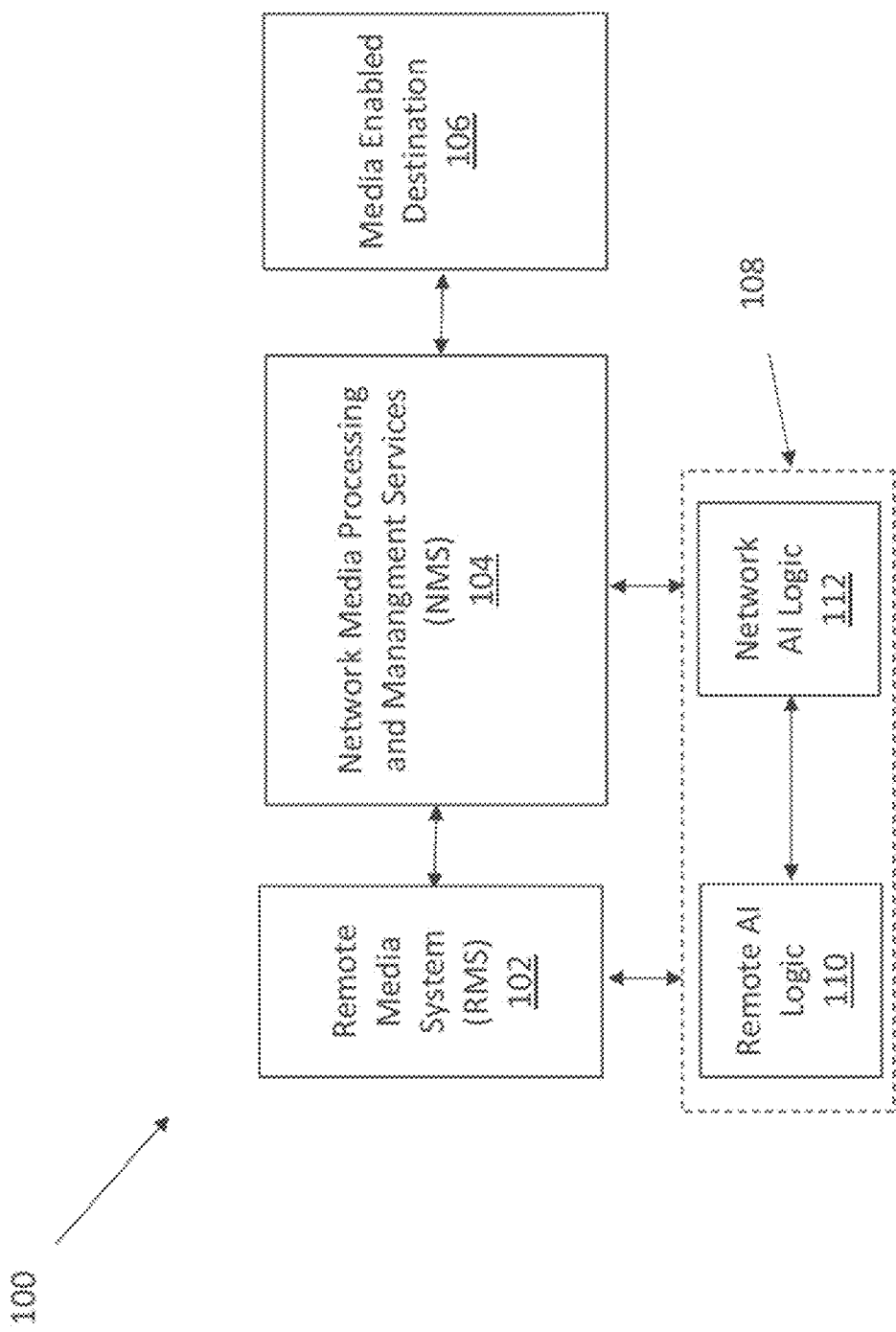
FIG. 1 is a diagram illustrating an autonomous media processing system in accordance with an aspect of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may include sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

In the description below, a flow-charted technique or algorithm may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

For purposes of this disclosure, media processing system and services can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, a media processing system can be a mobile device, a digital camera, a personal computer, a PDA, a consumer electronic device, a smart phone, a set-top box, a digital media subscriber module, one or more cloud or network services and storage, a cable modem, a fiber optic enabled communications device, a media gateway, a network server or storage device, a switch router, wireless router, or other network communication device, or any other suitable device and can vary in size, shape, performance, functionality, and price.

Processors disclosed herein can include memory, one or more processing resources or controllers such as a central processing unit (CPU), hardware, local memory or software control logic. Additional components can include one or more memory devices including internal and external storage devices, one or more wireless, wired communications interfaces, a display, an input device such as a keypad, touchscreen, touchpad, voice recognition, face or AI enabled image recognition, one or more cameras or camera inputs, audio inputs, power supplies, or various combinations. Processors can be embedded within a media processing system, can be provided separate from a media processing system, or in combination thereof. Processors can also be realized as digital logic only stored within a service such as an API, network services such as Amazon Cloud service, or combinations thereof. Other forms of processors are described herein as examples that can be deployed within the scope of the present disclosure.

Various software aspects that can be used within the media processing system may include Linux operating system having Python programmed applications, OpenCV image processing library, AWS Greengrass ML Model Development and Execution, video editing software using OpenCV image processing library and Python programming. Various cloud services and for storing, sending, and accessing video may be used, including AWS S3 and AWS Glacier for video storage, and AWS CloudFront for content delivery and distribution. Cloud services for processing and editing video may include Python and OpenCV running on AWS EC2 servers. Cloud services for converting videos from one format to another may include AWS Elemental MediaConvert.

Embodiments of autonomous media processing systems and processors disclosed herein also use Artificial Intelligence (AI) or AI Logic, Machine Learning, and Neural Networks generally described as AI Logic. AI or AI Logic includes a several categories of techniques that allow systems and processors to mimic human capabilities. AI techniques or logic include Machine Learning, Speech and Language Processing, Expert Systems, and Robotics. Machine Learning is the subset of AI that enables computers to improve at tasks through experience. Machine Learning includes traditional statistics-based approaches such as Regression Analysis and newer techniques like Deep Learning. Deep Learning uses large amounts of historical data to train multilevel Neural Networks to draw conclusions about new data. Throughout the specification, the description also uses AI logic that deploys Deep Learning, in the form of Neural Networks, to identify classes of objects, object locations in video images and segments. Deep Learning is also used to identify distinctive activities or sub-activities within video images and video segments including multiple video frames. In some forms, Statistics-based machine learning is used to characterize the motion or direction of objects within the video images and segments.

AI or AI logic disclosed herein can also include cloud services for generating a Neural Network to create AI logic and AI gesture recognition logic and can include AWS SageMaker for constructing, training, tuning, and evaluating machine learning models, including but not limited to Keras/ TensorFlow developmental framework, and Sagemaker NEO to prepare models for deployment to one or more AI logic locations.

Various embodiments of autonomous media processing systems and methods will now be more fully described. Each of these example aspects are provided so that this disclosure is thorough and fully conveys the scope of the inventive concepts, features and advantages to those skilled in the art. To this end, numerous specific details are set forth such as examples of specific components and methods associated with the system to provide a thorough understanding of each of the aspects associated with the present disclosure. However, as will be apparent to those skilled in the art, not all specific details described herein need to be employed, the example aspects may be embodied in many different forms, and thus should not be construed or interpreted to limit the scope of the disclosure.

Various embodiments disclose the capture, process, distribution and use of video, audio, and content used to create media or digital media. The embodiments disclosed herein include autonomous and AI enabled systems, devices, methods, applications, software, hardware, and locations for capturing, processing, distributing and consuming digital media. As disclosed herein, digital media can mean any media that are encoded in machine-readable formats. Digital media can be created, viewed, distributed, modified, listened, and preserved on a digital electronic device. Digital media refers to any information that is broadcast through a screen or speakers and can include text, audio, video, and graphics that are transmitted over the Internet or digital communication mediums. Examples of digital media include software, digital images, digital video, video games, web pages and websites, social media, digital data and databases, digital audio such as MP3, electronic documents and electronic books. As disclosed herein, media and digital media are used throughout the specification and unless expressly specified as being different they should be referred to as described above.

Referring now to FIG. 1, an autonomous media processing system is disclosed. Autonomous Media Processing System (AMPS), generally illustrated at 100, includes a Remote Media System (RMS) 102, a network media processing and management services (NMS) 104, and a media enabled destination 106. AMPS 100 further includes AI logic 108 which can include remote AI logic 110 accessible to RMS 102. AI logic 108 also include network AI logic 112 accessible to NMS 104. Portions or all of AI logic 108 can be stored at either or both of remote AI logic 110 or network AI logic 112.

According to an aspect, AI logic 108 can include a learned logic generated based on previous recordings of image data that can be used to generate an AI logic specific to the field of use being deployed. By way of example, AMPS 100 can be used with one or more golf courses and AI logic can be created to generate AI golf logic as AI logic 108. As such, AI golf logic can be inclusive of AI logic with elements of AI logic designed to be used for golf. For example, AI golf logic can include objects that can be used to identify specific players, clothing, equipment, other items associated with a golf course or its environment. For example, AI golf logic can include a human, a human or golfer holding a golf club, a shirt, a shirt color, a hat, a hat color, a golf glove, golf shoes, a golf cart, persons in a golf cart, a golf ball, a golf tee, a golf club, an iron, a driver, a utility club, a putter, a wedge, a 1-iron, a 2-iron, a 3-iron, a 4-iron, a 5-iron, a 6-iron, a 7-iron, an 8-iron, a 9-iron, a wedge, a pitching wedge, a gap wedge, a sand wedge, a golf ball logo, a male, a female, a child, a junior, a left handed golfer, a right golfer, a shirt logo, caddies, a marshal, equipment brands such as Callaway, Taylor-Made, Titleist, Mizuno, and others. Various other objects can be identified within AI logic 108 as needed or required.

According to another aspect, AI logic 108 can include objects used at a golf course, golf hole and surrounding environments. For example, AI logic 108 can include logic for identifying tee boxes, a color of a tee box, a golf cart, tree, a fairway, a cart path, a green, a hole, a pin, a sand bunker, a water hazard, a grass hazard, out-of-bounds, a rough, a first cut of a green, a second cut of a green, birds, insects, animals, distance from a tee to a pin, distance from a tee to a front of a green, distance from a tee to middle of a green, distance from a tee to a back of a green, red stakes, white stakes, blue stakes, yellow stakes, red lines, white lines, yellow lines, changes in elevation, clouds, rain, snow, fog, mist, mud, wind, topology of the green, cut of the hole, a maintenance crew member, a lawn mower, leaf blower, a rake, a sand rake, or various other objects that can be identified and added and used by AI logic 108 for use to process video or images captured at a golf course.

In addition to object identification, AI logic 108 can also be configured to identify gestures created within video. Gesture logic, or gesture recognition, can be identified using AI logic 108 by processing a series of image frames and comparing the image frames to AI logic 108 having gesture logic. Although gesture logic is described as AI logic 108, one can appreciate that gesture logic can be provided alone or in combination with other objects within AI logic 108. Examples of gesture logic are not limited to golf gestures and can include various image frames defined as gestures. For example, gesture logic for golf can include pre-shot gesture routines, shot or swing gestures, and post-shot gestures.

According to an aspect, swing gestures can include identifying a golfer on a tee box, a practice swing, a golfer talking to other golfers, a golfer looking at a distance to a pin, a golfer setting a ball on a ball tee, a golfer stepping behind a ball, a golfer aligning for a swing, a golfer addressing a ball, a golf cart pulling up, a golfer walking up, a golfer carrying a bag, a golfer pushing bag on a cart, a golfer pulling bag on a cart, a golfer walking with caddie, a golfer reviewing a score card, or various other pre-shot gestures that can be learned and added to AI logic 108.

Additional gesture logic that can be included within AI logic 108 can include gestures related to a golfer's shot, including but not limited to, a backswing, a downswing, contact with a ball, missing a ball, duffing a ball, topping a ball, fatting a ball, thinning a ball, shanking a ball, hooking a ball, slicing a ball, popping a ball up, pulling a ball, pushing a ball, hitting a ball straight, hitting a ball low, hitting a ball high, a ball landing on a green, a ball landing in sand, a ball landing in water, a ball landing in rough, a ball landing out-of-bounds, a ball hit into trees, a ball hitting a tree, a ball hitting a pin, a ball hitting a cart path, a ball hitting a golfer/person, putting, putting too hard, putting too soft, putting left, putting right, hitting a ball past a green, hitting a ball short of a green, hitting a ball left of a green, hitting a ball right of a green, or various other shot gestures that can be learned and added to AI logic 108.

According to a further aspect, AI logic 108 can also include golf logic having post-shot gestures that can be identified. Post-shot gestures, can include, but are not limited to slamming a club, throwing a club, golfer giving a high five, golfer giving a fist bump, golfer putting his arms in the air, golfer pumping his fist, golfer running, golfer jumping, golfer slouching, golfer yelling, golfer picking up a tee, golfer walking straight ahead, golfer clapping, golfer laughing, or various other post-shot gestures that can be learned and added to AI logic 108.

According to a further aspect, AI logic 108 having object and gesture recognition can be used to identify kinematic aspects of a golfer's swing. Using AI logic 108, object recognition logic and gesture recognition logic can be used to identify a type of golf swing a golfer may have made while hitting a golf ball. For example, AI logic 108 objects can be used to identify a golf club, arms, legs, hips, a golf club, a tee box, or other objects associated with a golfer. AI logic 108 gesture logic can be used with object logic to identify the path of the club, movement of arms, legs, hips, wrist, golf club, golf ball, launch angle of ball, velocity of a ball, smash factor of a ball, side spin of a ball, apex of a struck ball, and various other gesture activities of a golfer, club, and ball. A resulting analysis can then be used as a teaching opportunity for assisting the golfer or a teaching professional to analyze a golfer's swing. Though not illustrated, each object, gesture, or combinations identified using AI logic 108 can be provided as meta data or labels with a video captured by AMPS 100 such that identifying objects, gestures, kinematic, or combinations thereof can be provided for subsequent media and video processing.

Although described as using AI logic 108 having golf logic, one can appreciate that various other activities, logic, and gestures can be used by AMPS 100 including, but not limited to, golf activity, football activity, soccer activity, baseball activity, basketball activity, skiing activity, snowboarding activity, biking activity, fishing activity, boating activity, general sports activities, or various other types of non-sports activities that are predetermined to occur at a geographic location. AI Logic 108 can include objects important or relevant to the activity. For example, AI Logic 108 can be used to detect football activities and can be used on a football field to detect objects of a football player's number and name and a video can be processed using to aid in identifying video specific to a player name or players number. Various other objects for football or other activities can be provided by AI logic 108 depending on the activity or environment AMPS 100 is being used.

As described above, AMPS 100 may be configured to use AI capable of machine learning and object gesture identification based on an image data set. An image data set is a set of previously identified objects, activities, gestures, or the like, that the AI can automatically identify from images or video. An image data set may include a list of known objects and for movements and may be used to identify a threshold quantity of known objects based on captured images by AMPS 100, such that further instances of one or more of the known objects in the data set may be automatically identified by AMPS 100 without requiring manual/human identification after the image data set is defined. It will be appreciated that AMPS 100 and AI logic described throughout the specification is configured to automatically detect aspects of video autonomously. AMPS 100 can also include AI logic that can support other forms of inputs such as audio inputs, sensor inputs, data inputs, voice inputs, radar inputs or various other forms of supporting AI logic that can be used to detect inputs to AMPS 100. RMS 102 can include various forms of inputs that can be used to initialize, record, process, and distribute video that has been captured using AI logic 108. For example, RMS 102 can be used to identify a specific sporting event, such as golf, and initialize recording of a video of a specific golfer. RMS 102 can access AI logic 108, such as remote AI logic 110, specifically created for golf. Upon identifying a golfer using AI logic 108, video can be recorded for that specific golfer and processed using RMS 102 and NMS 104. When a golfer is finished playing the hole, AMPS 100 can initiate final production of the golfer's video using NMS 104 and communicate digital media to a media enabled destination 106 such as a golfer's mobile device or smartphone. According to an aspect, the final produced video can include the golfer, their name, the name of the course they are playing, the hole number, logo of the course, and golfer statistics for the shot including a graphical ball trace that overlays the path of where the ball travelled during the video. In this manner, no human intervention may be needed to record, produce, and distribute video footage thereby increasing the efficiency for video production while reducing the time and cost associated with creating a final production video having enhanced graphics and formatting.

According to a further aspect, media enabled destination 106 can include various types of devices capable of displaying digital media received form NMS 104 or digital media that is being streamed from NMS 104. For example, a media enabled destination 106 can include a mobile device (not expressly shown) such as a smartphone or other mobile device capable of receiving a link to video stored by NMS 104 and selecting the link for playing a video. Media enabled destination 106 can also download and store digital media at a destination. For example, media enabled destination 106 can include a web-based service, such as a social media service provider, such as Instagram, Facebook, Snapchat, Twitter, and others capable of playing digital media produced by NMS 104. In one form, a link to a video can be created by NMS 104 and communicated to a social media service. In other forms, a video request from the service, such as Youtube, Disney+, ESPN+, Fox. Sports, and other streaming services, may allow for storing video. In some forms, video may need to be formatted prior to distributing to media enabled destination 106. According to a further aspect, NMS 104 may be able to provide a digital media channel that can be accessed by media enabled destination 106. For example, NMS 104 can create a specific sports channel, such as a golf channel, skiing channel, fishing channel, or other sports channel having specific types of digital media created using AMPS 100. As such, NMS 104 can provide various forms of digital media and output digital media to one or more media enabled destination 106 depending on the final use of digital media created by AMPS 100.

Figure 2:
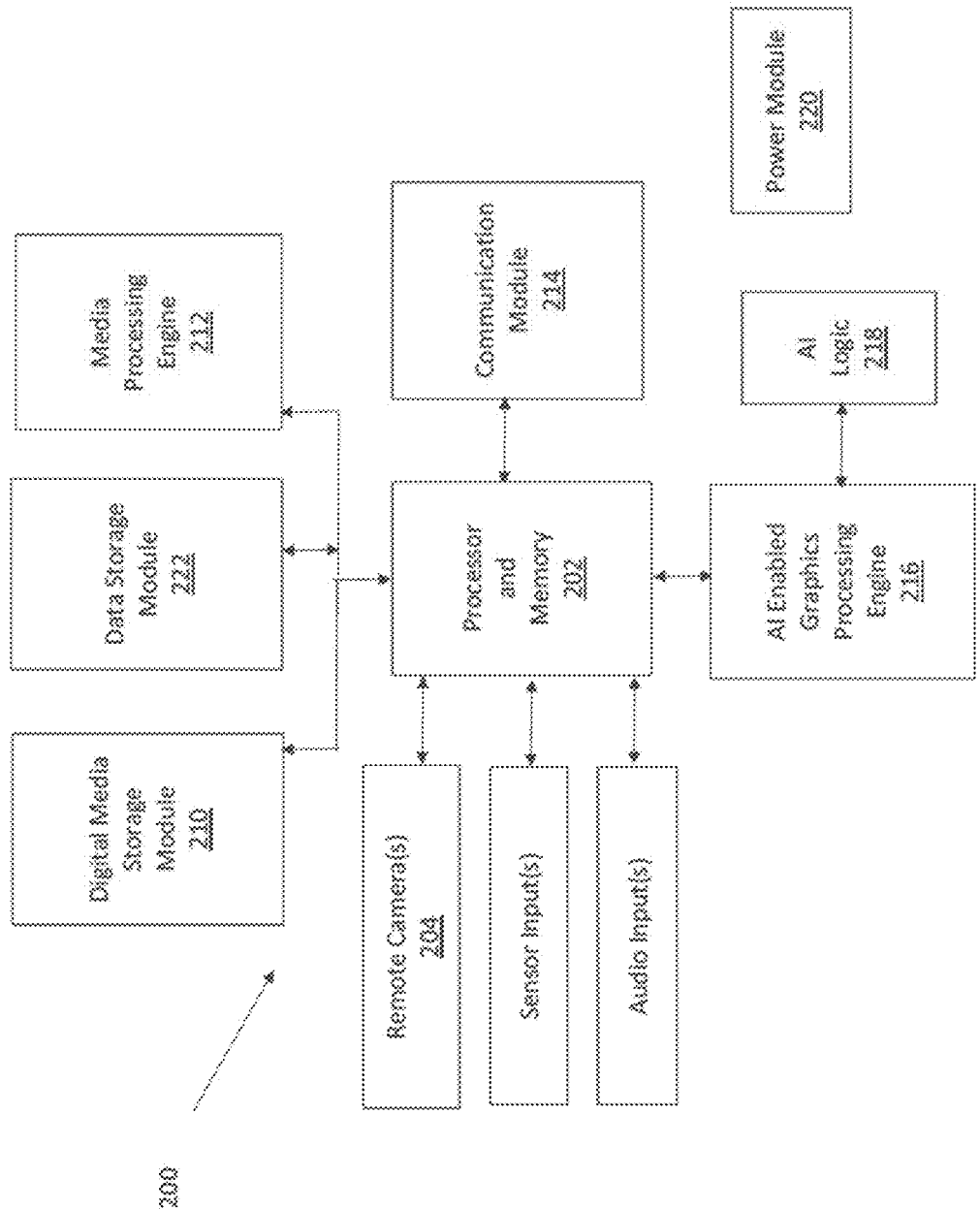
FIG. 2 is a block diagram illustrating a remote media capture system in accordance with an aspect of the present disclosure.

Referring now to FIG. 2, a block diagram illustrating of a remote media capture system (RMS) is disclosed. Remote media capture system (RMS), generally illustrated at 200, includes processor 202 and memory 203 which can include an NVIDIA Jetson AGX Xavier to process and control local video cameras. Specifications for the Jetson AGX Xavier can be found at https-lldeveloper.nvidia.com/embedded/jetson-agx-xavier-developer-kit as of the tiling date of the instant application. More than one computer may be used. In the case of a golf hole, one computer may be disposed at each end of the hole. It will be appreciated that alternative computer systems may also be used as specific processing needs and performance may change over time. Processor 202 can include a Dual-Core NVIDIA Denver 2 64-Bit CPU and Quad-Core ARM® Cortex®-A57 MPCore, memory 203 can include 8 GB 128-bit LPDDR4 Memory and can also include 32 GB eMMC of storage. Other processors and memory may also be used as needs and performance may change over time. System 200 can also include AI enabled graphics processor 216 which can include 256-core NVIDIA Pascal™ GPU architecture with 256 NVIDIA CUDA cores. Other graphics processors may be used as performance and needs change over time. Operating software of RMS 200 can include a Linux operating system, Python as an application programming language, and OpenCV image processing Library. RMS 200 further includes AI logic 218 which can include a Machine Learning Deployment and Execution software such as Amazon Web Services Greengrass ML software or other endpoint AI processing software or modules.

According to a further aspect, RMS 200 can include one or more remote camera(s) 204 in communication with processor 202. Remote camera(s) 204, as described below, may be connected to processor and memory using a network interface (not expressly show). RMS 200 may further include a power module 220 configured to provide power to processor 202 and other components of RMS 200. Power module 220 may be in the form of a battery or combined solar powered battery, or may be a hard-wired connection to an AC or DC power source. Power module 220 can be provided to convert the power source to one or more power levels as needed or desired by RMS 200.

According to another aspect, remote camera(s) 204 can be connected using a Power Over Ethernet (PoE) interface to provide power and communication for remote camera(s) 204. Other forms of connections can also be used including, but not limited to, fiber optic, coaxial cable, twisted pair, single strand, custom cables, or various combinations thereof. RMS 200 may further include communication module 214 connected to processor 202 and a modem such as cellular modem, wireline modems or other forms of modems as needed. In one aspect, a cellular modem such as a Peplink MAX BRI Mini may be attached to each computer (at each end of the golf hole). Specifications for the Peplink MAX BRI Mini may be found at: https://download.peplink.com/resources/pepwave_max_brl_mini_lte_datasheet.pdf as of the filing date of this disclosure. For example, communication module 214 can be configured with a wireline or wireless network capable of connecting the Internet or Cloud based services. Communication module 214 can be used to determine the location or address to communicate with via modem, and may further receive data or instructions for processor 202. Communication module 214 with a cellular modem or hardwired modem, can be configured to communicate or transmit data via a network such as Internet or Cloud and as a cellular modem can be capable of communicating using a 3G, 4G, 5G, or other communication standards. In other forms, communication module 214 can be a wired modem capable of communicating using a broadband connection such as Ethernet or via a Fiber Optic connection, or various combinations thereof.

According to an aspect, RMS 200 may further include one or more remote camera(s) 204 as AI enabled remote cameras that can process image data using AI logic to detect a specific object or objects within video being recorded. RMS 200 can also include sensor input(s) 206 and audio input(s) 208 that can be controlled or accessed by processor 202 to add additional media to video being recorded using remote camera(s) 204.

RMS 200 can also include a digital media storage module 210 to store raw or compressed video, and data storage module 222 to store data files, operating files, control logs meta data, sensor data, radar data, session data, and other forms of data or information files. RMS 200 further includes a media processing engine 212 configured to process media received by RMS 200 as described below. RMS 200 further includes an AI enabled graphics processing engine 216 accessible to processor 202 and AI logic 218 that can be used to processes video, audio and sensor inputs to RMS 200.

During use, RMS 200 can be used to capture and process media content that can be processed and sent to a destination using communication module 214. Portions or all of the processing can be performed locally using RMS 200. However in other forms, processing can be split between various portions of RMS 200 such as remote camera(s) 204, media processing engine 212, processor 202, and AI enabled graphics processing engine 216 and AI logic 218. Processing is also not limited to video processing but can also include various combinations of processing including, but not limited to, sensor data processing, audio processing, data or meta data processing, graphics processing, AI processing, compression processing, or various other forms of processing that can be used to output digital media using communication module 214.

According to an aspect, RMS 200 can be used to process and compress media such that communication module 214 can communicate media to a destination in an efficient manner. For example, some cellular networks have limited capacity for uploading media that contains large video formats or files. As such, RMS 200 and communication module 214 can determine a communication upload speed and bandwidth capability, and compress media files to ensure a bandwidth demand is maintained. Various video formats and media file sizes, such as 8K and 4K video, may be too large to communicate via a cellular network. As such, larger video formats and resolutions can be transformed into smaller formats as needed. For example, a 4K video can be transformed into an H.264 format and uploaded as an HD, LAID or other digital media file format.

According to further aspect, RMS 200 can be used in a golf environment to detect a golfer and record and communicate a golfer's activity in the form of processed video or digital media. During use of RMS 200 in a golf environment, processor 202 may be configured to automatically capture video data of a golfer using remote camera(s) 204, and process video using AI Enabled processing engine 216 automatically to create an autonomously processed video. For example, AI enabled processing engine 216 can be used to detect a golfer using image data from the video and a neural network within AI logic 218 created to detect a person within a video or image frame. Upon identifying the golfer, RMS 200 can capture and process video for that specific golfer. In other forms, AI logic 218 can also include golf logic and gesture recognition logic (not expressly illustrated) capabilities to process video data using RMS 200. For example, a AI logic 218 can detect a golfer holding a golf club and can further detect when a golf club has struck a ball. In this manner, the time interval of when the golfer struck the golf ball can be identified and the recorded video can be segmented and processed accordingly.

According to further aspect, RMS 200 can use AI logic 218 to process video, audio, or sensor inputs. For example, AI logic 218 can include object identification capabilities that can be used to detect various types of objects. Upon identifying an object within the video, AI enabled graphics processing engine 216 can be used to identify portions of video having the identified object, and create a video segment only having that specific object. By way of example, RMS 200 can be deployed on a golf course and a golfer having a specific clothing, such as red, can be identified using AI logic 218. Video having a golfer wearing red can be segmented until the golfer is no longer within the video. According to a further aspect, AI logic 218 can include golf logic capable of identifying a golf object, such as a golf club, and a golfer wearing a specific color, such as blue, within an image of the video. RMS 200 can then process the video having those two objects within the video to create a segment for those AI detected attributes.

According to a further aspect, RMS 200 can also processor other sensory information to be used with the video to create media content that can be combined and communicated using communication module 214. For example, audio input(s) 208 can output a time stamped digital audio file that is in sync with a time stamped video file received from remote camera(s) 204. For example, a microphone may be connected to audio inputs(s) 208 and can input audio that can be used to detect the sound of the ball being hit, or to detect speech or other audio from the players on a golf hole. RMS 200 can then combine the video and audio files to output media content having enhanced media appeal. In a further aspect, RMS 200 can combine sensor input data to recorded video to create an enhanced digital media experience. In other forms, sensor input(s) may be stored in a sensor data file that can be communicated with video for additional processing by a network service as described below. For example, sensor data such as weather sensor data can be obtained and use in combination with the recorded video. Sensor inputs) 206 can include sensors including a wind speed detection mechanism, temperature gauge, humidity, or other weather-related course conditions.

According to another aspect, sensor input(s) 206 and a radar sensor input or radar unit input capable of sensing various aspects of an object traveling within a field of view of one or more remote camera(s) 204. For example, a sensor input 206 as a radar unit input for golf can detect a golf swing, ball velocity, ball height, ball curve or various other forms of radar data inputs that can be used to provide data that can be added to output digital media using RMS 200, or communicated to another service that can further process the digital media and combine the detected sensed radar data. The combination of camera and radar can be used for sensing various aspects of a golf swing as well. For example, remote camera 204 configured as AI enabled camera can be used to identify small differences in the angles between two golf balls, as measured at the camera using optical zoom and pixel density within the recorded video. When combined with radar having a wavelength of, for example, 20 GHz radar or about 0.6 inches using phase differences. Camera inputs and radar input can share information about where objects are located and what kind of objects can be identified using AI logic 218. For example, RMS 200 and an AI enabled camera can be used to identify an object using AI logic 218 and a radar input, having the same time stamp or recorded interval. RMS 200 can be used to provide the movement characteristics of the moving object within the video frames using both AI enabled graphics processing Engine 216 and radar sensor unit data input to sensor inputs) 206. In this manner, an intelligent radar detection system that utilizes radar, image processing, and AI logic can be deployed for efficient digital media processing and video enhancement.

According to another aspect, RMS 200 may use only one or more of remote camera(s) 204 to detect AI objects within images captured using remote camera(s) 204. For example, portions or all of AI logic 218 can be stored within remote cameras) 204 and video having one or more objects that are relevant may be identified by remote camera(s) 204 and a subsequent video recorded and communicated to RMS 200. With cameras including AI logic 218, a reduced amount of video may need to be recorded and communicated to processor 202 for subsequent video processing. Various forms of AI logic 218 can be used within remote cameras) 204 as discussed herein.

According to another aspect, RMS 200 may use no or only a portion of AI processing locally within RIMS 200, and may use network or cloud-based AI processing remote from RMS 200. For example, RMS 200 may initiate recording video locally using remote camera(s) 204. Recorded video can then be communicated by RMS 20) to a remote processing system (such as NMS 104, NMS 400, or other cloud services) to perform AI processing of captured video. In this manner. RMS 200 need only communicate media having a specific format size using communication module 204 for subsequent media processing, and the media file may then be uploaded to the Internet or Cloud using communication module 204.

According to a further aspect. RMS 200 can process video locally near a geographic location of installed remote camera(s) 204 to provide automatic monitoring and processing of a desired activity. RMS 200 can use automatic detection and video recording/processing local to the installed sight of remote camera(s) 204 and processed video may be transmitted using communication module 214 to a destination. For example, a processed video may be received and forwarded to an end user via an intermediate server or other communication device (not expressly illustrated). RMS 200 can process video to add various graphical elements to captured video. For example, media processing engine 212 can be used to add information about a golf hole, such as the name of the golf course, hole #, logo information, sensor data information, weather information or various other forms of graphical data. According to one aspect, a golf ball can be detected within a video frame and media processing engine 212 can add additional colored graphics to show the trace or direction of a golf ball that has been hit, user information, course information and the like. Other elements can also be added using RMS 200 as described within.

According to a further aspect, portions or all of RMS 200 can be incorporated into a mobile device having one or more integrated cameras. For example, a mobile phone such as a Samsung the Samsung Galaxy S21 Ultra having four rear cameras, including a 108 MP f/1.8 main camera, a 12 MP f/2.2 ultra-wide camera and two IOMP telephoto cameras— one with an f/2.4 aperture and 3× optical zoom and one with an f/4.9 aperture and a huge 10× optical zoom can be used as RMS 200

In other forms, portions or all of RMS 200 can be incorporated into mobile phone cameras such as and iPhone 12 Pro created by Apple including a three camera system having an ultra-wide f/2.4 camera, a wide f/1.6 camera and a telephoto f/2 camera. A front-facing camera with a 12 MP camera sensor is also provided. The mobile device includes a LiDAR scanner for low light conditions and a raw video processor for processing raw image and video files. Various other mobile devices having cameras can also be realized as RMS 200.

Figure 3:
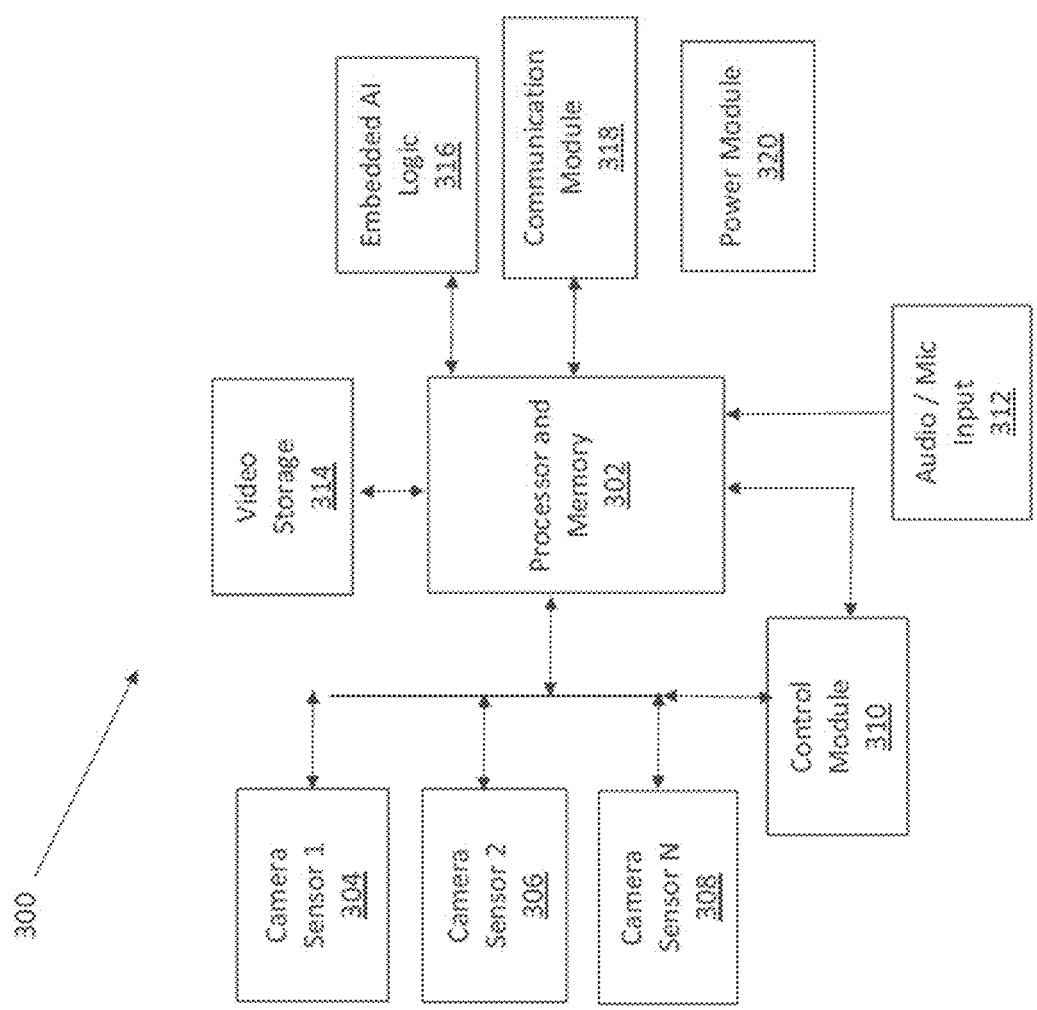
FIG. 3 is a block diagram illustrating an AI enabled camera for use with a remote media capture system in accordance with an aspect of the present disclosure.

Referring now to FIG. 3, an AI enabled camera for use with a remote media capture system is disclosed. AI enabled camera, illustrated generally at 300, can be realized as various types of cameras as needed or desired and can be used with RMS 102, 200, 710, 1136 RMSs in FIG. 6, or various other remote media systems.

According to one aspect, AI enabled camera 300 can be a UI-ID 4K camera may be manufactured by Bosch Model MIC IP ultra 7100i camera having specifications and operating manual herein incorporated by reference. In another form, AI enabled camera 300 can include an Hanwha, Model PNP-9200RH having specifications and operating manual herein incorporated by reference.

According to one aspect, AI enabled camera 300 can be a UI-ID 4K camera may be manufactured by Bosch Model MIC IP ultra 7100i camera having specifications and operating manual herein incorporated by reference. In another form, MI enabled camera 300 can include an Hanwha, Model PNP-9200RH having specifications and operating manual herein incorporated by reference.

According to an aspect, AI Enabled camera 300 can include a processor and memory 302, a first camera sensor 304 such as a PTZ sensor, a second camera sensor 306 such as an optical zoom only sensor, and other sensor technology illustrated generally as 'n' camera sensor 308 having a variety of different image capturing capabilities. AI Enabled camera 300 also includes a control module 310 to control each of the camera sensors and video storage 314 having memory for storing recorded video and images. AI Enabled camera 300 also includes embedded AI Logic 316 that can be customized depending on use or activity to sense using AI. For example, Embedded AI logic 316 can include AI golf logic capable of identifying elements of a golf hole, player, tee box, green, a golf ball or various other objects. In other settings, other objects may be provided within embedded AI logic 316 depending on the use for capturing and processing digital media including, but not limited to, sporting events and outdoor activities. Although illustrated as embedded AI logic 316, AI enabled camera 300 may be able to access AI logic stored remote, such as AI logic 108 at an RMS or NMS and the like to enable AI detection of recorded images or objects.

AI Enabled camera 300 also includes a communication module 318 that can be configured to use multiple types of communication including wireless and wireline communication such as WiFi, Cellular, Ethernet, PoE, HDMI, RS232, 802.11, Bluetooth or custom communication interfaces. AI Enabled camera 300 also includes a power module 320 configured to provide a one or more power levels for powering AI Enabled camera 300, sensors and audio microphones as needed or required. According to another embodiment, sensors 308 can include optical sensors and in some form can include various types or combinations of sensors, including, but not limited to, optical, motion, infrared, radar or Doppler sensors, Bluetooth sensors, WiFi Sensors, RFID sensors, or various combinations thereof and need not be limited to only optical sensing.

According to an aspect, AI Enabled camera 300 may be configured to include zoom functionality, including one or both of optical zoom and digital room and may be further configured to have tilt and pan functionality such that AI Enabled camera 300 may be pointed towards a location. For example, AI Enabled camera 300 may each be pointed and zoomed at a tee box having a golfer attempting to tee off, and can be adjusted to follow and zoom in on a golfer for subsequent shots during play. Using AI logic, a camera can tag the specific user and follow the user throughout their play. In an alternative aspect, AI Enabled camera 300 may be a fixed view camera. In this aspect, AI Enabled camera 300 may be configured to capture everything within its view and may also deploy digital and optical zooming capabilities without being rotated along an axis.

Figure 4A:
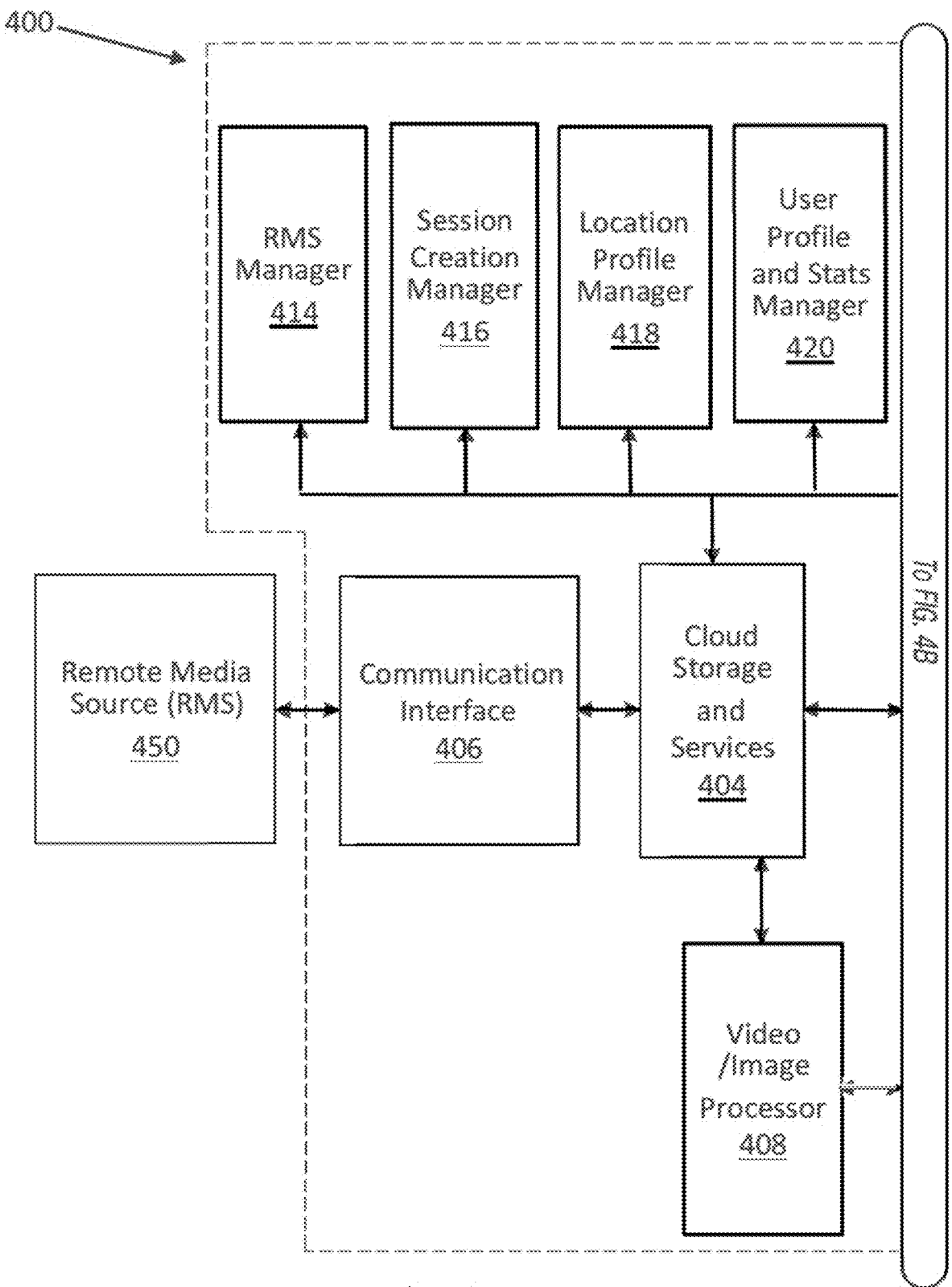
FIG. 4A is a first portion of a block diagram illustrating network media processing and management services in accordance with an aspect of the present disclosure.
Figure 4B:
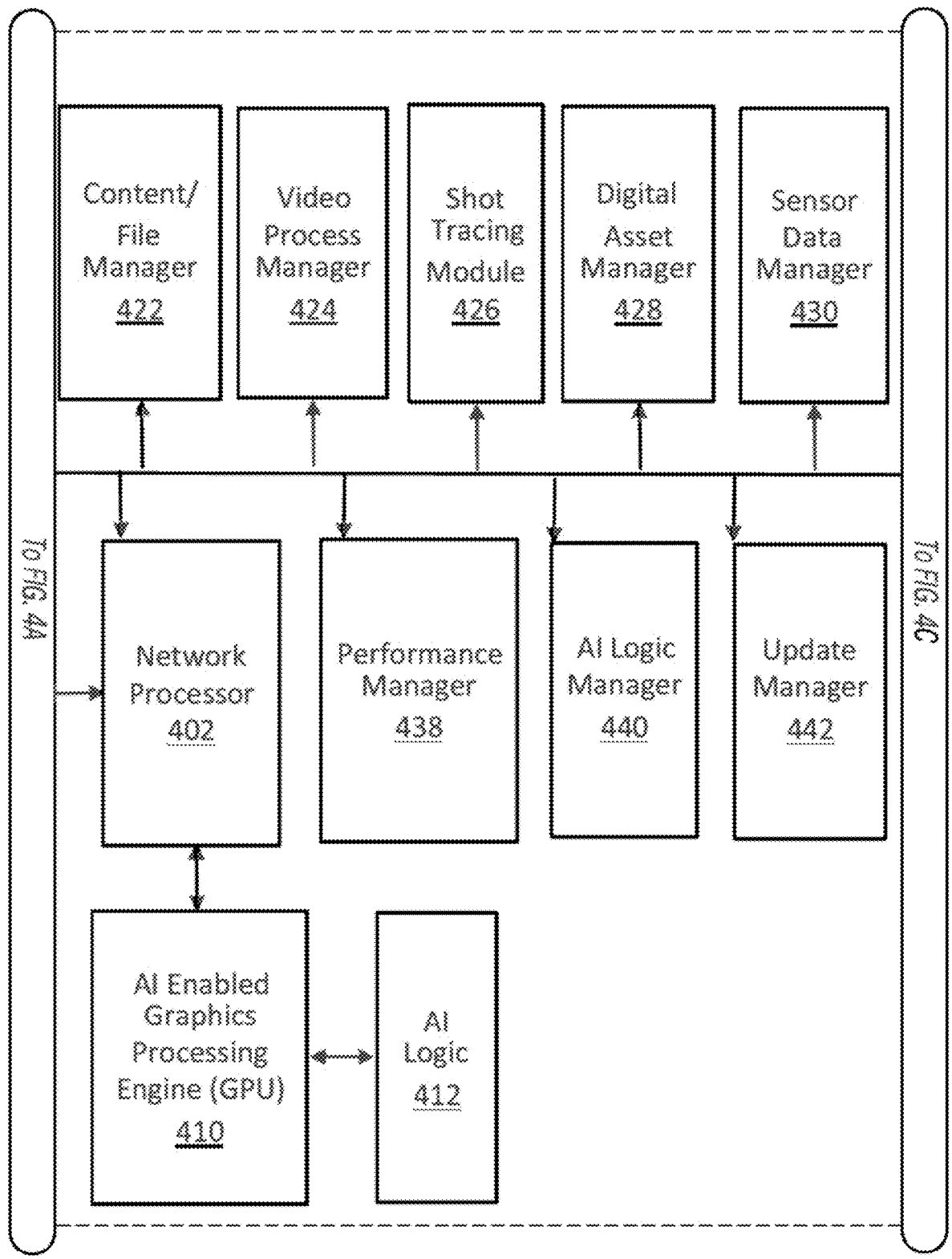
FIG. 4B is a second portion of the block diagram illustrating network media processing and management services in accordance with an aspect of the present disclosure.
Figure 4C:
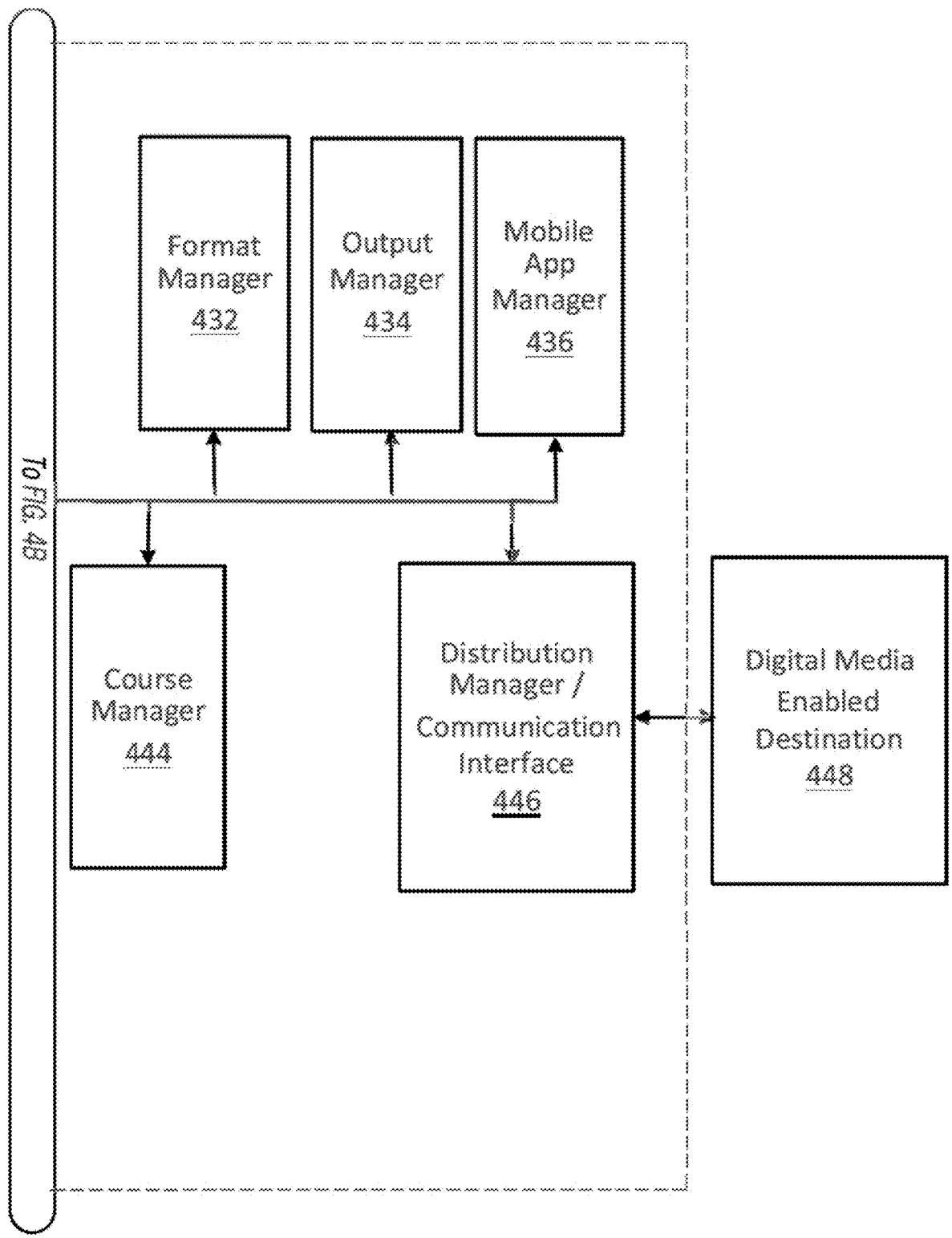
FIG. 4C is a third portion of the block diagram illustrating network media processing and management services in accordance with an aspect of the present disclosure.

Referring now to FIGS. 4A-4C, a block diagram illustrating network media processing and management services is disclosed. Network media processing and management services (NMS), generally illustrated at 400, can include a network processor 402 connected to cloud storage and services 404, which is connected to a communication interface 406 configured to communicate with a remote media system (RMS) 450 or any other remote video capture system or device configured to communicate video for processing and creating digital media. NMS 400 also includes an AI enabled graphic processing engine 410, an Image processor 408 and AI logic 412. Network Processor 402 can access various module or managers for processing, managing and communicating digital media and resources for supporting. For example, NMS 400 can include a remote media source manager 414, a session creation manager 416, a location profile manager 418, and a user profile and stats manager 420. NMS 400 can also include a content/file manager 422, a video process manager 424, a shot tracing module 426, a digital asset manager 428, and a sensor data manager 430. NMS 400 can also enable use of a format manager 432, an output manager 434, and a mobile app manager 436. NMS 400 can also include a performance manager 438, an AI logic manager 440, and a course manager 444. NMS 400 can output video received from RMS 450 as digital media to a digital media enabled destination 448 using a distribution manager/communication interface 446.

According to an aspect, NMS 400 can also include an AI enabled graphics processing engine or GPU 410 and video/image processor 408 configured to process video and images stored in cloud storage and services 404. For example, GPU 410 and/or image processor 408 can include various types of AI enabled and image processors and in one form, includes one or more NVIDIA V100 Tensor Core GPU capable of AI processing to generate and develop and train a Machine Learning (ML) for AI Logic 412 that can be created, modified, distributed and used by NMS 400 or other AI enabled devices or AI logic described herein. According to one aspect, GPM 410 and/or network processor 402 can also utilize additional software and services to create AI logic 412. For example, GPU 410 can use AWS SageMaker for constructing, training, tuning, and evaluating ML models. Sagemaker supports a number of ML development frameworks and, according to one aspect, may use Keras/TensorFlow. Additionally, NMS 400 can employ Sagemaker NEE to prepare AI Logic 412 models for deployment to remote processors and AI logic locations. Network processor 402 can use AI logic manager 440 to manage, distribute, update and delete AI logic distributed to one or more locations multiple locations using communication interface 406. For example, one or more golf courses may have independent AI logic 412 created for a specific golf hole. As such, AI logic manager 440 can maintain listings and version control of AI logic 412 created and distributed by NMS 400 on a course-by-course and hole-by-hole basis.

According to an aspect, network processor 402, image processor 408 and/or GPU 410 need not be viewed as single processors but should be viewed as multiple processors and services that can be accessed by NMS 400 to process and output digital media, content, AI logic, and various other outputs and services as described herein. For example, network processor 402 can be realized as a cloud service that can be deployed using Amazon Cloud Services, IBM Cloud Services, Microsoft Cloud Services, or various combinations thereof and can access multiple managers and modules disclosed herein using network communication protocols capable. Cloud Storage and services 404 and distribution manager/communication interface 446 can also include various types of cloud storage services and distribution services having different storage capabilities and accessibility. For example, some content may be stored for immediate access while other forms of content can be stored for delayed access using a deep storage technique. For example, cloud storage and services 404 can include Amazon Web Services (AWS) Glacier for storing video in the cloud. Additionally, content/file manager 422 and distribution manager/communication interface 446 can utilize AWS Cloudfront as a content delivery service that distributes videos to end users.

According to a further aspect, video process manager 424 can be used to initiate post processing of video received from communication interface 406 and RMS 450. For example, a video may be modified or edited to add additional graphical assets and formatted using a specific format provided by format manager 432. In one form, NMS 400 can employ format manager 432 for post processing and editing and may use Python and OpenCV for editing videos on AWS EC2 web servers operable with NMS 400. NMS 400 can also utilize AWS Elemental MediaConvert to convert or format video prior to distribution using distribution manager communication interface 446.

During operation, NMS 400 can receive a request to initiate a recording session using RMS 450. For example, a user having a valid user profile stored within user profile and stats manager 420 may send a signal to NMS 400 using a mobile app of a user. A request may be originated from digital media enabled destination 448 or from RMS 450. Location profile manager 418 can also be used with user profile and stats manager 420 to validate the request and upon validating, a session can be created by session creation manager 416 and sent to RMS 450 to activate a recording session using RMS 450 and associated devices. Session creation manager 416 can store a session event using content/file manager 422 and when a valid video upload is initiated by RMS 450 with the valid session, content/file manager 422 can validate the upload and the video and associated files/data can be stored using cloud storage and service 404. In one form, upon a video transfer being initiated, RMS Manager 414 can send a disable event to RMS 450 to disable a recording of an event. In this manner, efficient use of resources at RMS 450 can be achieved and a reduced amount of memory or local storage to RMS 450 may be needed.

Upon NMS 400 receiving an uploaded video, video process manager 424 can initiate a post processing of an uploaded video stored within cloud storage and services. For example, content/file manager 422 can include a file name and destination of a video upload, and can further obtain post processing information to process the uploaded video. For example, an uploaded video can have a specific file name with meta data that can include the course name, location, hole #, user or golfer name, date and time stamp, GPS data, file size, file type, processing completed, processing required, or various other video processing data that can be stored within meta data. Although described as being provided within meta data of the video file, a separate log file or video content file can be provided as needed. Video process manager 424 can then process the video using the meta data and other digital assets. For example, GPU 410 can be used to add a banner at the top of the video including the course name, hole number, player name, number of shots and distance of the golf hole. Digital asset manager 428 can access digital assets and requirements for a specific course and golfer. According to another aspect, video process manager 424 can access digital asset manager 428 configured to manage various other forms of digital assets, graphics, text, logos, effects, marketing materials, promotional materials, or various other digital assets that can be added to a processed video. For example, an object corresponding to a particular brand, apparel type, club type, and/or swing type can be added to the video.

In another form, shot tracing module 426 can be accessed and used to add a shot trace to a golf shot within an uploaded video. For example, a video can be processed using GPU 410, image processor 408, and AI logic 412 to identity a golf ball within each from of the video. The frame location of the ball can be stored within memory and a trace can be added as an overlay to the video to show the direction the ball is travelling during playback of the video.

According to another aspect, sensor data manager 430 can be used with shot tracing module 426 to manage other graphical representations of sensor data received from RMS 450 that can be added. For example, shot tracing module 426 can identify a ball as described above and can further use sensor data to add graphics representing a swing or ball speed, distance, ball fight, flight path, or various other sensor data that may be added to video using video process manager 424. Performance data from a radar unit of RMS 450 can be provided with sensor data uploaded from RMS 450. Sensor data manger 430 can access session data and record time data to determine sensor data uploaded from RMS 450 and add sensor data to the video accordingly. In other forms, sensor data may be stored remote to NMS 400 and sensor data manager 430 may be used to access sensor data acquired. For example, a third-party sensor, such as a radar unit, may acquire sensor data at RMS 450. As such, sensor data manager 430 can access a third-party database, or third-party API, to acquire sensor data. In other forms, a third-party API can be added to NMS 400 for accessing sensor data.

According to further aspect, digital asset manager 428 can be used to add various colors to shots detected using shot tracing module 426 and sensor data manager 430. For example, if the ball travels above a certain speed, a red or "hot" color may be applied to indicate a high speed, or a flame-graphic may be added as a tail to the ball. Similarly, if the ball flight is within a range of being considered "straight," a green color may be applied to the ball flight to indicate the lack of a hook or slice. Conversely, if the ball flight is not straight, another color, such as yellow or red, may be applied to the ball flight to indicate a less than ideal shot. In one aspect, a golfer may indicate, via a mobile device and mobile app manager 436, the type of indicator they would like to have displayed. Other forms of processing an uploaded video may also be realized as described in various additional embodiments herein.

According to another aspect, NMS 400 can use performance manager 438 to identifying performance trends associated with a golf hole, course, players, or other detectable objects within video captured using RMS 450. For example, performance manager 438 can analyze multiple shots played at a hole and determine shot tendencies based on data from multiple players. In other forms, AI logic 412 can analyze video to identify a topology of a green and the overall make percentage based on a hole location on a green. AI logic 412 performing a green analysis can also detect a direction a ball may break when putted from a specific location on a green. Performance manager 424 using AI logic 412 can identify characteristics of a green through analyzing video and can also determine shot tendencies a particular golfer and stored within user profile and stats manager 420.

According to a further aspect. NMS 400 can use course manager 444, performance manager 438 and user profile and stats manger 420 to present analysis and playing suggestions and instruction between the player and the course.

In another aspect, a method of providing statistics is provided. The method includes identifying data associated with at least one of a golf hole or players. The method further includes providing the data associated with the golf hole or the player. The method may include presenting an average score on the hole, a rate of reaching the green in the regulation for the hole, an average distance to the pin on the hole, or an average driving distance on the hole. The method may include presenting a score of the player, presenting the rate of greens in regulation for the player, the average driving distance of the player, or the average distance to the pin for the player. The data may be associated with a single round, a single day, multiple rounds, multiple days, a single player, and/or multiple players. The method may include creating stats for players across a single hole or all holes played. The method may include providing a pin drop graphic in a video or a representation of the hole. The pin drop may corresponding to a single player's shot(s) or for multiple players on the hole. The pin drop may include a link to a video associated with a shot identified by the pin drop.

According to a further aspect, course manager 444 can be used to maintain and update course information that can be used video process manager 424. For example, course manager 444 provide digital assets that can be managed by digital asset manager 428 to be added to a video created at a specific golf course and hole. For example, logo information, course links, hole data, and location can be provided using course manager 444. Course manager 444 can also be used to maintain a profile for a golf professional located and working at a specific course. A profile description or bio of one or more golf professionals for a specific course can be maintained by course manager 444 and can be added to one or more user interfaces using mobile app manager 436. Each of the profiles can be toggled on/off using course manager 444, allowing the biography information to be present within a mobile app. In this manner, a local golf professional can be contacted using a mobile app associated with a specific course.

Update Manager 442 may be used to push updates that are made at one or more the above described managers or modules to one or more of the other managers described above, such that updated and modified information remains up to date across the system.

Referring now to FIGS. 5A-D, graphical user interfaces of a media enabled mobile application is disclosed. The user interfaces of a mobile application are generally illustrated in FIGS. 5A-D and can be provided within an application that can be used, in whole or in part, on a mobile phone, tablet, smart watch, golf cart, pull cart, pushcart, powered "follow-me" cart, laptop computer, or any other mobile device. It will be appreciated that mobile application with user interfaces 5A-D may also be installed/embodied/accessible on other devices, such as traditional computers, internet browsers, and the like.

Figure 5A:
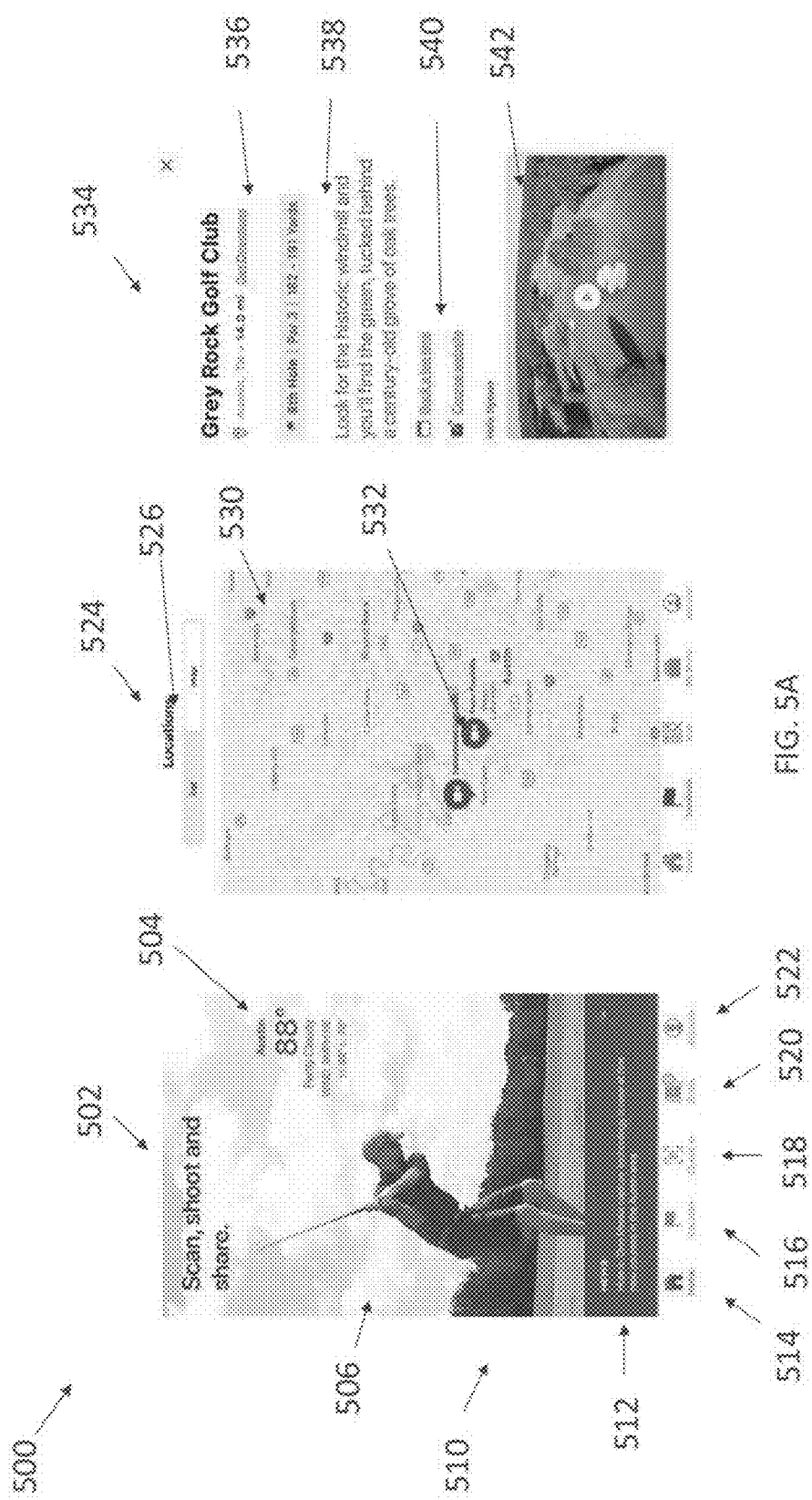
FIG. 5A illustrates graphical user interfaces of a media enabled mobile application according to an aspect of the present disclosure.
Figure 5B:
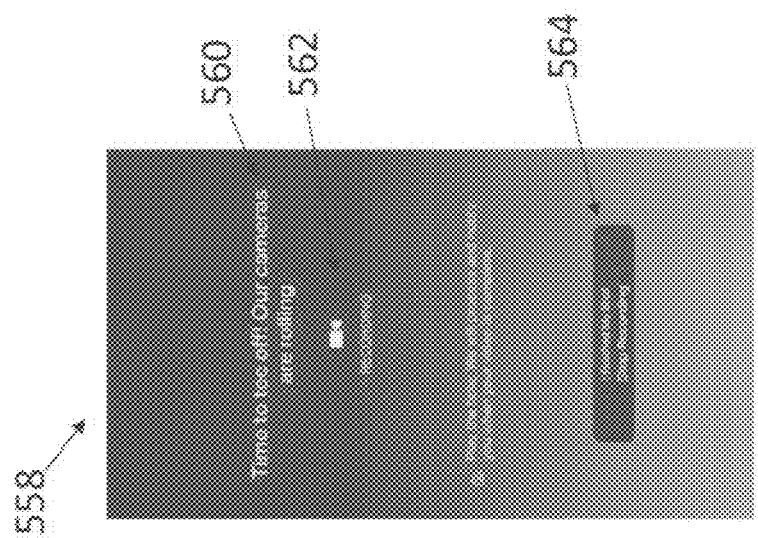
FIG. 5B illustrates further graphical user interfaces of a media enabled mobile application according to an aspect of the present disclosure.

Referring now to FIG. 5A, an application home screen is illustrated generally at 500 and includes home screen interface 502 having current weather conditions 504, and a video home background screen 506. Video home background screen 506 can include a static image from a previously recorded video or in some forms can include an animated video of a user's golf shot that was previously recorded. Home screen interface 502 also includes a messaging banner 512 configured to communicate new messages to app user's. For example, current course conditions can be provided, a message from the golf course can be provided, advertisements or specials at a course, messages from other golfer's or friends, or various other items or news items can be displayed within message board 512. Home screen interface 502 also includes navigational elements including a home screen icon 514, a courses icon 516, a check-in or scan icon 518, a my shots icon 520 with a bubble section, and an account icon 522 including user profile information. Home screen icon 514 when selected displays home screen interface 502.

According to an aspect, when a user selects courses icon 516, a locations screen interface 524 is displayed and includes a map view and list view selector 526. When selecting a map view, a map 530 of courses 532 having video recording technology is displayed on a map as a camera icon. If a list view is selected, a list (not expressly illustrated) of courses can be provided. When a user selects a course 532, course description screen 534 is displayed showing course details such as location, distance and directions 536, a golf hole description 538 having the hole number, par and distance of the hole, one or more course links 540 that allow user's to access and book tee times on the course's website. A flyover video or hole view section 542 provides a graphical or video description of the golf hole having video recording technology.

According to a further aspect, mobile app may be used with course links 540 to schedule tee times within locations screen interface 524 (not expressly shown). Course links 540 may include a process payments section and may be configured to use adaptive pricing based on demand. For example, when demand is tow, course links 540 with a tee time schedule interface may automatically promote discounted pricing for playing a round at the golf course.

According to a further aspect, when a golfer is playing a course having video recording technology and they arrive at a hole, a golfer can select the check-in or scan icon 518 to access check-in user interface 544 illustrated in FIG. 513. A first check-in user interface 546 can include a OR code image 548, a scan now icon 550, and a questions link 552 describing where a OR code is located on the specific golf hole. When a user selects scan now icon 550, it's time for the golfer to take their shot, and second check-in user interface 554 displays a countdown 556 of when video recording for the golfer. When the recording begins, a third check-in interface 558 is displayed indicating a tee off message 560 and an animated recording icon 562 with a red dot blinking indicating that the cameras are recording. When a player is done with their shot, a player can select a stop recording icon 564 to disable recording. Each golfer can repeat this sequence to have the autonomous video technology record their shot.

According to an aspect, a QR code may not be available when a user arrives at a golf hole or another form of check-in may be deployed. As such, check-in user interface 546 can be updated to include a start video icon (not expressly illustrated). For example, the mobile app can be used with location services to detect when a user arrives at a tee box and check-in or scan icon 518 can be selected and a start video icon can be displayed within check-in user interface

546. As such, various other check-in methods can be used and are not limited to only using a QR code to check in and begin recording a user's shot.

Figure 5C:
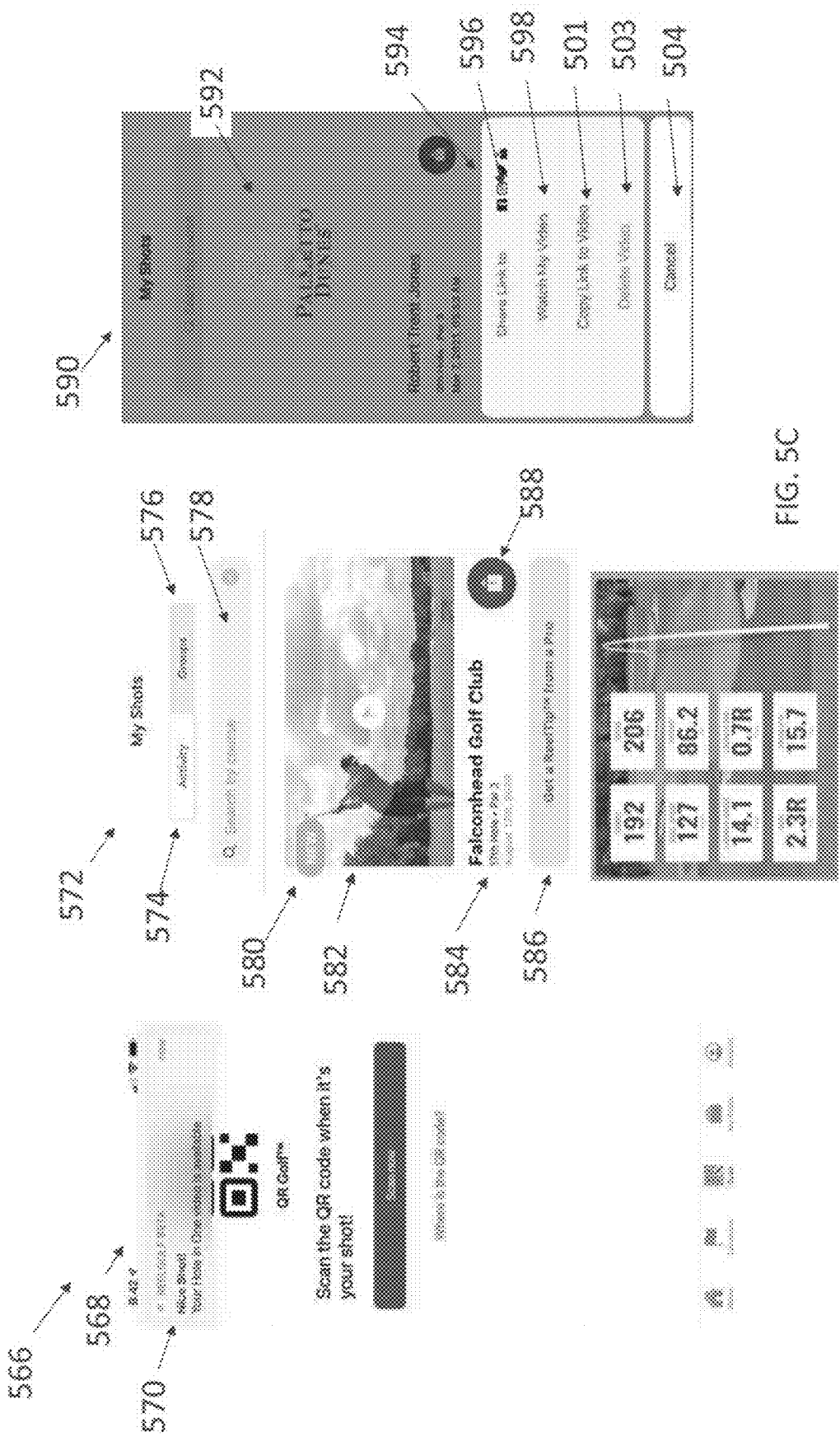
FIG. 5C illustrates further graphical user interfaces of a media enabled mobile application according to an aspect of the present disclosure.
Figure 5D:
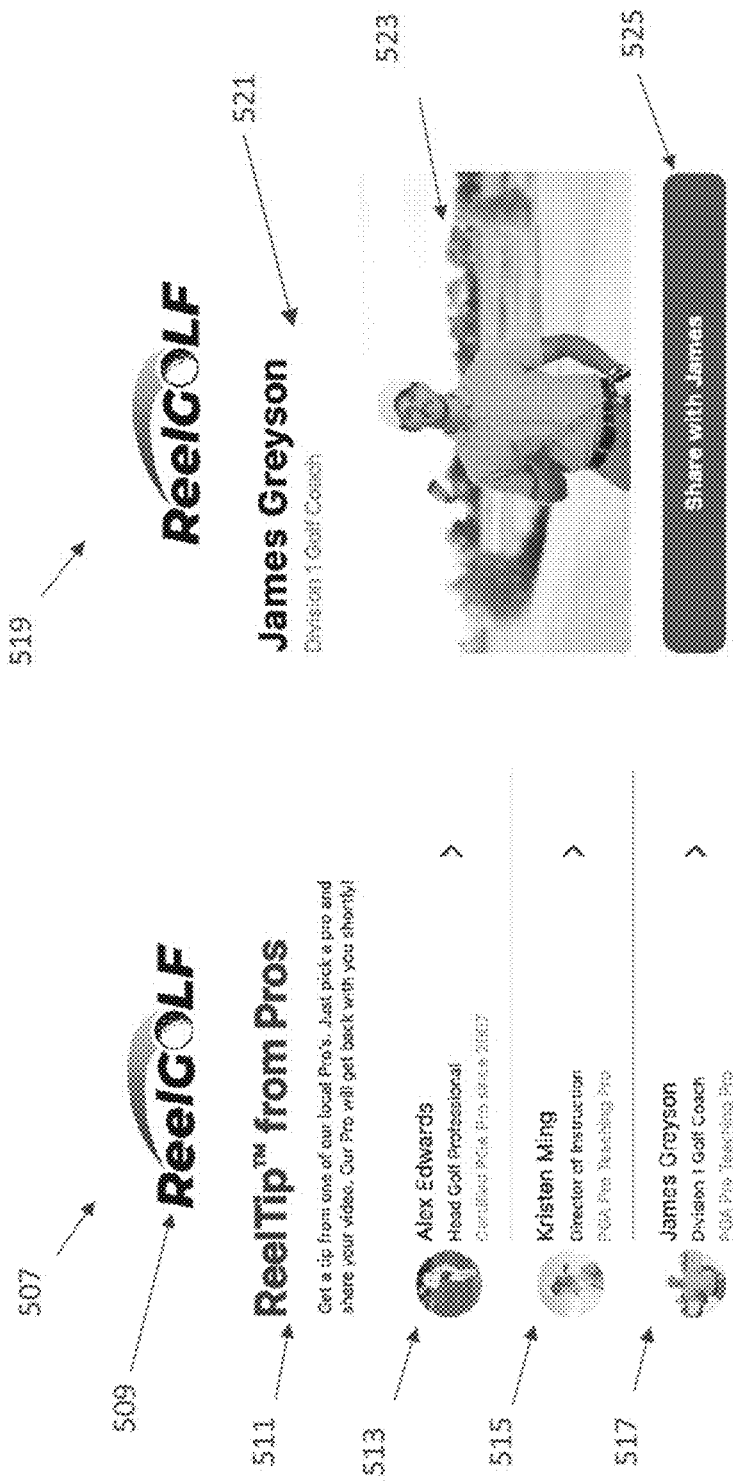
FIG. 5D illustrates further graphical user interfaces of a media enabled mobile application according to an aspect of the present disclosure.

Referring now to FIG. 5C, a user interface 568 includes a graphical representation of a notification of a video being available. User interface 568 illustrates a message 570 sent to a user of a mobile device having screen 566. Mobile device can be the user or golfer's mobile device and screen 566 can be any portion of a mobile device screen configured to allow notifications, messages, in-app messages, or text messages and the like to be displayed on a screen of a mobile device. In this manner, when a recorded video is finished being processed and media is available, a user can receive a message that their video is available.

According to another aspect, a user may select my shots icon 520 to view new and previously created videos. For example, a my shots user interface 572 can include an activity tab 574, a groups tab 576, and a search video section 578 to search videos within my shots user interface 572. A "new" label 580 is layered over a new video 582 to indicate if a video is a new. Along with new video 582 is a shot description 584 that can include a course name, hole description and date when the shot was made and the video was recorded. According to a further aspect, my shots user interface 572 further includes a share icon 588 to share new video 582 and a ReelTip icon 586 to share new video 582 with a local pro as described below. Upon selecting share icon 588, a share user interface 594 is displayed within user interface 592 of screen 590. Share user interface 594 can include a share to social media tab 596 to allow a user to share to social media destinations such as Facebook, Instagram, Twitter and various other social media destinations. Share user interface 594 also includes a watch my video tab 598 to launch a media viewer, a copy link to video tab 501 to allow a user to copy and send a unique video link via text, email, or other messaging capable of sharing video links. A user may also delete a video using a delete video tab 503.

According to a further aspect, my shots user interface 572 also includes groups tab 576 that can be selected within my shots user interface 572. Groups tab 576 when selected displays each of the groups a user played with when the user played that hole (not expressly illustrated) that a video was recorded. For example, if a user played with three other golfers, each of the golfer's name and a link to their shot can be displayed within the my shots user interface 572. Additionally, each user within the group can also leave comments within the groups tab section and can further create a private "message board" that only the players that played together that day can view and edit. In a further embodiment as described below, each user can be added or deleted from the groups section automatically. For example, when a user checks in to take their shot using the check-in or scan icon 518, the mobile app can automatically add each user profile to the group section of groups tab 576 thereby creating an efficient way to share contact information, posts, comments, and other content with a group of golfers that played golf together that day.

According to a further aspect, groups tab 576 may be used to communicate with golfers in a private group (not expressly illustrated). For example, each of the members of a particular group of golfers may have downloaded the mobile app and each of the golfers having recorded. The shots of each of the golfers may be aggregated and show privately to golfers within the private group thereby providing a series of shots for each golfers to view and comment. In this manner, groups outside of a single group can be created and displayed within a private group section thereby creating a private message board and social media platform for any size group1 of players playing the course that day.

According to a further aspect, when a user selects ReelTip icon 586 to share a video with a local pro, a Reel. Tip user interface 507 can be displayed to a user. Reel Tip user interface 507 can include a local golf course logo 509 where the video taken, and a description 511 of how to get a tip on the video from a local pro of that course. Reel Tip user interface can also include a first pro information tab 513, a second pro information tab 515, and a third pro information tab 517. Pro information tabs can be added or removed based on availability of a pro that day to provide a tip. Also, each pro information tab can include a picture section, a name and title section, and a small bio line. When a user selects a pro information tab, a pro information user interface 519 for a selected pro is displayed. For example, when second pro information tab 515 is selected, pro information user interface 519 displays a pros name and bio section 521 which can include a brief bio about the pro, an image 523 of the pro, and a share icon 525 to share the video with the selected pro. Upon selecting share icon 525, a share selector (not expressly shown) can be displayed allowing a user to text, email, in app message, etc. the selected pro a link to the video. In this manner, a dialogue between a player and a local pro can be created thereby decreasing a barrier of communication that can exist between players and pro which will allow the mobile app to assist with growing the game of golf.

Figure 6:
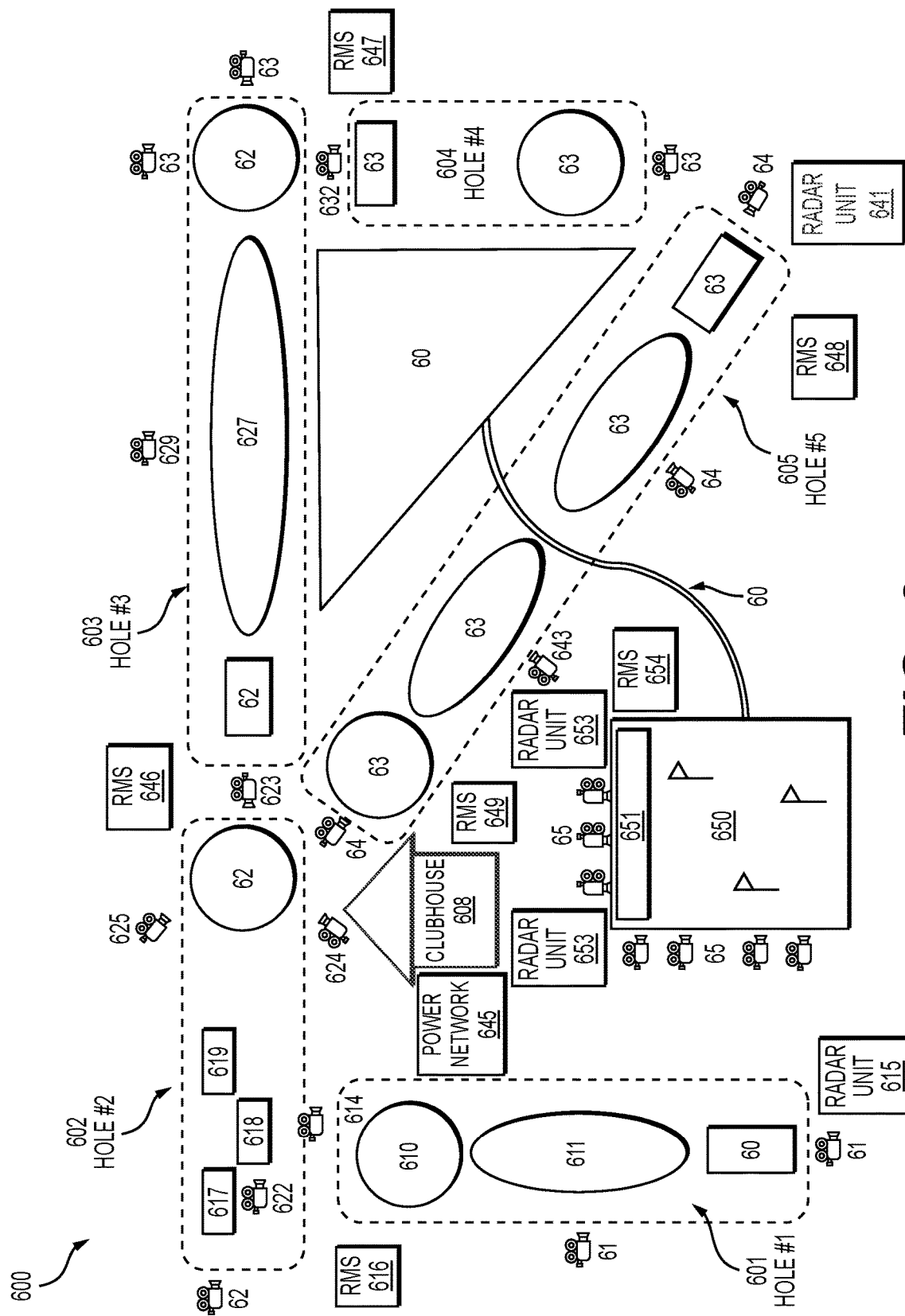
FIG. 6 is a diagram of an AI enabled golf course according to an aspect of the present disclosure.

Referring now to FIG. 6, a diagram of an AI enabled golf course is provided. An AI golf (AIG) course, illustrated generally at 600, is illustrated as a multi-hole golf course and can include any number of golf holes, hole types, and facilities. For example, AIG course 600 can be an 18-hole course, a 9-hole course, a 3-hole course, putting course or any size course as desired. Further, AI enabled golf course need not be a traditional golf course but can be provided as a golfing facility that can be used to practice or for entertainment. For example, AI enabled golf course could be realized as a driving range or practice facility having multiple tee box locations and golfers hitting golf balls at the same time and video may be captured for each shot and provided to golfers. In other forms. AI enabled golf course can be realized as an AI enabled golf entertainment facility, such as an outdoor facility like TopGolf or an indoor facility such as Rokgolf and the like. AI enabled cameras can be provided to record each bay and each players video can be recorded and processed for all their shots as described herein. As such, when a golfer leaves a facility, a video of their experience can be automatically created and communicated to players or participants mobile app or other destinations and/or social media outlets as nee led or desired.

According to an aspect, AIG course 600 also includes numerous radar units that can be used in a variety of ways. Radar units described herein can have single or multiple transmitters that can be used having a high-frequency (10's of GHz) radio pulse that spreads out in a forward direction and a reflected pulse returns to the receiver and can be detected by a radar unit. The unit can further have an array technology on the receiving side that can detect a pulse that reflects back from a golf ball, or other object that's downrange using a vertical and horizontal array of receiving elements. The timing of when the received pulse hits each receiving element depending on the angle between that element and the golf ball. The timing differences can be used to determine the horizontal and vertical angles between the ball and the radar unit. The radar unit can also be used to measure downrange objects that can generate a reflected pulse including pins, flags, edge of greens, holes, bunkers trees, hazards, and the like. The received pulses from moving objects are frequency-shifted by an amount proportional to the speed of the object, or overall size. For example, a distance a ball is to a pin can be measured using a radar unit. A reflected pulse of a golf ball is different from the pin and when a moving ball comes to a stop, the unit can detect the location of the ball relative to the pin location (each pin is moved daily to a new location).

According to an aspect, a radar unit can include a cone-shaped region in front of it in which it can 'see' golf balls. The region can cover an entire golf range by using multiple radar units. According to a further aspect, a radar unit can be used to detect a moving golf ball until it arrives on a green and slow to a stop. For example, a radar unit can also identify that there wasn't a ball before and there is a ball now on green. The radar unit can measure the angle between the radar unit and the golf ball, and they can also measure the distance to the golf ball relative to the pin, which appeared in the morning after being moved but didn't move all day.

When pairing a radar unit with AI enabled video, AIG course 600 allows for autonomous video processing that can use both radar input, video input, and AI to detect various aspects of a play on a golf course and output video footage specific to a golfer that may not otherwise have been output. For example, radar has limitations in that it cannot discern one specific golfer from the next, or pair a stuck golf ball with a specific portion of video for a specific golfer. By using an intelligent system that uses video processing, AI, and radar to detect a specific golfer and their play, a radar unit can be coupled within an AI enabled golf course system and create a unique experience for a golfer.

According to an aspect, AIG course 600 includes a first hole 601, a second hole 602, a third hole 603, a fourth hole 604, and a fifth hole 605. AIG course 600 also includes a water hazard 606, a creek hazard 607, and a club house 608. First hole 601 includes a first hole tee box 609, a first hole green 610 and a first hole fairway 611. First hole 601 is realized as a Par 4 and includes a first hole tee box camera 612 a first hole fairway camera 613, and a first hole green camera 614. First hole 601 also includes a first hole radar 615 covering the first hole tee box 609 and fairway 611. First hole 601 also includes a first remote media system (RMS) 616 coupled to each of the first hole cameras and the first hole radar. RMS 616, and various other RMSs provided in FIG. 6 can be provided as RMS 100 in FIG. 1, RMS 200 in FIG. 2, RMS 710 in FIG. 7, RMS 1124 of FIG. 11 or various other RMSs that can be realized on AIG course 600.

According to a further aspect, AIG course 600 also includes second hole 602 including a second hole rear tee box 617, a second hole middle tee box 618, a second hole front tee box 619, and a second hole green 620. Second hole 602 is configured to be a Par 3 golf hole and include a second hole first camera 621 aligned with rear tee box 617 and front tee box 619 to record golfers in either tee box and their shot to second hole green 620. Second hole 602 also includes a second hole second camera 622 aligned with middle tee box 618 and green 620 to record golfers using middle tee box 618. It should be understood that each camera can be provided at different heights depending on the altitude or height of each tee and green combination. Second hole 602 also include a rust green side camera 623, a second green-side camera 624 and a third green side camera 625 configured to record golfers from various angles on green 620.

According to a further aspect, AIG course 600 also includes third hole 603 including a third hole tee box 626, a third hole green 628, and a third hole fairway 627. Third hole 603 is configured to be a Par 4 golf hole. Third hole 603 is configured to use first green side camera 623 as a tee box camera for third hole tee box 626. In this instance, when a user is on third tee box 626, first green side camera 623 can rotate, pivot and focus on a player on third tee box 626, leaving second and third green side cameras to record action on second green 620. In this manner, MG course 600 can realize a cost savings in the number of cameras needed or required to record play on AIG course 600. Third hole 603 also includes a first green side camera 631, a second green side camera 632, a third green side camera 630, and a fairway camera 629. Second green side camera 632 is positioned to record third green 628 and video for fount hole 604 as described below.

Referring now to fourth hole 604, second green side camera 632 can be aligned with fourth hole tee box 633 and fourth green 634 to record video on fourth hole 604. Fourth hole 604 also includes a fourth green camera 635 to record action on green 634 for fourth hole 604 and is provided as a Par 3. RMS 647 is positioned between third green 628 and fourth hole tee box 633 and can be used to process video recorded in each location. Additionally, fourth green camera 635 can be coupled to RMS 647 for processing and communicating recorded video on fourth hole 604.

According to a further aspect, MG course 600 includes fifth hole 605 as a Par 5 and include a fifth hole tee box 636, a first fairway landing area 637, a second fairway landing area 638, and a fifth hole green 639. Fifth hole 605 further includes water hazard 606 to the right of fifth hole 605 and creek 607 positioned between first fairway landing area 637 and second fairway landing area 638. Fifth hole 605 includes a fifth tee box camera 640, a first fairway camera 642, a second fairway camera 643 and a fifth green camera 644. Fifth hole 605 also include a fifth hole radar 641 and a first fairway RMS 648 to process a first portion of fifth hole 605 including tee box video, radar data, and first fairway video. Fifth hole 605 also includes a second RMS 649 configured to process second fairway video and fifth green video captured during play of fifth hole 605.

According to a further aspect, AIG course 600 includes a power network 645 capable of powering cameras, radars, RMSs and various other powered devices at AIG course 600. It should be understood that power network 645 is not limited to a single location and can be distributed on a hole-by-hole basis or to other locations at AIG course 600. Different power levels can also be provided and access as needed.

AIG course 600 can also include a driving range facility 650 including a driving tee location 651, driving range cameras 652, one or more range radars 653, and a range RMS 654. Additional cameras, radars, and RMSs can be provided depending on the overall size of driving range facility 650. According to a certain aspect, driving range facility can be a traditional driving range with grass tees for tee location 651 and pin locations within the range. In another form, tee location 651 can be a driving bay location that can be used for entertainment similar to a TopGolf experience. For example, user's can reserve a bay within tee location 651 for a period of time and can practice hitting golf balls at targets within the driving range. In other forms, each bay can include one or more screens (not expressly illustrated) to show animated media of shots. In a particular embodiment, each bay can be set up using AI enabled cameras as driving range cameras 652 to identify and record specific golf shots and process and output video to a video screen within each bay, or in other forms, send video to an end user of their shot. Vida) can also be processed to add additional graphics such as animation, VR graphics, and the like to video captured by driving range cameras 652 to provide an enhanced media experience. Although illustrated as being a part of AIG course 600 it should be appreciated that driving range 650 can be a stand-alone facility that can be provided as an entertainment facility such as Topgolf, Rokgolf, or various other golf entertainment facilities.

According to a further aspect, AIG course 600 can also provide video, including live video or recorded and processed video, to one or more video screens within clubhouse 608. For example, if a live feed of Hole #4 604 may be displayed on a television sawn within clubhouse 608. In one tone, a daily closest-to-the-pin or hole-in-one competition can be played on Hole #4 604 and a live feed can be presented on a screen n within the clubhouse providing entertainment for patrons after their round. In some forms, a digital leader board may also be presented within the video or as a part of a mobile application to show how close or who is leading the competition.

According to another aspect, a video may be displayed when a player arrives at clubhouse 608 so that players may view their shots once they arrive. A player may have a location device that may be tracked within MG course 600 (such as via GPS in the golf cart, location data from the mobile device, RFID tags, etc.), and in response to the players entering clubhouse 608, recorded video specific to the golfers that arrived can be displayed on a screen within clubhouse 608 such as a restaurant/19th hole, bar and the like.

In other forms, a shot may be recorded at an entertainment facility, such as Topgolf, Toprange, Rokgolf and the like. Each bay can include a display that can output video captured of a player after their shot was just taken. Additionally, graphics can be added to the video and in some forms, a split screen can be provided with the video of the golfer on one side of the screen, and animated or graphics video of the shot (e.g. a top down view) being presented in another portion of the video screen. In this manner, players can view their actual swing with the ball flight and can tag their videos using a mobile device or other device having access to the produced video for sharing, downloading, and viewing.

Referring now to FIG. 7, an AI enabled golf hole is disclosed. AI enabled golf (MG) hole, illustrated generally at 700, includes a tee box 702 and a green 704. MG hole 700 is designed as a Par 3 golf hole having a single set of tees illustrated. It should be understood that additional tees and tee boxes can be used and added to MG hole 700 as needed or desired. MG hole 700 also include a first AI enabled camera 706 positioned behind tee box 702 and a second AI enabled camera 708 positioned behind green 704. Although illustrated as a two-camera system, additional cameras and/or AI enabled cameras can be added to AIG hole 700 as needed or desired. Additionally, first AI enabled camera 706 can include a first camera field of view 732 and second AI enabled camera 708 can include a second camera field of view 734. Each field of view can be modified as needed prior to, during, and after use. First AI enabled camera 706 and second AI enabled camera 708 can be provided as a Bosch Model MIC IP ultra 7100i and includes PTZ capabilities as described above in FIG. 3. Other cameras may also be considered.

AIG hole 700 also includes a remote media system (RMS) 710 positioned near AIG hole 700. RMS 710 can be connected to a network media processing and management services 714, illustrated generally as Network Media Services (NMS) 714, and a media enabled destination 716 for communicating video or digital media to after capturing and processing using MG hole 700.

According to a further aspect, AIG hole 700 also include other devices positioned near tee box 702 including a microphone 718 for capturing audio, ball strikes, and player comments, a radar unit 720 for capturing details about a golfers' swing and ball flight, and a QR golf code 722 that can be used to enable use of AIG hole 700 for a golfer having a mobile device 724. In one aspect, QR golf code 722 is provided as a device. AIG hole 700 further includes a hole 726 positioned on green 704 and configured to hold a flagstick 728 having a flagstick height 730.

According to an aspect, first AI enabled camera 706 and second AI enabled camera 708 can be connected and powered by RMS 710. For example, RMS 710 can include a communication interface such as a PoE interface capable of connection multiple remote cameras while powering the cameras over an extended distance (in one example, the range for PoE is about 100 meters, or about 328 feet). In one aspect, up to four PoE powered cameras may be attached on one Main Computer. A Wi-Fi radio on the Main Computer that communicates with the computer at the opposite end of the hole may also be powered by PoE. Each PoE cable can be submerged underground and connected to and powered by RMS 710. Additionally, Microphone 718 and radar unit 720 can be connected directly to RMS 710 using a microphone cable, ethernet cable, fiber optic cable, coax cable or custom cables can also be used depending on the type of microphone or radar unit deployed. According to one aspect, first AI Enabled camera 706 can also include an interface allowing for connecting an external microphone or other sensors. Additionally, radar unit 720 need not connected to RMS 710 separately but can be connected using a communication interface of first AI enabled camera 706 and in one form may be integrated into a housing with first AI enabled camera 706. Although described as connecting to first AI enabled camera 706, it should be understood that one or more external devices can be connected to second AI enabled camera 708 as needed.

According to an aspect, AIG hole 700 includes technology to allow for automatic detection of a golfer to automatically record play of a golfer, process a recorded video, and communicate or upload a processed video in an efficient manner. AIG hole 700 can accomplish various embodiments and combinations of embodiments to activate recording. According to one aspect, one or more of AI enabled camera(s) 706/708 can be configured to detect the presence of one or more golfers within a predetermined area associated with AI enabled camera(s) 706/708. For example, first AI enabled camera 706 can be configured to detect using a motion sensor within the camera when a golfer is on tee box 702 and begin recording video while a golfer is present on tee box 702. Additionally, second AI enabled camera 706 can be configured to use a motion sensor to detect when one or more golfers are no longer present on green 704 and stop recording video in their absence. In one form, both cameras may be turned on or off together or independently when a golfer is detected at each location. Recorded video can be time stamped together and communicated to RMS 710 for further processing. In this manner, a limited amount of video may be captured and recorded only when a golfer is present thereby reducing the amount of memory and processing needed to store, process and communicate video on AIG hole 700.

According to a further aspect, AIG hole 700 can detect a presence of a golfer using wireless device, signal and services detection. For example, a golfer, golfcart, watch, mobile device, or other devices may have an RF, Wifi, GPS, Bluetooth, or location-based service capabilities and AIG hole 700 can be modified to accommodate one or more as needed. For example, a golfer may have an RFID chip capable of being detected by one or more devices of AIG hole 700. An RFID chip or RFID tag can be clipped to a golfer and tee box 702 can include an RFID sensor that can detect when the RFID tag is located near or on tee box 702. In other forms, a golf cart can include GPS location-based services that can be used to trigger when a camera can begin recording or end recording based on the location of the golf cart. In another aspect, a golfer may have a GPS enabled smart watch that can provide location or GPS services that can be detected by AIG hole 700. Location Services enabled devices such as a mobile device, smart watch, golf watch, smartphone or tablet or other GPS or Location Services enabled devices to communicate a GPS location and AIG hole 700 can activate and deactivate cameras based on the location of the GI'S or location services device. In a particular form, a golfer may have a mobile device and mobile application configured to communicate with NMS 714 and provide GPS locations. NMS 714 may store multiple GPS locations of AIG holes that can be used with the mobile app on mobile device 724 for multiple golf courses. Upon a user actively using mobile device 724 at AIG hole 700, mobile device 724 can communicate a location to NMS 714 and, upon validation of being on tee box 702, NMS 714 can send an activation signal or start event to RMS 710 to activate first AI enabled camera 706 and second AI enabled camera 708. As mobile device 724 leaves green 704, mobile device 724 can communicate a location to NMS 714 sufficient to send a deactivation signal or stop event to RMS 71.0 to stop recording. In this manner location services can be used to trigger recording and not recording play on AIG hole 700. Although described as having NMS 714 track locations of mobile device 724 it should be understood that RMS 710 can be in communication with mobile device 724 independent of NMS 714. Additionally, one or more geofences can be placed around tee box 702 and green 704 sufficiently sized to activate and deactivate recording play. A Geofence is a form of location service that can be stored and modified within NMS 714 and mobile device 724 and NMS 714 can initiate activation and deactivation upon entry and exit of each geofence.

According to another aspect, a golfer may use mobile device 724 to activate and deactivate a recording via a mobile application stored on mobile device 724. For example, when a golfer is about to take their shot, they can use a mobile application and select a start record icon within the mobile application. The mobile device 724 can communicate with RMS 710 and/or NMS 714 to activate recording using AI enabled cameras 706/708. When a golfer is done with their tee shot or after they leave the green, a golfer can select a stop recording icon within the mobile application and RMS 710 and/or NMS 714 can send a request to AI enabled cameras 706/708 to stop recording. In this manner, a golfer may use a manual start/stop to initiate recording on AIG hole 700, and RMS 710 and NMS 714 can process the video for the golfer using a device or player identifier provided in association with activating the cameras on AIG hole 700.

According to an aspect, a golfer can be detected using AI Golf Logic 712 of AIG hole 700. For example, mobile device 724 having a mobile application can be used to scan QR golf code 722 and AIG hole 700 can activate one or more camera's in response to QR golf code 722 being scanned.

In a further embodiment, upon activation of AI enabled cameras using one or more of the techniques described herein, first AI enabled camera 706 and/or second AI enabled camera 708 may take an image of the golfer that initiated the activation. Attributes of the golfer, such as clothes colors, skin tone, height, golf club, or various other attributes can be compared to AI logic having AI golf logic 712 that can be used to compare AI logic 712 to the captured image. The results of the comparison can then be used to actively record the golfer and to further process video having the AI logic comparison results. For example, the results of the comparison can be stored in a log file, user file, AI log file, or other storage file that may include a single entry for one golfer, a series of entries for multiple golfers, or even a daily entry for all golfers that played AIG hole 700. The file can then be used to process the recorded video and generate a video segment for each golfer identified. Upon a golfer no longer being detected at AIG hole 700, RMS 700 can initiate a stop recording event for each of the cameras, and the recorded video can be further processed using AI Golf Logic 712 and RMS 710 before being communicated to NMS 714 for further processing.

According to another aspect, a golfer using mobile device 724 can initiate a recording using a QR code or QR Golf code 722. QR Golf code 722 is QR code that are unique to Golf and includes at least one single golf hole identifier that can be used to activate one or more specific remote cameras that are positioned at a specific golf hole. QR Golf code 722 includes embedded visual logic that can be deciphered by mobile app on mobile device 724 to allow for activating recording using the remote cameras located at that specific location. In the present disclosure, mobile device 724 can be used to scan QR golf code 722 using a mobile app and capture QR golf code 722. Mobile device 724 can then send a message to initiate a session for mobile device 724 and the user with the unique identifier for AIG hole 700 to initiate a recording session. Mobile device 724 can communicate the message with unique credentials to activate a recording at AIG hole 700.

According to a further aspect, QR golf code 722 and AI golf logic 712 can be combined to activate, deactivate, and process recording for a specific golfer. For example, a golfer can initiate a recording using QR golf code 722, located at a specific location on AIG hole 700, and one or more AI enabled cameras can take a photo of the golfer that can be processed and used to generate a video for the specific golfer. A user I.D. obtained from mobile device 724 can be paired with the image and AI golf logic 712 can generate an AI log output specific to the golfer and used by RMS 710 and/or NMS 714 to process recorded video.

According to a further embodiment, QR golf code 722 can be combined with location services, GPS, motion detection, or other method of detecting a presence as a way to activate cameras and a recording session on AIG hole 700. Additionally, QR golf code 722 can also include an RFID tag located underneath a printed or posted QR golf code 722. Mobile device 724 when activated to scan QR golf code 722 can also activate an RFID reader of mobile device 724. By activating an RFID reader, the QR golf code 722 including a RFID tag can confirm that a user or mobile device is present near QR golf code 722. As such, an additional layer of authentication can be achieved prior to activating AIG hole 700 thereby obviating security risks or threats that may pose a risk to AIG hole 700. Each RFID tag will be specifically created for each golf hole and will have unique credentials that can be added to and communicated to NMS 714 to initiate and authenticate sessions.

According to another aspect, RMS 710 can be configured in a variety of ways to assist with on-course recording, processing and distribution of videos to NMS 714. Various aspects of a Remote Media System (RMS) are described throughout the Figures and methods and can be realized by RMS 710. For example, RMS 710 can be used to process various signals and images to identify a valid golfer and initiate recording the golfer. A recorded session can be processed by RMS 710 using video and audio input to identify when a golfer strikes a golf ball, and further slices segments of the video to create a processed video for the specific golfer. RMS 710 also compresses videos to ensure efficient and cost-effective uploads of processed videos.

According to a further aspect, RMS 710 can serve as an agent and performance manager of each of the cameras installed on AIG hole 700. As an agent, RMS 710 negotiates the recording of video for specific golfers and communication between mobile device 724, NMS 714 and first AI enabled camera 706 and second AI enabled camera 708 using events that are communicated between the devices. RMS 710 can also be used to log events and performance other data of devices within a local network of AIG hole 700 and can communicate log files to NMS 714 for remote access and storage. RMS 710 can also store operating data for each device and installation and calibration data of each device connected to RMS 710. In one aspect, RMS 710 can include initial calibration data for each camera which can include a GPS location of each installed device such as cameras, radar units, microphones, QR codes, and other sensors. In one form, the location or camera position can be obtained and used to determine a distance to a flag on a green or a tee on a tee box. AI enabled cameras 706/708 can be calibrated with a reference device, such as a yard stick, and a specific optical zoom of each camera can be obtained. The image of the yard stick, in combination of the number of pixels obtained using the yard stick, can serve a reference for detecting distances of objects within the field of view of the camera and stored. By using the reference, as the flagstick 728 on green 704 is moved along the green, the distance of the pin can be calculated based on the number of pixels lost or gained at a certain optical level. Additionally, as the tees 736 on tee box 702 are moved, the distance of the tees to the camera can be determined and stored as well. When combined, the difference in distances (camera to tee) less (camera to pin) can be used to determine the overall distance from tee 736 to flagstick 728. Various other objects and distances can be used by RMS 710 to determine a number of distance.

In another aspect, each AI enabled camera 706/708 and/or radar unit 720 can be used during a recording to capture details of a shot made by a golfer. For example, first AI enabled camera 706 can record a golfer's video and using the video, RMS 710 and/or NMS 714 may be used to add a trace over the video that shows the direction the golf ball was hit. In this instance, each frame of the video segment for the golfer can be processed, and the golf ball can be located in the frame using image recognition and AI golf logic 712. As the ball moves from frame to frame, the locations within the video can be identified and stored such that an X/Y coordinate system locates the ball within the frame. The resulting X/Y coordinates can be used to draw the line the ball travelled within the recorded video. Depending on the distance traveled over a period of frames, and a height the ball reaches within each frame, the overall speed of the ball and the height (apex) and curve (left/right) the ball travelled can also be determined.

In another form, radar unit 720 can be used with the video, or independent of the captured video to detect the location and ball flight details, and communicate the details to RMS 710 and/or NMS 714 for video processing. As described above, radar unit 720 can capture the speed, distance, height, and curve of the ball using radar technology and communicate the resulting information to allow for creating graphics that can be added to a video segment. One such system, such as the TrackMan Range, described in detail at https://trackmangolf.com/products/range as of the filing date of this disclosure, made by TrackMan, can be used or other radar systems as needed or desired.

Figure 8A:
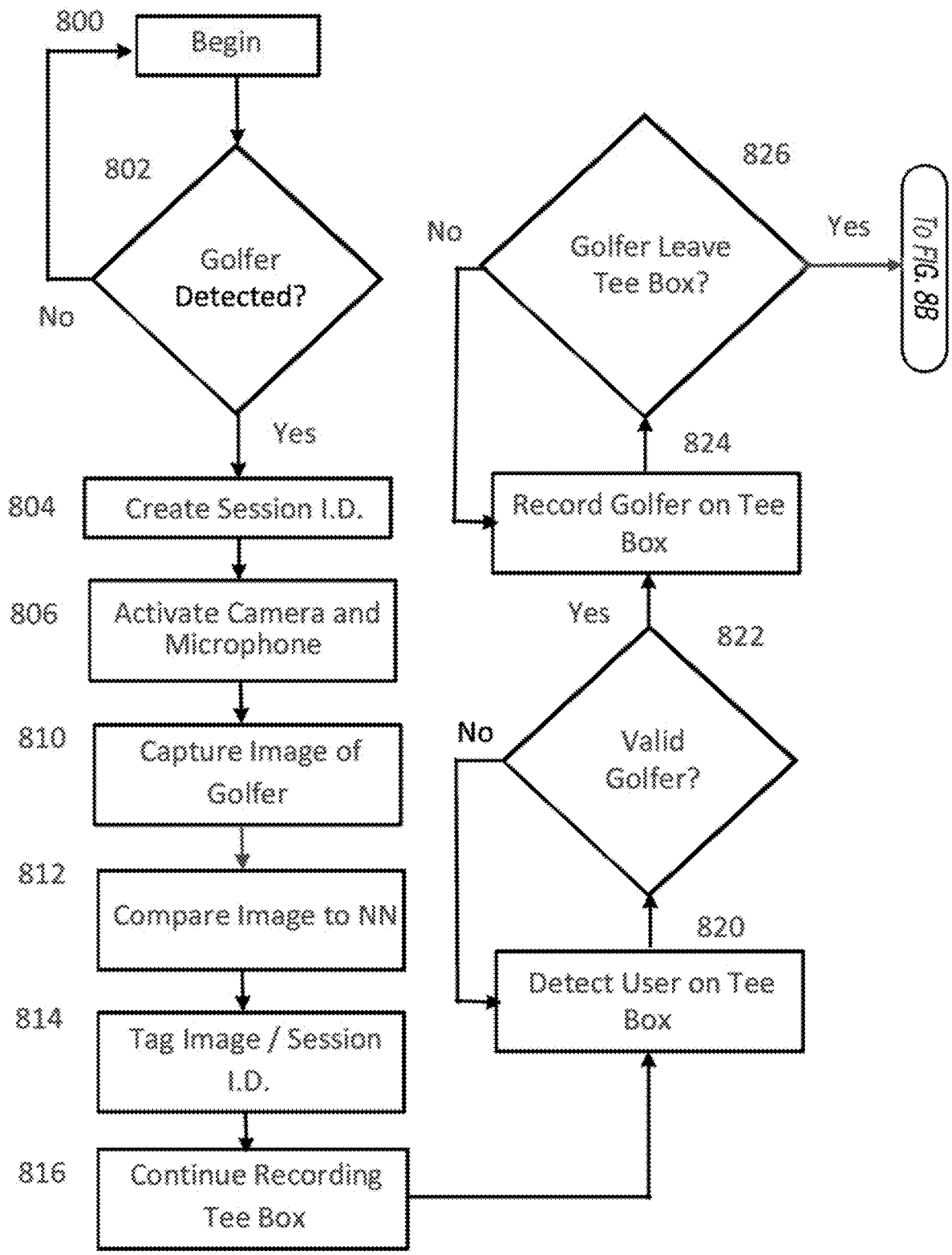
FIG. 8A illustrates a first portion of a method of activating recording using an autonomous media processing system according to an aspect of the present disclosure.
Figure 8B:
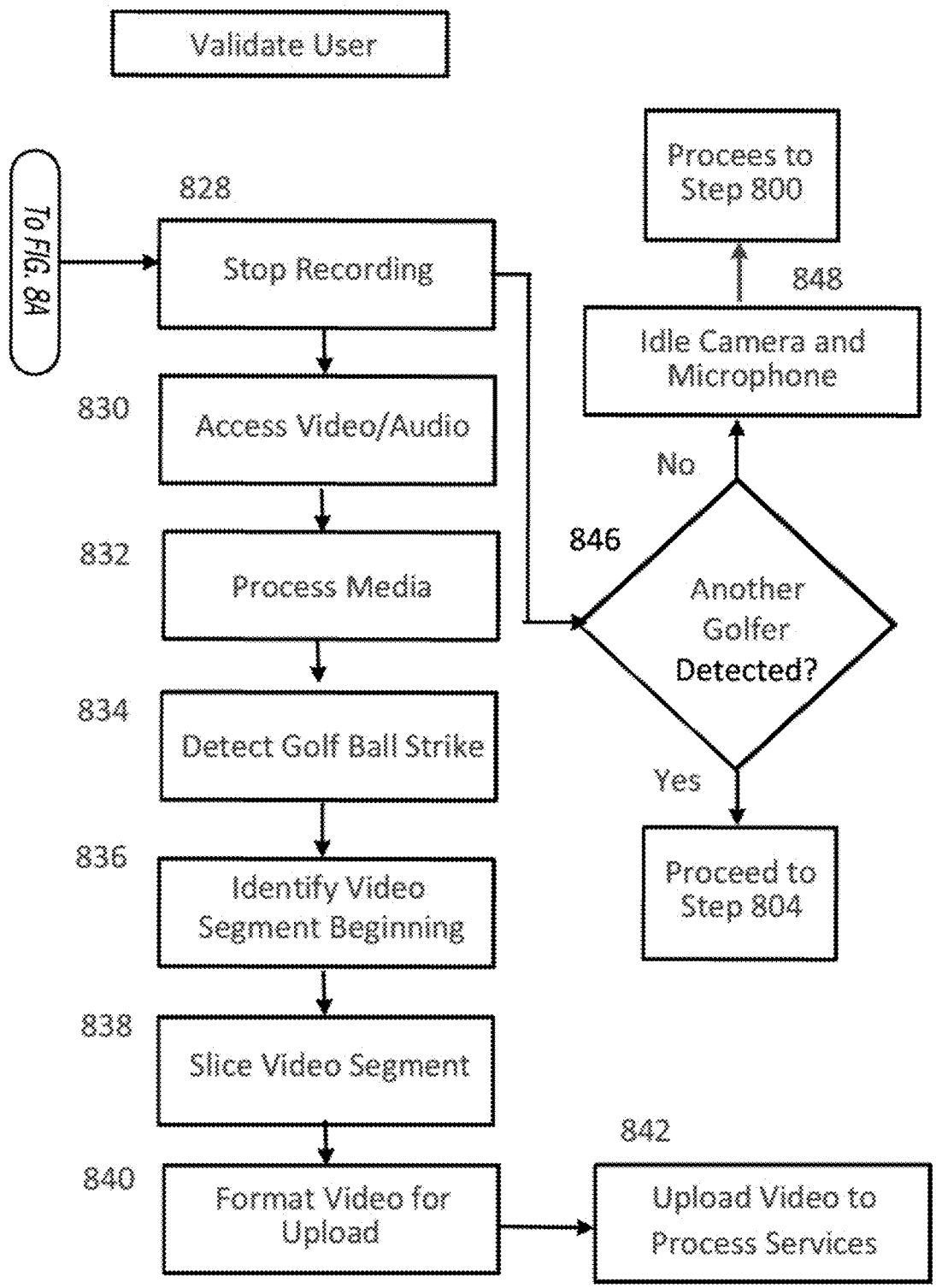
FIG. 8B illustrates a second portion of the method of activating recording using an autonomous media processing system according to an aspect of the present disclosure.

Referring now to FIGS. 8A-8B, a method of activating recording using an autonomous media processing system is disclosed. The method may be used by one or more of the systems, devices, processors, modules, software, firmware, or various other forms of processing to carry out the method described in FIGS. 8A-8B. Additionally, the method of FIGS. 8A-8B may be realized as within various portions of FIGS. 1-7, 9-11, and in some aspects, may be modified to include various functions, uses, and features described therein.

The method begins generally at step 800 and can be used at various geographic locations where a predetermined activity is to be performed. As one example, the method can be used for activation, video capture, and video processing on a golf course. At step 802, the method detects whether a golfer has been detected at a golf hole. For example, a golfer may be detected as they approach a tee box in connection with playing a golf hole. Detection can be done in a variety of ways including using GPS within a mobile, an RFID device, Wi-Fi detection, Bluetooth detection, location services, radar detection, motion sensing, thermal or heat sensing or various other sensing technologies. In addition to detecting the presence of the individual golfers, similar transmitters may be provided on a golf cart or the like, to indicate the presence of one or more golfers. It will be appreciated that other detection mechanisms may also be used. For example, in one form, a golfer's location services of a mobile device having an application for recording video can be detected. For example, a geofence can be placed around a specific tee box and when a golfer having a mobile app or other item to trigger the geofence can detect a golfer.

According to another aspect, at step 802 a user may scan a QR code using a mobile app on a mobile device as described herein. The method can be used to capture the QR code and send a mobile device or app identifier and the QR code having a unique identifier for the golf hole added to a message to initiate a recording session. For example, the method may be used to combine a unique QR code with the a user or mobile identifier, and communicate the message to a service may have a unique identification code and the user.

According to another aspect, at step 802 a golfer may be detected by a user selecting a record icon within a mobile app. For example, the method can be used to monitor for a mobile device input that includes a request to start recording. The method can send a message including the request to validate that a golfer has been detected. In one form, the method can combine a mobile app identifier and a location of the mobile device and communicate each to validate that a user is at a golf hole having an AI enabled camera.

Upon detecting the presence of a golfer, the method can proceed to step 804 and a session I.D. can be created for the golfer. A session I.D. is unique to the golfer and includes information specific to the golfer and can include a unique I.D. for the golfer, a date and time stamp, a location of the golf hole, and other items that can be used to create a session I.D. In one form, the method can be used to access a mobile app of the golfer that can have unique information about the user that can be used to begin a session I.D. Once a session I.D. is created, the method can proceed to step 806 and activate one or more AI enabled cameras at the specific golf hole and any associated microphones. In one form, the method can include accessing a session I.D. that was created and communicate the session I.D. as a valid I.D. for the specific golfer. In this manner, an AI enabled camera and microphone can be activated without having to manually start a recording at the camera, or having an individual at the camera.

In another form, at step 806 a camera and microphone can be activated using a scan of a QR code. For example, the method can include receiving a QR code identifier of the golf hole being played from the golf player's mobile device. The QR code identifier can be sent to Remote Media System or Network Media Processing and Management Services to activate a valid scan or session. If the QR code identifier is valid, an activation code can be sent to a local resource, such as an RMS or an AI enabled camera to activate recording video and sound.

Upon activating the camera and microphone, the method can proceed to step 810 and captures an image of the golfer. For example, a golfer may be located on a tee box and the activated camera may capture a image of the golfer. In another form, a golfer can activate the camera manually using a start icon within a mobile app and the method can capture an image of the golfer. In another form, the golfer may have scanned a QR code at a specific location near the tee box and the camera may capture an image of the golfer. For example, the AI enabled camera or RMS may have the GPS coordinates of the specific QR code being scanned and the AI enabled camera may pan, zoom, tilt, and focus at or near the specific QR code that may have been scanned with the session I.D. As such, an image of a golfer can be captured to be used to further identify the golfer within a future video capture.

Upon capturing an image of the golfer, the method can proceed to step 812 and the image can be compared to AI logic and/or a NN within an AI enabled camera, or an RMS local to the golf hole. In some instances, the method can access a cloud-based service having AI logic and/or a NN to compare the image. Various objects can be identified using AI Logic as described herein. For example, a clothing color of a shirt, shorts, hat, shoes, pants, socks, skin tone, or various other colors of the golfer can be identified and tagged using the image. The tagged data can be provided within the meta data of the image but in other forms may be provided as an image file having image data, or can be provided with the session I.D. of the golfer. In other forms, the method can be used to identify golf objects a golfer may be holding. For example, the AI logic can also include AI golf logic that can be accessed and the image can be compared to the AI golf logic to determine or identify the golfer. The AI golf logic can include identify a specific club having a number, a golf ball, a golf tee, a tee box or various other golf objects as disclosed herein. By identifying and tagging an image of objects of the golfer using AI logic and/or AI golf logic, the method can then be used to create a video specific to a golfer.

At block 816, the method continues to enable recording video using the AI enable camera at the tee box of the golf hole and can detect when a golfer enters the tee box. For example, after capturing an image of the golfer at step 810, the AI enabled camera can pan, tilt, zoom and focus as needed at the tee box being played. The AI enabled camera can detect when a golfer enters the tee box. In one form, the stored AI object identifiers can be used to detect when a golfer enters the tee box. In other forms, the AI enabled camera can mark a zone within an image frame as a valid location for the tee box and can detect when an activity may occur in the zone. A zone can be marked automatically after calibrating a camera during installation and marking the zone for the specific tee box. Multiple zones or tee boxes can be marked and stored within the AI enabled camera or RMS for use in detecting when a golfer enters the tee box.

Upon detecting the user, the method can proceed to step 822 and can validate the golfer on the tee box. As described above, various objects may have been identified at steps 812 and 814 and can be used to identify the golfer when the golfer is present on the tee box. If a golfer is not valid, or may be a golfer that is not to be recorded for a lack of I.D., the method returns to step 820 and detects when another user may be present on the tee box. At block 822 when a valid golfer is detected, the method proceeds to step 824 and records the golfer on the tee box. The method then proceeds to step 826 and determines if the golfer has left the tee box. Various methods as described herein can be used to detect the golfer on the tee box. If the golfer has not left the tee box, the method proceeds to step 824 and continues to record the golfer on the tee box. If at step 826 the golfer has left the tee box, the method proceeds to step 828 and stops recording the golfer.

Upon stopping recording, the method can proceed in two directions, one process detects if another golfer is present and the other processes the captured video. Each of the processes can be done in a series or in other forms, can be done at the same time. In this manner, video of a first golfer can be processed and uploaded while video of a second golfer can be captured allowing for efficient capture and processing of video for each golfer and reduced delays of when a golfer may receive their recorded video.

As such, at step 830, the method accesses video and audio that was captured for the golfer and to step 832 to process the media. For example, the video and audio may be digital recordings that include time stamps for each frame. However, the frames may not be in sync with each other. Additionally, the audio file or audio track for the specific time period may not be overlayed with the video that was captured at the same time. As such, each media rile can be processed, aligned and incorporated into one media file as needed or desired.

Upon processing the media, the method can proceed to step 834 and can detect when a golf ball strike occurred. For example, the media file, video file, and/or audio file can be accessed to detect when a golf ball was struck by the golfer. When accessing the video file, the method can scan the image data of the video file using image processing to identify a golf ball moving from frame to frame. The method can also use AI golf logic to detect a golf club at a specific location and a golf ball departing from the specific location within the frame. In another form, the audio file can be accessed to listen when a golf ball may have been struck. For example, the method can include accessing the audio file to compare or look for a golf ball striking sound and can identify that specific frame of when the ball was stuck. In another aspect, the media file, or both the video and audio file can be accessed to detect a visual image or frame of when the golf ball was stuck and an audio frame of when the ball was stuck. Upon identifying when the ball was stuck, the method can proceed to 836 and the beginning of a video segment can be identified. For example, an average golf swing can take less than two seconds. As such, a golf ball strike can be used to identify a 2-3 second period or frame period prior to the ball strike. Additionally, the method can identify the frame when a golfer is leaves the tee box. In this manner, a beginning and end portion of the video can be identified and the method can proceed to step 838 and slice the video into a final segment. In this manner, a reduced version of the video that was captured by the AI enabled camera can be created and uploaded in an efficient manner thereby increasing upload speeds and reducing the cost for uploading video. Although illustrated as slicing the video segment in a certain way, it can be appreciated that other combinations of identifying video and audio segments can be deployed with the overall benefit of reducing the video and audio file sizes for subsequent uploads and processing. Various video formats and media file sizes, such as 8K and 4K video, may be too large to communicate via a cellular network. As such, the method at step 840 can process larger video formats can be transformed into an H.264 format and uploaded as an HD, UHD or other digital media file formats as needed. The method can then proceed to step 842 where the video can be uploaded to a network location for additional processing or to a destination. In one form, the session I.D. can include a network destination for uploading a video for additional processing by an RMS, NMS, or other device or service. Additional data files can also be uploaded using the session I.D. including, but not limited to, data files, operating files, control logs, meta data, sensor data, radar data and other forms of data or information files that can be uploaded with the processed video.

At step 828, the method can also proceed to step 846 and detect if another golfer has been detected. If another golfer has been detected, the method proceeds to step 804 and repeats as needed. If at step 846, no additional golfers are detected, the method can proceed to step 848 and the camera and microphone can be placed in an idle or reduced power state. The method can then proceed to step 800 and repeat.

The method of FIGS. 8A-8B can be configured in a variety ways or methods sequences in a particular embodiment, allows for efficient capture, process, and distribution of user experiences on a golf course. The method of FIGS. 8A-8B allows for detecting when a specific QR code is scanned at a golf course, and activating an AI enabled camera to identify a golfer, and to record and process the golfer's video using AI objects and video slicing to create an efficient upload of a video with reduced delays.

Figure 9A:
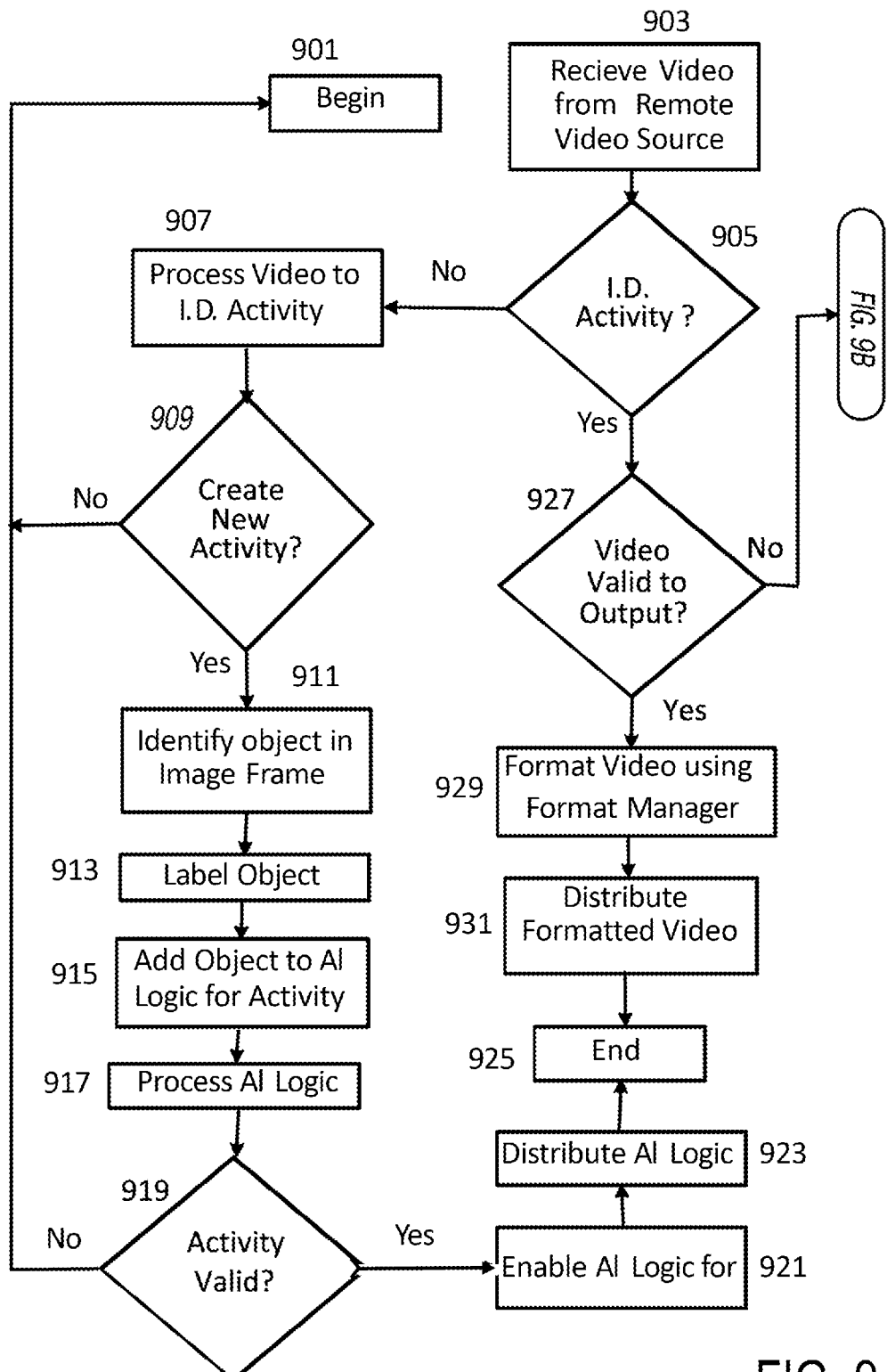
FIG. 9A illustrates a first portion of a method of autonomous media post processing according to an aspect of the present disclosure.
Figure 9B:
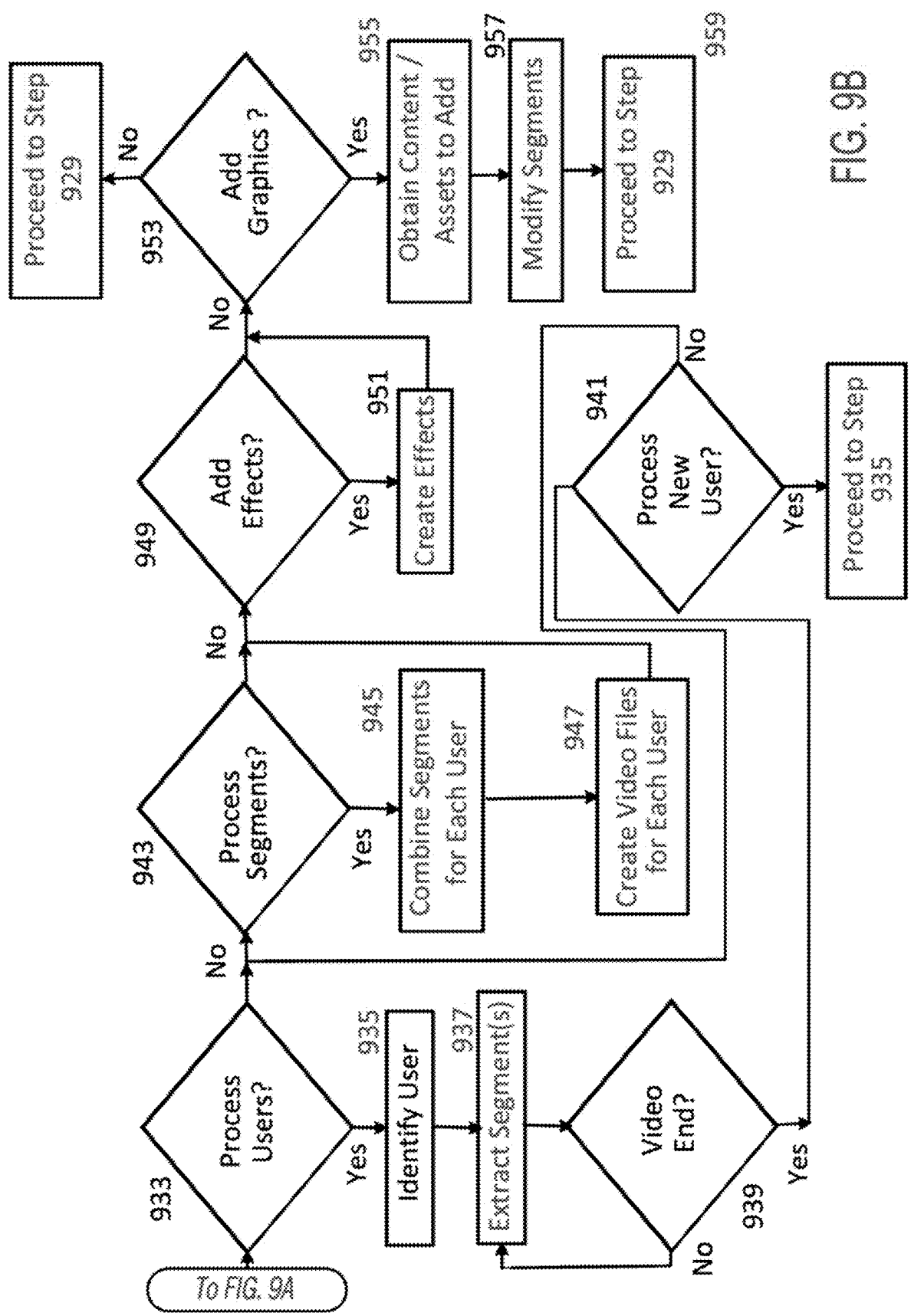
FIG. 9B illustrates a second portion of a method of autonomous media post processing according to an aspect of the present disclosure.
Figure 10A:
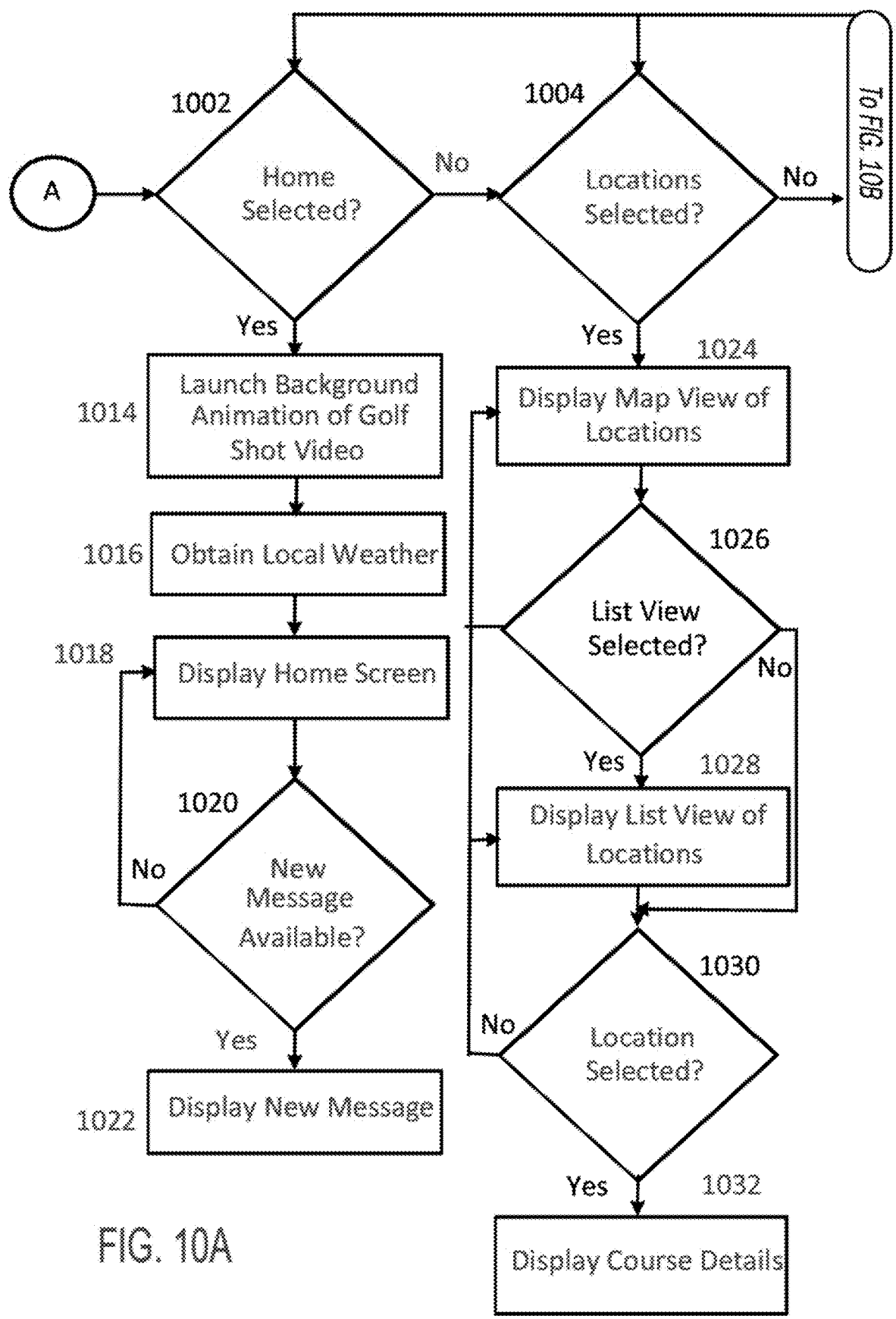
FIG. 10A illustrates a first portion of a method of using a media enabled mobile application according to an aspect of the present disclosure.
Figure 10B:
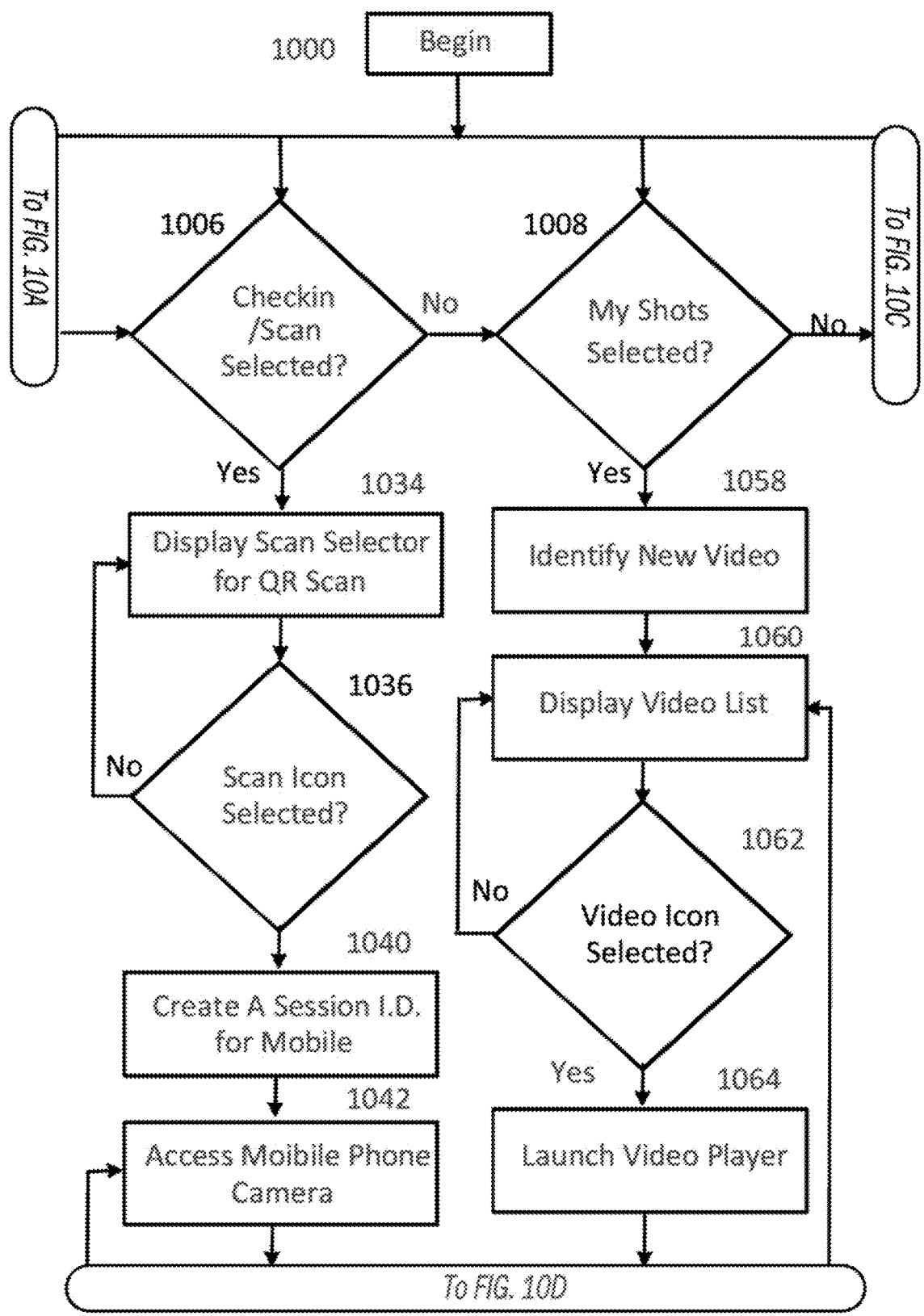
FIG. 10B illustrates a second portion of the method of using a media enabled mobile application according to an aspect of the present disclosure.
Figure 10C:
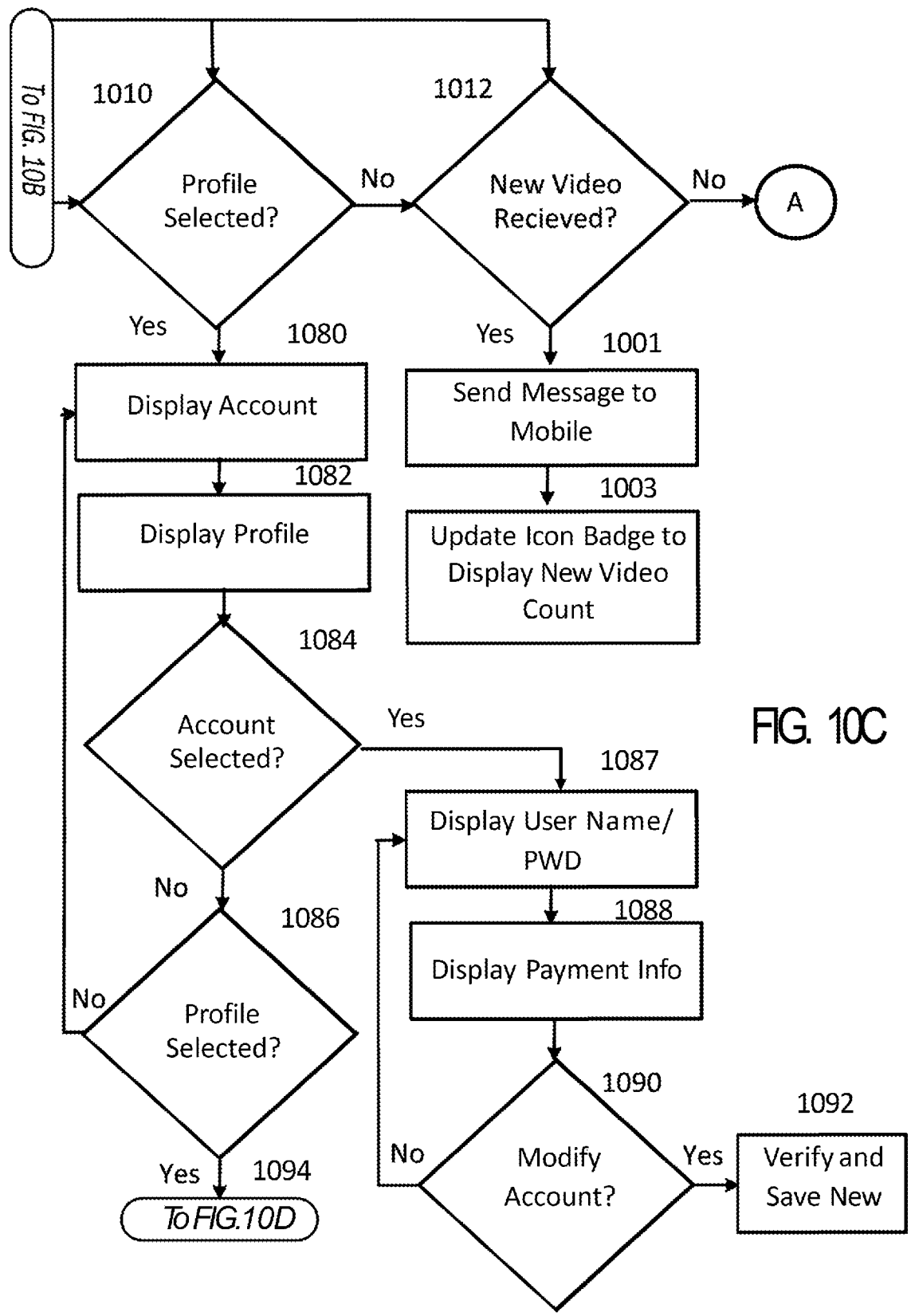
FIG. 10C illustrates a third portion of the method of using a media enabled mobile application according to an aspect of the present disclosure.
Figure 10D:
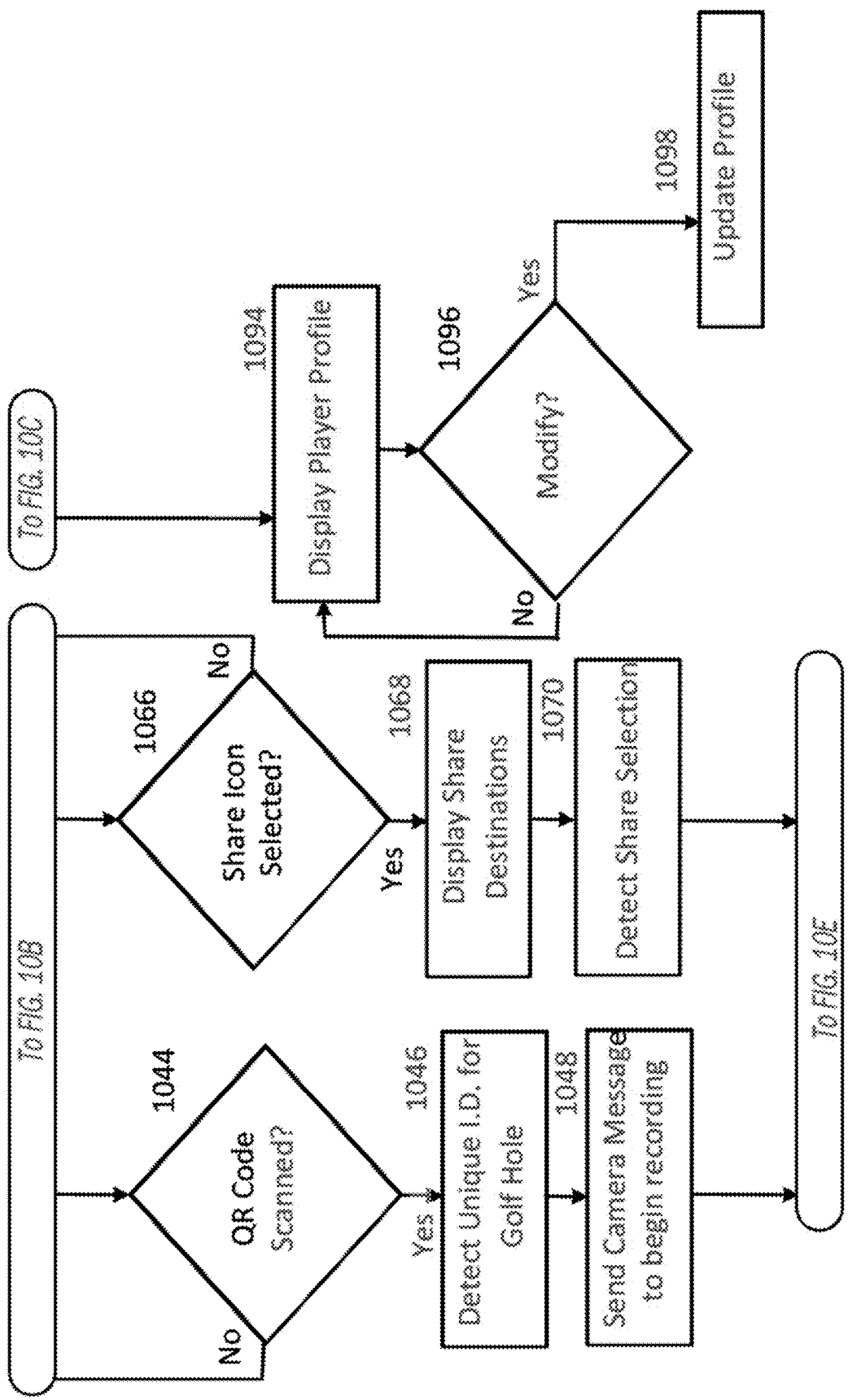
FIG. 10D illustrates a fourth portion of the method of using a media enabled mobile application according to an aspect of the present disclosure.
Figure 10E:
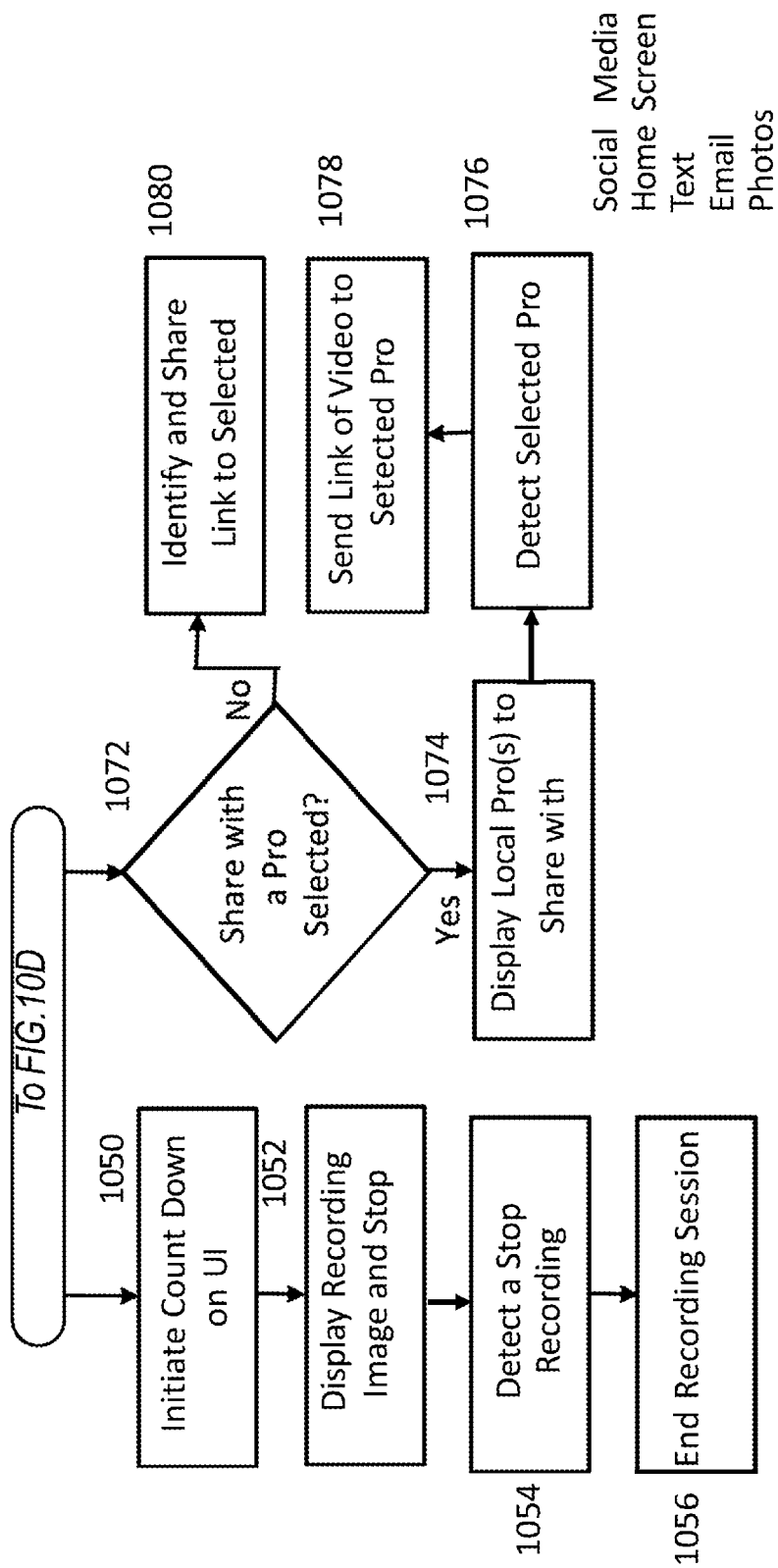
FIG. 10E illustrates a fifth portion of the method of using a media enabled mobile application according to an aspect of the present disclosure.

FIGS. 9A-B illustrates a method of autonomous media post processing in accordance with an aspect of the present disclosure. The method may be used by one or more of the systems, devices, processors, modules, software, firmware, or various other forms of processing to carry out the method described in FIGS. 9A-B. Additionally, FIGS. 9A-B may be realized as within various portions of FIGS. 1-8B and 10-11, and in some aspects, may be modified to include various functions, uses, and features described therein.

The method begins generally at step 901. At step 903, when video is received form a remote video source, the method proceeds to step 905 to identify an activity within the video. Various activities as described herein can be stored within various AI logic that has been created using Machine Learning as a Neural Network. Portions of the video can be compared to the AI logic and if an activity is not detected, the method can proceed to block 907 and process the video to identify a new activity. In some forms, processing can include tagging or identifying objects within the video that are unique to an activity and can be used by the Machine Learning for one or more activity. Upon processing the video, the method proceeds to block 909 to determine if a new activity should be created within the Neural Network. For example, various activities as described herein can be identified but in some forms, a sub-activity within an activity category can be created as well. An example of this activity can include, in one form of a golf activity, a golfer slicing or hooking a ball, a golfer throwing a club, a golfer high living another golfer, a golfer making a hole-in-one, or various other activities or sub activities that may be created. If an activity should be created, the method proceeds to step 911 and identities the object or series of objects that can be used and exist within an image frame of the video. The method can proceed to step 913 and label the object(s) identified and then to block 915 where the object or frame can be added to the AI logic for that activity. In some forms, if the activity exists, the object can be added to the Neural Network of the activity, and in other forms, if the activity does not exist and a Neural Network is not available, the method can generate a new Neural Network and Machine Learning instance to be used within the AI Logic. The method then proceeds to step 917 and processes the AI Logic and to step 919 to determining if the activity is valid and can be released within the AI Logic. For example, the accuracy of a Neural Network can include dependencies on the number of objects identified and provided to the Machine Learning instance for that activity. If only one instance exists, the AI Logic will likely fail. As additional objects are identified and used within the Machine Learning instance, the AI Logic has a statistically better chance of identifying the activity. If additional objects for that activity are needed, the method proceeds to step 901 until additional video is received. If at step 919 the activity is now valid, the Machine Learning instance can enable AI logic for that activity at step 921, and proceed to step 923 to distribute the AI Logic to various locations as needed. The method then proceeds to step 925 and ends. The method may include zooming in on the video, zooming out on the video, or panning within the video, and the degree to which zooming in/out or panning may be determined by the AI Logic based on detected aspects of the video. The zoom and pan aspects may be performed automatically.

If at step 905 an activity is identified, the method proceeds to step 927 and determines if the video is valid to output or store. For example, a local video processor may have processed the video sufficient for distribution. As such, a remote video processor, such as system 900 can detect if the video requires any additional processing using data provided with the video. If the video is valid to output, the method can proceed to step 929 and format the video using a format manager. For example, a video may need to be formatted to be output to a mobile device or application having specific formats, file size, and other specifications required in connection with posting a video. Video provided to various locations and applications can include Facebook, Youtube, Instagram, Snapchat, and other applications. Each app being utilized may require it's own formatting for publishing into a specific network. As such, a format manager can determine one or more locations for the video and format accordingly. In other forms, the video can be processed to be distributed to a network location having a high definition or 4K video output on a stationary output device such as a specific monitor. Various types of formatting may be used for the video to output to various destinations. Upon formatting the video, the method proceeds to step 931 and distributes the formatted video using a distribution manager. For example, the video may be a single instance that is distributed to a cloud storage account configured to store the video. However in other forms, the video may have been formatted into multiple formats, thus creating multiple videos that may need to be distributed. As such, at step 931 the video is distributed to those destinations. The method then proceeds to step 925 and ends.

If at step 927 the video is not valid to output, the method proceeds to process the video. For example, the method includes 3 different types of processing that may be used to process the video and are provided in no particular order but only as a reference for illustrating processing of the video. At block 933, the method determines if one or more user processing needs to be performed. For example, a local video processor may have provided information for a specific user recorded in the video. As such, that information can be used to identify the user within the video. Various types of identification can be used including facial recognition, geofencing, CPS or Location Services location identification, grid identification, manual input from a mobile app of the user, or various other triggers that can be used to identify the specific user within the video. The method can also use AI Logic to identify the specific user and characteristics, details, and or objects of that user can be provided with the video. Upon identifying the user, the method proceeds to step 937 and extracts segments of video as they relate to the user. For example, a user that is identified may be a football player having a specific jersey number and name. The method would locate all segments of the video where the football player is present, and extract those segments from other players. In another form, a golfer may be playing a hole on a golf course with other players and the video may include numerous other shots or activities taken by the other golfers. As such, the method can identify the specific user and activity within various segments of video and remove the segments that don't include the user. In this manner, a video of just the golfer can be created. Upon extracting the video segments, the method proceeds to step 939 to determine if the end of the video has been reached. If it hasn't, the method proceeds to step 937 and repeats. If the video has ended, the method proceeds to step 941 and determines if the video should be processed for a new user. For example, as mentioned multiple golfers or players may be a part of the same video captured. As such, when desired a new user can be identified at block 935 and the method can proceed as described above. In this manner, multiple segments that are unique to a specific user can be extracted from a single video thereby reducing the number of video uploads needed for processing. For example, on a football field, a single video can be uploaded and the method can extract the video footage for each player thereby creating unique video segments for each player that can be provided to each player, their teammates, coaches, and the like. Although at block 941 multiple users may be detected, the method may not desire to extract video segments for all users and may include a profile from a profile and content manager to extract only certain user's segments.

If at step 941 the method determines that no additional user segments should be extracted, the method can proceed to step 943. At step 943, the method determines if the segments require further processing. For example, if only a single segment of video is extracted, no additional processing to combine segments may be needed. If at step 943 the video segments require additional processing, the method proceeds to step 945 and combines the segments for each user into a single video. For example, the segments can be extracted and stored as portions of a video or video segments. At step 945, the segments can be combined together to create a single composite video for a user. Upon combining the segments, the method proceeds to step 947 and combines video segments for any remaining user to create a video unique to each user. As such, an individual participant can have their own video with segments created for their unique experience.

Upon processing the video if needed, the method proceeds to step 949 and determines if any effects need to be added to the video. For example, a content manager, such as the content manager 422 in FIGS. 8A-8B or other autonomous content manager, may identify a video of a golfer that was playing a certain golf hole at a resort such as Omni Barton Creek. The content manager may have stored an introductory video of a drone flyover of the golf hole being played and may add the introduction video to the user's video segment. In other forms, animated graphics illustrating the distance to the hole can be drawn from a tee box to the green from a 'top down' view of the hole. Other effects can also include adding audio or additional captured video of the user and other players at the activity. In one form, portions of a segment of the video may be identified or tagged to add a tracer to the movement of the ball as a part of creating effects. In other instances, AI Logic can be used to detect when a ball is located around the green in a location that is not desired by the golfer. In that instance, an augmented elect can be added to the video when a ball goes into the woods, a sand trap, a water hazard and the like. An augmented effect can include an animated video overlay. For example, an animation of a Loch Ness Monster stealing the golf ball as it enters the water hazard can be added to the video segment. Other animations can also be used and added as needed or desired. In this manner, an augmented reality can be added to the video for the user. According to a further aspect, the video may add a ball tracing effect to a shot made by a golfer. For example, the method can be used to identify a golf ball within the frames of the video and add a colored trace line to each frame to show the path of the ball. If the video includes video segments of the ball coming into the green, the trace can be added to the video as ball lands onto the green. In some instance, AI logic or image processing can be used to locate the ball in a frame and, in some cases, the video may be reversed after the ball is located on the green. For example, when a user approaches his or her golf ball on the green. AI logic or image processing can identify the user and add effects or other content prior to the user picking up the ball or addressing the ball. In this manner, through reverse processing of the video data, the ball can be traced back in previous frames or segments and the video can be modified for that specific user accordingly. In another form, an effect can include audio effects, music, or sound added to the video. For example, music can be added throughout all or portions of the video and can include various audio levels. Unique sounds can also be added to the video based on what is happening in the video. For example, a user may hit the ball into the woods and a 'chainsaw' sound, clapping sound, laughing sound, applauding sound or other sound effect can be added to the video segment. In another form, AI Logic or image processing can be used to identify when a golf ball goes in the cup and a 'ball dropping in the cup' sound effect can be added. Effects can be predetermined based on the activity or sub-activity identified by the AI logic. In this manner, the method can access a label within a video segment and automatically add the effect desired to portions or segments of the video.

After adding an effect if desired, the method proceeds to step 953 and determines if graphics need to be added to the video. If no additional graphics need to be added, the method proceeds to step 929 and ends. If additional graphics are to be added, the method proceeds to step 955 and obtains the content or graphics to be added from and assets resource such as assets 914 using content manager 422 of FIGS. 4A-4C or other asset or content resources as needed or desired. Assets or graphics can include one or more graphic to add to a video image or video segment. For example, graphics can include information such as the name of the golfer, the date, the golf course, the hole #, the distance to the hole, the club used by the golfer, current weather conditions, the max height of the ball or after it is hit, the speed of the ball after it is hit, the curvature of the ball during flight, the max distance the ball travelled, the current stroke or number of strokes taken, the par for the hole, other player info currently playing with, or other player information or course information as needed or desired. According to another aspect, the golf course can include graphical assets to be added to a segment of the video such as the name of the golf course, a logo of the golf course, the age or when established, the current pro's name, the owners name, or various other types of marketing assets or graphics that a golf course may desire to be added to a video segment. Although discussed as adding assets for the golf industry, other graphical assets can be added to the video as needed or desired. Upon obtaining the graphical assets the method proceeds to step 957 and modifies the segments adding the assets or graphics to specific video image or segments. The method then proceeds to step 929 where the method ends.

The method of FIGS. 9A-13 can be modified as needed to combine or remove various portions as needed. For example, upon identifying an activity or sub-activity at step 905, the method can be used to segment video and further process the video segments to identify a sub-activity. The segment can be labeled as having that sub-activity and a label can be further used to process the segments, add effects, add graphics, or various other types of processing of the video segment. In this manner, an automated process using AI Logic can efficiently edit and process a video without the need for having an individual modify and edit a video manually.

If the video is valid to output, the method can proceed to step 929 and format the video using a format manager. For example, a video may need to be formatted to be output to a mobile device or application having specific formats, file size, and other specifications required in connection with posting a video. Video provided to various locations and applications can include Facebook, Youtube, Instagram, Snapchat, and other applications. Each app being utilized may require it's own formatting for publishing into a specific network. As such, a format manager can determine one or more locations for the video and format accordingly. In other forms, the video can be processed to be distributed to a network location having a high definition or 4K video output on a stationary output device such as a specific monitor. Various types of formatting may be used for the video to output to various destinations assets 914 using content manager 422 of FIGS. 4A-4C or other asset or content resources as needed or desired. Assets or graphics can include one or more graphic to add to a video image or video segment. For example, graphics can include information such as the name of the golfer, the date, the golf course, the hole #, the distance to the hole, the club used by the golfer, current weather conditions, the max height of the ball or after it is hit, the speed of the ball after it is hit, the curvature of the ball during flight, the max distance the ball travelled, the current stroke or number of strokes taken, the par for the hole, other player info currently playing with, or other player information or course information as needed or desired. According to another aspect, the golf course can include graphical assets to be added to a segment of the video such as the name of the golf course, a logo of the golf course, the age or when established, the current pro's name, the owners name, or various other types of marketing assets or graphics that a golf course may desire to be added to a video segment. Although discussed as adding assets for the golf industry, other graphical assets can be added to the video as needed or desired. Upon obtaining the graphical assets the method proceeds to step 957 and modifies the segments adding the assets or graphics to specific video image or segments. The method then proceeds to step 929 where the method ends.

According to another aspect, at step 953, the method can also include post-processing to include graphics or video enhancements. In one aspect, the player's name may be provided on the screen prior to their shot. In another aspect, the player's score may be provided on the screen. In another aspect, the club being used may be displayed. Various other graphics may be overlaid on the screen to provide a video resembling a professional broadcast. The graphics overlaid on the video may include various data associated with the player or the shot being played.

FIGS. 10A-10E illustrates a method of using a media enabled mobile application according to an aspect of the disclosure. The method can be used to output user interfaces illustrated in FIGS. 5A-D and can be provided within an application that can be used, in whole or in part, on a mobile phone, tablet, smart watch, golf cart, pull cart, push cart, powered "follow-me" cart, laptop computer, or any other mobile device. It will be appreciated that mobile application with user interfaces 5A-D and the method of FIGS. 10A-10E may also be installed/embodied/accessible on other devices, such as traditional computers, Internet browsers, and the like.

The method begins generally at step 1000 where the method proceeds to display a UI and background processing within a mobile application. A series of decision trees can be activated upon launch the method of FIGS. 10A-1.0E and can be activated by selections within a user interface or processes running within the mobile application. Each decision tree will be described in response to the activation and need not be deployed in the order presented within FIGS. 10A-10E and can be deployed in multiple different orders. Additionally, an "A" with a circle illustrate locations to loop from and to locations within the decision tree sequence illustrated. Other loops can also be used as needed or desired.

At decision block 1002, if a home button within a UI of a mobile app is selected, the method can proceed to step 1014 and a background image or animation of a golf shot can be displayed within a user interface. The animation can be portions or all of a media file created using AMPS 100 or other media processing systems provided herein. In other forms, a user can tag a video to be presented as a background animation for the home screen. Upon displaying the home screen, the method proceeds to step 1016 and obtains local weather data using a weather service based on the current location of the mobile application. Upon obtaining weather conditions, they may be presented at step 1018 within the home screen of the mobile app. The method then proceeds to step 1020 and determines whether a new message may be available to be presented within a message area of the home screen. Messages can be provided from golf course, other golfers, weather messages, and other forms of content. In other forms, messages can also include notifications from other golfers, notifications from the mobile app provider about new course openings, regional golf information, links to golf videos or daily or weekly golf videos created, and various other types of media content that can be presented to a golfer. If a new message is available, the method proceeds to step 1022 and displays the new message within the home screen. If a new message is no new messages are available, the method proceeds to display the home screen without a current message.

At decision block 1004, if a locations icon is selected within a mobile app, the method proceed to step 1024 and a map view of locations having AI enabled golf courses are displayed within a location map of the mobile app. For example, a the mobile app can access Google maps and determine a GPS location of a golf course having AI enabled technology, and add a graphical icon of a camera that can be selected within the map view. The method can then proceed to decision step 1026 to detect if a list view of AI enabled golf courses was selected. If a list view was not selected, a map view continues to be presented within the user interface. If a list view is selected, the method proceeds to step 1028 and displays a list of available golf courses. The method then proceeds to step 1030 an detects if a location has been selected. If location has not been selected, the method proceeds to display the list view or the map view that was previously chosen. If at step 1030 a location is selected, then the method proceed to step 1032 and displays course details of the AI enabled golf course. For example, course details can include the name and location of the course, website or tee time purchase site, a golf hole description of the hole including yardage, a graphic of the hole, a drone flyover, or other hole information. In one form, if a hole has one or more competitions such as a closest-to-the pin, hole-in-one, longest drive, or other competitions, the payout amounts for a specific hole, competition, and terms can be presented. In some instances, more than one golf hole at a course may have a competition and a list of golf holes and payouts may also be presented within the user interface.

At decision step 1006, if a check in or scan icon selection is detected, the method proceed to step 1034 and displays a check in or scan icon for a golfer to select when they are present at a golf hole having an AI enabled camera. The method then proceeds to step 1036 and detects if the QR scan button is selected. If the button is not selected, the method proceeds to step 1034. If the QR scan button is selected, the method proceeds to step 1040 and creates a session I.D. for the mobile application and user. For example, a Session I.D. can include a mobile phone identifier, a user identifier, date and time, location, of the mobile. Upon creating a Session I.D., the method proceeds to step 1042 and access the mobile phones camera and opens the view finder to allow a user to scan a QR code present at the golf hole. A QR code will be presented near a tee box of a hole being played. The QR code is a unique code is generated for a specific hole on a specific golf course at a specific tee box, and can also include an RFID tag embedded underneath to further assist with authenticating a QR scan.

In another form, at decision block 1044, if a golfer scans the golf code, an AI Enabled camera at the golfhole can capture an image of the individual and process the image using AI to identify or tag the golfer. In addition, the method can add a time stamp to the session I.D. and the AI enabled camera can add a time stamp to the image captured. The method can then proceed to provide the session I.D. and have the image captured tagged with one or more identified objects of the golfer, such as clothing color, height, skin tone, or various other attributes that can be identified using AI logic. The image data can be used by the AI logic and a NN to detect features of the golfer.

Upon scanning the QR code at step 1044, the method proceeds to step 1046 and detects the unique I.D. within the QR code for the Golf hole and proceeds to step 1048 and sends a message to the AI enabled camera to begin recording the golfer. The message can be communicated via the session I.D. and can include the unique I.D., a player name or I.D., date and time stamp, detected A.I. attributes or features, or various other types of data that can be used to initiate a recording of the golfer. The method can then proceed to step 1050 and initiate a count down in seconds of when the user should take their shot. Although as suggested, the AI enabled camera is already recording, providing a countdown provides a golfer a time table to initiate hitting their shot. Once the countdown reaches zero, the method proceeds to step 1052 and displays a recording image with a blinking icon to indicate that the cameras are recording the shot. Also at step 1052, the user interface will show a stop recording icon to allow a user to stop recording the shot when the shot is done. The method can then proceed to step 1054 and detect if the camera should stop recording the shot. For example, a user can select the stop recording icon and a message can be sent to the AI enabled camera to stop recording the user. In another form, a user may forget to select the stop recording icon. If needed when this occurs, the method can include detecting when a second user start a new session, can use a time interval such as 1-5 Minutes to end the session. In other forms, the method can also use the AI enabled camera to detect if the user is present on the tee box, or a motion sensor to detect if there is no one present on the tee box any longer. The method can also use the GPS within the mobile phone to detect if a user is walking away from the tee box and in some forms can use an accelerometer within the mobile device to detect if a user is walking or riding in a golf cart. Various combination of methods described above can be used to detect when a user is present or not present on the tee box. Upon detecting a lack of presence, the method proceeds to step 1054 and stop recording by sending a signal to the AI enabled cameras, and then proceed to step 1056 and end the recording session.

At decision step 1008, when a my shots icon is selected, the method proceeds to step 1058 and identifies if a new video has been received. If a new video has been received, a "new" bubble icon is added to a first image of the video, and the method proceeds to step 1060 and presents a list of videos to a user within the user interface. In one form, the videos can be presented in a list view with the newest video at the top of the list. In other forms, the list can be presented after a search, or in other forms presented as oldest to newest. In another embodiment, the method can be modified to include a groups icon that will allow a user to view various groups, videos, and message boards for golf shots made. For example, a group can include each of the individuals that took a shot with the user that day. However, in other forms, it can include groups that all may have played the same golf course that day. In other forms, a group can be a select group of golfing buddies that may be playing various other courses and want to share video with the user.

Upon displaying a video list, the method proceeds to step 1062 and detects whether a video has been selected to be viewed. If a video has not been selected, the method proceeds to step 1060. If a video has been selected, the method proceeds to step 1064 and a video player can be activated to view the selected video. The video player can be a player resident to the mobile device. In other forms, the video player can be a network-based video player that can be used to play videos on a mobile device. Additionally, the player can include various controls to allow a user to stop, start, pause, scrub, mirror, and download the selected video. Various other actions can also be used while watching the video. Additionally, the player need not be 'activated' until the user selects the play button and can be presented within the user interface with other selectable elements and content such as illustrated in FIG. 5C.

Upon launching the video player, the method can then proceed to step 1066 and detect whether a share icon has been selected. For example, a share icon can activate a list of destinations that can be selected to send or share a video to. The destinations can include, but are not limited to, any app available to a user's mobile device in share mode such as Facebook, Instagram, twitter, Snapchat, Pinterest, Youtube, the current app, or other apps as needed or desired. A destination can also include saving the app locally to the mobile device or with a cloud service for storing videos and photos. The method can also include presenting a watch my video selector, copy video selector, a copy link selector, and a delete selector to delete the video. At block 1068, the method can also display a share with a pro icon within the user interface. A share with a Pro icon allows a user to select a local golf professional at the course the video was captured to share with. For example, the video can include a location I.D. where a video was taken, and a local pro for that golf course can be shared with to obtain a golf tip on the video.

At block 1070, a share selection is detected, the method proceeds to step 1072 and detects if a share with a pro icon has been selected. If a share with a pro icon is not selected, the method proceeds to step 1080 and identifies the selected destination, and shares a link to the video to the selected destination. In one form, the method can add default text for the video such as "Look at my hole in one". "Here's my shot from Pebble Beach", "Hanging with my buds at TopGolf", or various other messages that can be created as a default based on the location the video was taken. In other forms, a user can provide their own message to add to the video link and can send the link to the desired destination.

If at step 1072, a user selects to share with a professional, the method proceeds to step 1074 and displays a list of professionals that are local to the course where the video was taken. For example, a golf course may have multiple professionals and list of each professional for that course may be presented. In other forms, the method can be modified to only present a list of professionals that may be present at the course that day, or may want to be a part of providing tips to golfers. In another form, there may be no professional present and the share with a pro icon may not be presented within the user interface, or an empty list may be presented with a "come back soon" or similar message within the user interface. Upon a user selecting a pro if available, the method proceeds to step 1076 and detects which pro to share with, and then to step 1078 and sends a link of the video to the selected pro. The link can be sent via a text message, email, in-app message, notification or various other communication and can include a message such as "Jon Lux shared a video and would like a free tip" or various other messages that can be modified or added. In one form, the message can be sent as a text message which may or may not include the actual mobile numbers of the sender and/or receiver. The method can be modified to allow a user or pro to not allow their mobile numbers to be shown as a part of the text message. This method can also be used for email, in app messaging, notifications, or various other forms of communication.

At step 1010, when a profile icon is selected, the method proceed to step 1080 and displays account icon and to block 1082 and displays profile icon for the user. At step 1084, if the account icon is selected, the method can proceed to step 1087 and displays a user name and password section and then to step 1088 and displays a payment information section. The method can then proceed to step 1090 and if a user selects a section to modify, the user can modify the selected information. For example, a user can enter a new user name, password, email address, privacy settings, or other various other types of account information. In one form, the method can also provide a terms and conditions link with the terms and conditions that can be viewed or accessed by the user. According to another form, a user can add payment information as a part of their account information. For example, payment information can include traditional payment such as credit card information but can also include other payments such as Venmo, Paypal. Bitcoin, or various other payment methods. Payments methods can be used to pay for rounds of golf scheduled via the mobile app, competitions or games such as closest to the pin, hole-in-one, longest drive, competitions. Payments can also be used to pay for individual or group bets that may be played on the golf course between the user and other users. If at step 1090 an account is modified, the method proceeds to step 1092 where the new account information can be verified and saved.

If at step 1084, an account section is not selected the method can proceed to step 1086 and detect lithe profile section is selected. If the profile section is not selected, the method can proceed to block 1080. If at step 1086 the profile section is selected, the method can proceed to block 1094 and display the player profile for the user. A player profile can include a player image or photo, a player name which can be different than a user name in the account section, a birth date or month/year, a handicap, a number of rounds of golf per year played, a preferred tees such as pro tees, men's regular, senior tees, junior tees, ladies tees, or other tees. A player profile can also include what ball a player likes to use, and a "What's in the Rag" section which can include the name and types of clubs, putters and wedges the golfer is using. For example, a golf may be using a Callaway Driver, Titleist Hybrid, Mizuno Irons, Volkey Wedges (52 and 60 degree), and a Scotty Cameron Putter. Various manufacturer's can be presented to a golfer when setting up their player profile. Portions or all of the player profile information can be added as media information to the video created for each user. Additionally, player profile information can be stored within a database and used to detect information about each player that can be used to market new products and services to the player depending on their player profile. In this manner, the database can be used to inform users of new products and services that can help a player improve their game and can also serve as a platform for product and service providers to market to. Upon modifying the player profile, the method proceeds to step 1098 and updates the profile. In one instance, the method can be modified to allow a user to send a share the new profile to a select destinations if a user updates portions of their profile. For example, a user may want to share that their handicap changed or they just bought a new driver or putter. Various elements of the player profile can be changed and shared as needed or desired.

If at step 1012 a new video is received, the method proceeds to step 1001 and sends a message to the user's mobile device. The message can be a text message, in-app message, notification, email, messenger app text, or various ways to message that a new video is available to view. The method can also proceed to step 1003 and a badge associated with the mobile app can be modified to show a new video is available. For example, the app name and logo can be updated to show a number of new videos that may be available within the mobile app. In another form, the newest video can be added to the mobile app as a link and an in app icon, such as a my videos or my shots icon, can be updated with the number of new videos. Within the my videos or shots section, a "New" bubble reference can be presented as a partial overlay to the video image of the new video. According to another aspect, step 1012 can be modified to include or add messages. The method can be used to send a message to one or more groups within the mobile app that a new post or video has been uploaded. For example, if a user is included within a group share of the mobile app, a message of an available video for one or more users can be sent to the others within the group to indicate that a video is available. The group message availability can also be added to the app icon or my shots icon as a separate bubble icon having a different color and location on the icon. In this manner, golfer's within a group can communicate messages and videos with each other about videos, shots, competitions, or other messages without having to use a third party messaging platform thereby keeping the overall golf experience within the same app on a mobile device.

Figure 11:
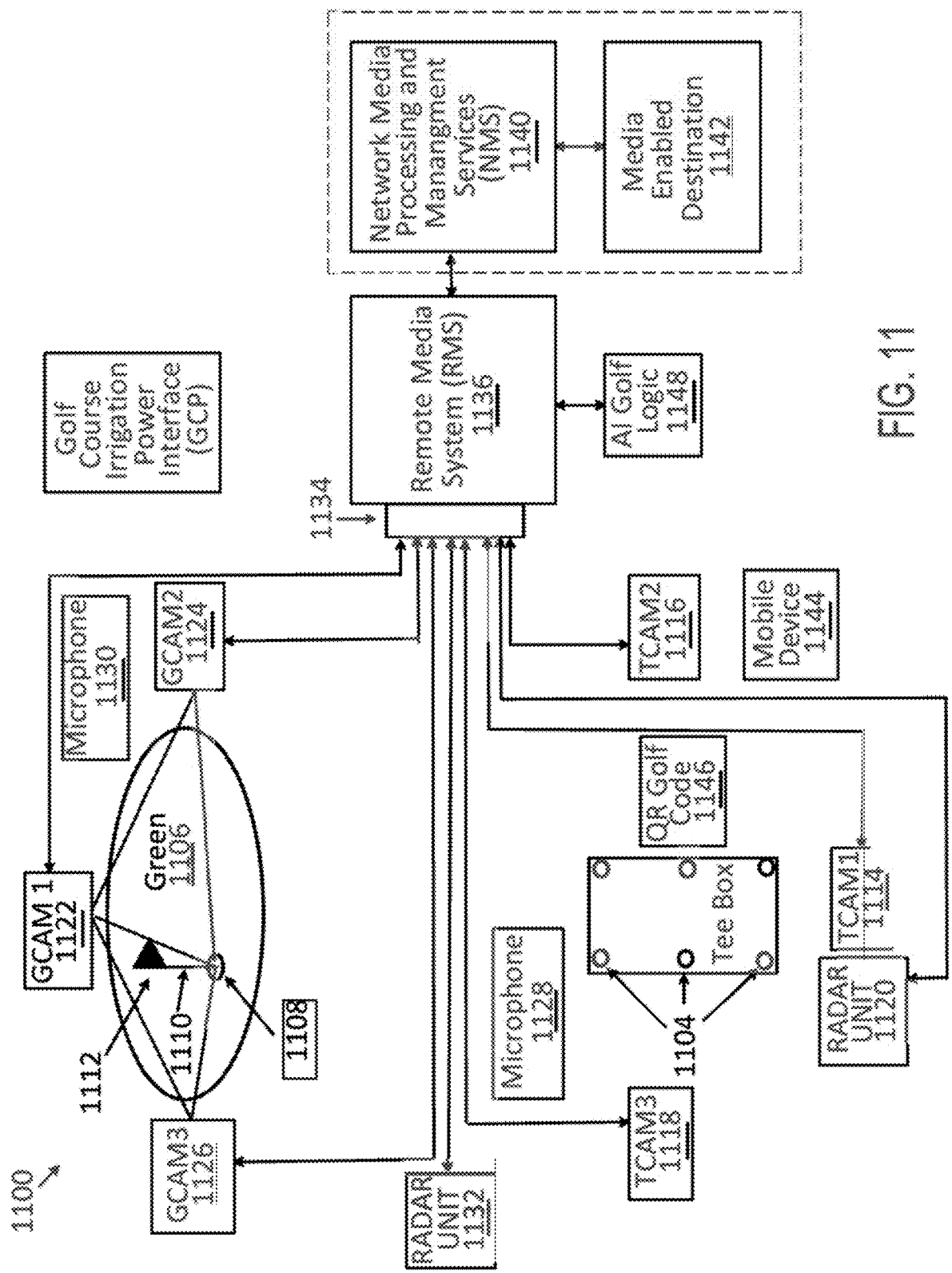
FIG. 11 illustrates a block diagram illustrating a multi-view AI enabled golf hole according to an aspect of the present disclosure.
Figure 13A:
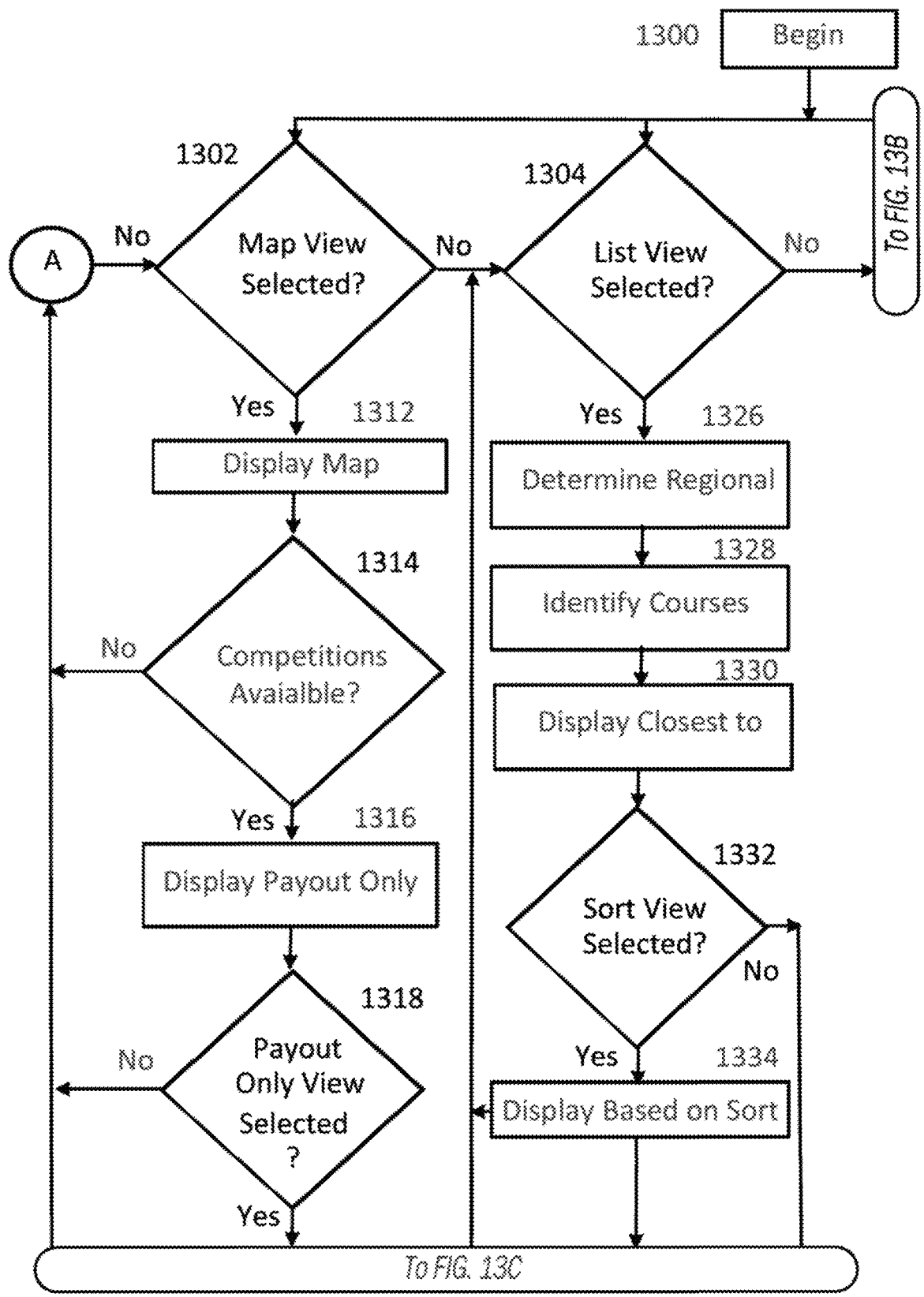
FIG. 13A illustrates a first portion of a block diagram of a method of providing an autonomous golf competition within a mobile application according to an aspect of the present disclosure.
Figure 13B:
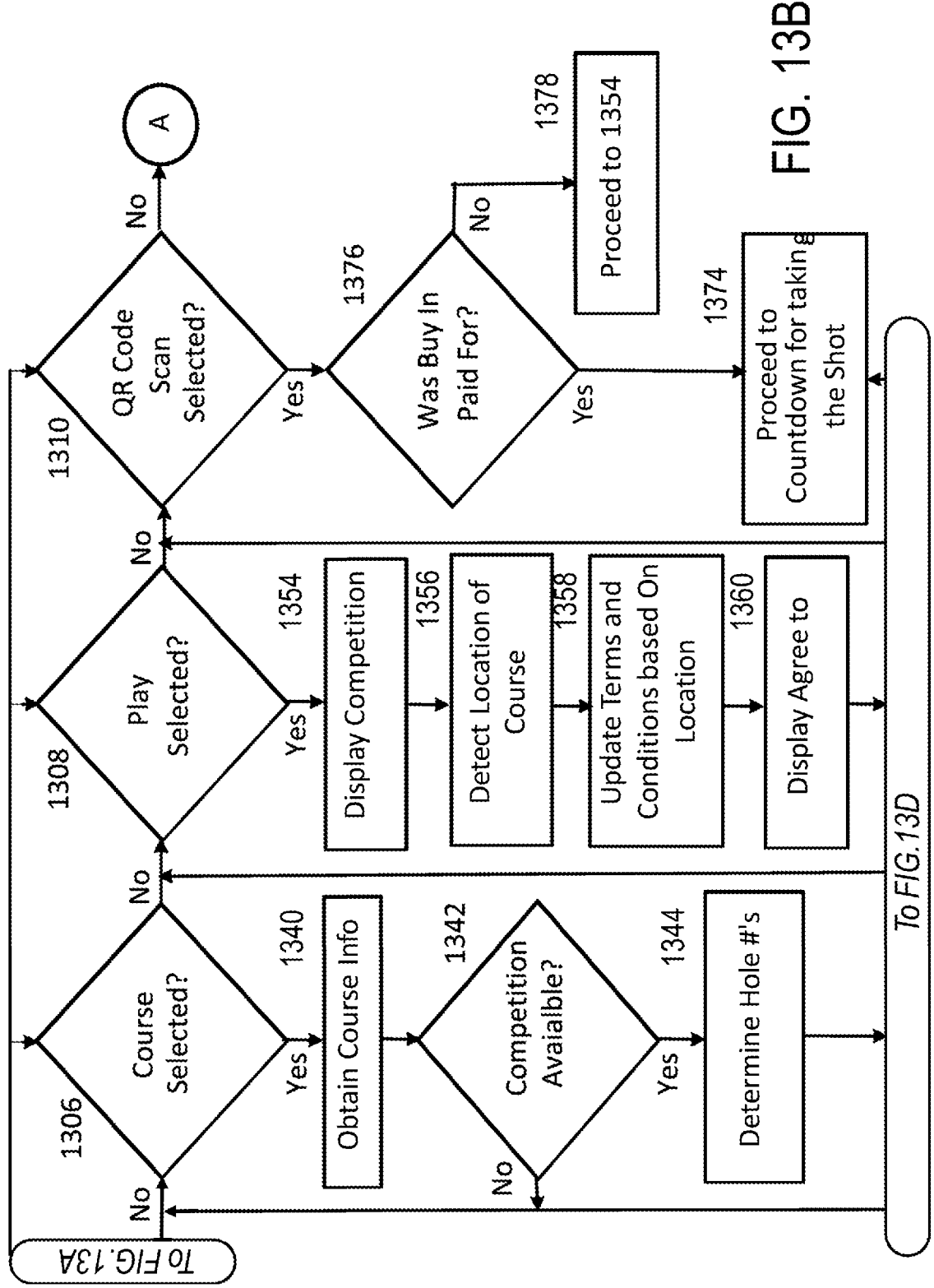
FIG. 13C illustrates a third portion of the block diagram of a method of providing an autonomous golf competition within a mobile application according to an aspect of the present disclosure.
FIG. 13D illustrates a fourth portion of the block diagram of a method of providing an autonomous golf competition within a mobile application according to an aspect of the present disclosure.
Figure 13C:
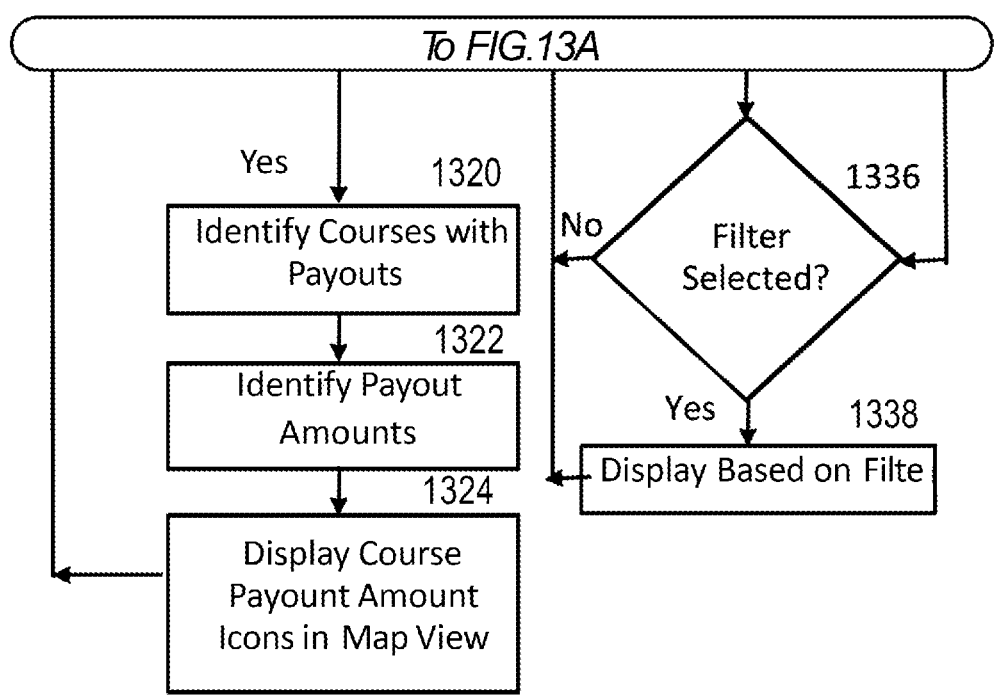
Figure 13D:
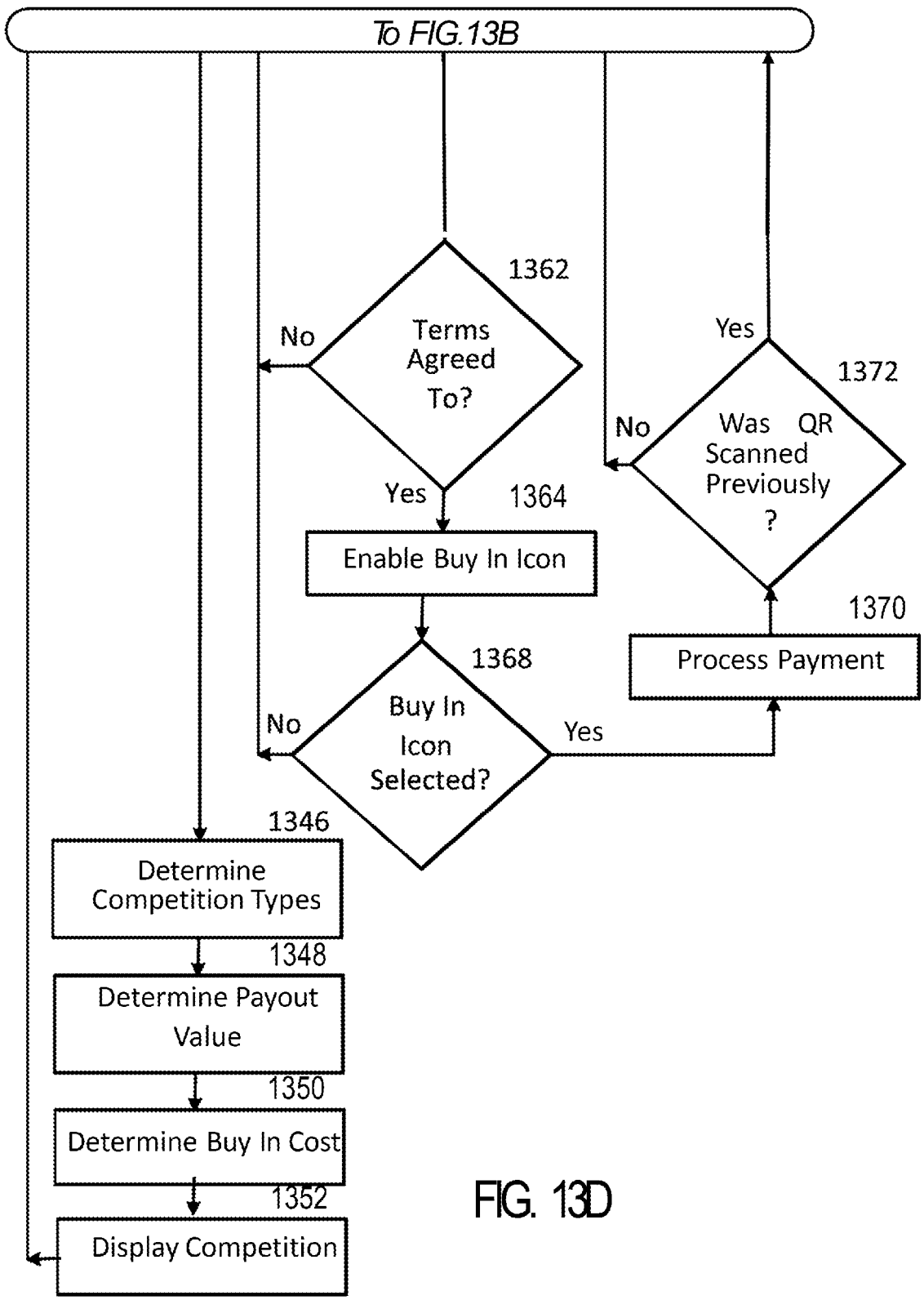

FIG. 11 illustrates a block diagram illustrating a multi-view AI enabled golf hole according to an aspect of the present disclosure. A multi-view AI enabled golf hole (MAIG hole), illustrated generally at 1100, includes a tee box 1102 having multiple tees 1104, a green 1106, having a hole 1108 holding a flagstick 1110 having a flagstick height 1112. Tee box 1102 include a first tee box AI enabled camera (TCAM1) 1114, a second tee box AI enabled camera (TCAM2) 1116, a third tee box AI enabled camera (TCAM3) 1118. MAIG hole 1100 also includes a tee box radar unit 1120 positioned near tee box 1102. Green 1106 also includes a first greenside AI enabled camera (GCAM1) 1122, a second greenside AI enabled camera (GCAM2) 1124, a third greenside AI enabled camera (GCAM3) 1126 located around green 1106. Tee box 1102 also includes a teeside microphone 1128 and green 1106 also includes a greenside microphone 1130. MAIG hole 1100 also includes a second radar unit 1132 positioned away from tee box 1102 and can include one or more sensor arrays to detect motion on MAIG hole 1100. Tee box 1102 also include a QR golf code 1146 at one or more of the multiple tees 1104.

MAIG hole 1100 also includes a communication interface 1134 connecting various components of MAIG hole 1100 to a remote media system (RMS) 1136 having AI golf logic 1148. MAIG hole 1100 further includes a golf course power (GCP) source 1138 configured to power various portions of MAIG hole 1100. RMS 1136 is configured to communicate with a network media processing and management services (NMS) 1140 configured to process video recorded and uploaded to NMS 1140, NMS 1140 is configured to be in communication with one or more destinations 1142 operable to receive digital media created using MAIG hole 1100 and NMS 1140. Also illustrated within FIG. 11 is a mobile device 1144 operable to be used with MAIG hole 1100.

According to another aspect, TCAMS 1-3 (1114, 1116, 1118) and GCAMS 1-3 (1122, 1124, 1126) can be installed and calibrated from time to time on MAIG hole 1100. For example, each camera can be installed using survey and GPS data to capture a precise location and overall height of each installation. For example, some cameras may be positioned higher than others depending on the topology of MAIG hole 1100. By capturing a precise location of each of the cameras, the distances between each of the cameras can be determined and image data can be used to triangulate locations of various objects detected within the images or video captured by each camera. In some forms, one or more cameras may include embedded GAS capabilities to assist with locating the coordinates of an installed camera on MAIG hole 1100. By having the specific location of each of the cameras, distance measurements of objects can be achieved. For example, GCAM 1 1122 and GCAM 3 1126 can be used to triangulate hole 1108, flagstick 1110, flagstick heights 1112, Tees 1104, golfer locations when playing, distance to hole 1108, distance a ball travelled after being struck, distance a ball may be to hole 1108 after landing on green 1106, or various other distances to areas or objects on MAIG hole 1100. Other cameras may also be used. Additionally, various locations on and around green 1106 can be triangulated to create a virtual grid or map of the area of green 1106. By MAIG hole 1100 being mapped using AI enabled cameras (including different grass cuts, fairway, first cut, rough, fringe, sand, water, etc.) that can be used to identify objects within image frames, efficient distance calculations can be created and used during play of MAIG hole 1100.

According to a further aspect, MAIG hole 1100 can include a daily calibration routine that can be managed by RMS 1136 or NMS 1140. For example, depending on the environmental conditions, optical view performance may change from time to time which can cause a camera's focus to drift slightly. This drift can lead to measurement errors of distances of objects within MAIG hole 1100. As such, during an initial set-up, a reference can be provided having a specific height. A reference can be a temporary reference such as a measurement stick or surveyor's pole. In other forms, the heights of the pole for each of the cameras (not expressly illustrated) can be marked and used as a reference for daily calibrations or when image capturing quality may change. In other forms, the height of a flagstick can be used as a reference for determining a specific height to be used to calibrate each of the cameras.

In other form, each of the cameras can be calibrated based on an optical or digital zoom level. For example, if GCAM 1 1122 includes an optical zoom capability of 10×, GCAM 1 1122 can be set to a series of zoom levels (e.g. 1×, 2×, 5×, 10×, etc.) and calibrated using a reference object. In this manner, the overall size of the reference object can be stored within each camera, or RMS 1136 and used to calculate distances. In another form, the number of pixels present at a zoom level of the reference object can be determined and as the zoom level of a camera is changed, the number of pixels will change for each zoom level and can be stored and used later to determine distances of objects. For example, at a 1×zoom level, the number of pixels captured by the reference object may be 1,000 pixels. At a zoom level of 5×, the number of pixels may increase to 5,000. Although described as a 1:5 mapping it should be understood that the number of pixels may vary based on camera type, lens type, temperature, errors in lens travel distances during focus, etc. Various other techniques can also be deployed for calibrating GCAMS 1-3 (1122, 1124, 1126) and TCAMS 1-3 (1114, 1116, 1118) as needed or desired to increase optical image capturing and distance accuracy.

According to another aspect, MAIG hole 1100 also includes a tee box radar unit 1120 and a second radar unit 1132. Each radar unit can be coupled to RMS 1136 for storing radar data detected by each radar unit. In some instances, each radar unit can store data captured and communicate the captured data when RMS 1136 requests the data to be sent. Radar data can include a time stamped data that can be synced with captured video of MAIG hole 1100. According to one form, each of the radars can be used to locate a new daily pin position, and statistics or data for moving objects such as a golf ball during play. Additionally, radar data can be combined with AI golf logic 1148 to identify golf objects and location/speed of objects present or located on MAIM hole 1100.

According to another aspect, MAIG hole 1100 can record multiple players shots from multiple points of view or angles. For example, TCAMs 1-3 (1114, 1116, 1118) can be used to record an outgoing ball flight for a first golfer teeing off. Additionally, while the ball is in flight, one or more green side camera. GCAMs 1-3 (1122, 1124, 1126) can record a ball inflight while another of green side cameras can record a ball as it approaches and lands on green 1106. In this manner, a multi-view video can be created and multiple-segments for a shot can be presented and combined into a final video for a user. For example, each video can be created for a specific golfer, and communicated to NMS 1140 for processing. Each video can have a unique session I.D. created during recording of video segments for the golfer and NMS 1140 can combine the videos into a single video of the shot. In other forms, MAIG 1100 can also be used to create a split screen view for a tee shot by a golfer. For example, if a right-handed golfer is teeing off, the TCAM1 1114 can record from behind tee box 1102 or down the line, while TCAM 2 1116 can be used to record front view of the golfer's shot. Each of the videos can be synced up by NMS 1140 and when processed into a final video, be presented such that the down the line video is presented on one side of the final video, and the front view video is presented on the other side. In this manner, a golfer would receive both views in a single video.

According to another aspect, MAIL hole 1100 can use a single camera to track the play of multiple golfers playing MAIG hole 1100 together. For example, four golfers can approach MAIG hole 1100 as a foursome playing a round of golf together. Each golfer can scan QR golf code 1146 to create a session and when it is their turn to take their shot from Tee box 1102. When the first golfer tees off, RMS 1136 using one of TCAMs 1-3 (1114, 1116, 1118) and AI logic 1148 will identify the golfer that scanned QR Golf Code 1146. Upon scanning QR Golf code 1146, image data of the specific golfer can be captured and saved for subsequent use and processing. After each golfer scans QR golf code 1146, a unique session I.D. is created and unique aspects of each golfer are detected with RMS 1136 and AI logic 1148. After each golfer hits their first shot approaches their ball, RMS 1136 can assign a camera to record each golfers' remaining shots. For example, golfer #1 may have hit a shot to the back of green 1106. As such, GCAM 1 1122 can be assigned to record golfer #1. Additionally, if golfer #2 hit a golf ball to the right of green 1106, GCAM 2 1124 can be assigned to record golfer #2. According to a further aspect, if golfer #3 landed a ball in front of green 1106, a tee box cam can be used to record golfer #3. For example, TCAM2 1116 can be provided as a PTZ camera as described herein and can be rotated toward golfer #3 and record the rest of play accordingly. In this manner, a multiple players can have their shots recorded using a 'personal camera' and MAIG hole 1100 can record each golfer on a single video session without having to slice an entire video stream into separate segments.

According to a further aspect, NMS 1140 can be used with RMS 1136 to create a video for each golfer playing in a group. For example, when a golfer scans QR golf code 1146 using their mobile device 1144, a session can be requested by NMS 1140 to allow RMS 1136 to initiate a record event for that golfer. The golfer's I.D. and AI detected data can be stored by RMS 1136 and/or NMS 1140 for processing video for that specific golfer. Additionally, a camera can also be assigned to that golfer based on a detected landing location of a golf ball and stored into the user's log file for that session. As the next golfer hits, a new session is created for each golfer that scans QR golf code 1146, getting a unique identifier associated with each video created. Upon each golfer scanning or checking in, MAIG hole 1100 an record each golfer and communicate each golfer's video from RMS 1136 to NMS 1140 for post processing of each video. For example, a log file for each golfer identified can be communicate with each video and can include various aspects of the shot including radar unit data, videos, golfer names, a distance of hole, a distance of shot, or various other aspects of play. NMS 1140 can then process each of the videos using the unique I.D. generated, and can overlay graphical data to the golfer's name, course name, hole number and distance, performance data such as number of strokes to complete, length of drive or shot, distance to pin, and various other forms of hole data. NMS 1140 can also add shot tracing to each of the tee box shots to further enhance the viewing experience for each of the golfers. As such, a single video stream can be created by a single camera assigned to each golfer, and processed by RMS 1136/1140 as each golfer finishes play on MAIG hole 1100. This will allow for increased efficiency in production given each golfer finishes a hole at separate times which will reduce upload times and video processing requirements creating less of a strain on the overall AIMS supporting MAIG hole 1100.

Referring now to FIG. 12, graphical user interfaces of a golf competition mobile application is disclosed according to an aspect of the present disclosure. User interfaces, illustrated generally at 1200, can be used, in whole or in part, with a mobile application as generally illustrated in FIGS. 5A-D. User interfaces 1200 can include a competition golf courses map view 1202, a golf course list view 1212, golf course description 1224, a golf hole view 1234, and a golf hole competition subscribe view 1240.

According to an aspect, competition golf courses map view 1202 includes a courses navigation tab selector 1204, a payout selector 1206, payout icons illustrated generally at 1208 and a current location icon 1210 of the mobile app user. Golf courses map view 1202 provides a visual indication of where competitive golf competitions can be played by a user. Each of payout icon 1208 includes a payout dollar amount integrated as a part of each icon for each course to allow a user to have a visual indication of where the highest paying competitions may be located. Each payout icon can be updated as described below. Golf courses map view 1202 also includes payout selector 1206 to display courses that do or do not have a competition available. When a user detects the payout selector 1206, a user interface such as map 530 of courses 532 in FIG. 5A can be displayed.

According to an aspect, a user can also select a list view tab 1214 and golf course list view 1212 can be displayed. Golf course list view 1212 can include a sort by selector 1216, that can be used to display a list of golf courses generally illustrated at 1218. Within list 1218 can include golf courses 1220 that are sorted and displayed by selector 1216 and can include one or more payout amounts 1220 having specific payout values for competitions being played at each of the courses within list 1218. List 1218 can also display courses that may not be having a golf competition but may still provide media recording services as described herein. According to an aspect, sort by selector 1216 can allow a user to sort by the user's distance to a golf course and in other forms, can be sorted by the highest to lowest payout, competition type, private or public competitions, charity competitions, or other forms of competitions that may be available to the user of a competitive golf mobile app. In one form, list 1218 need not be limited to a specific region, such as South Carolina, but can display payouts across a whole region, such as the United States, Canada, Ireland, and the like. User interface 1200 can also include litter capabilities that will allow a user to filter based on the type of competition that may be occurring. For example, a user may only want to play hole-in-one competitions and using sort 1216 and a filter by game, hole-in-one (not expressly illustrated), a list 1212 or map 1202 view of specific payouts by game can be displayed.

According to an aspect, upon a user selecting a course using icon 1208 or courses 1220, a golf course description 1224 can be displayed and includes a golf course name and location 1226, a hole description 1228 of the golf hole having a competition, tee time and website links 1230, and a payout amount 1232 and description of the game being played on the hole. In some forms, a user can navigate golf course description 1224 to see a layout 1236 of the golf hole having a competition and payout amount 1232. Upon a user selecting payout amount 1232, golf hole competitions subscribe view 1240 can be displayed to a user to allow a user to play in a specific competition and the cost to buy-in. For example, golf hole competition subscribe view 1240 can include a payout amount 1242 for a competition, a golf course name and hole #1244, a current buyin amount 1246 and a hole and tee description 1248 for the competition. A tee disclaimer 1250 is provided beneath hole and tee description 1248. Prior to a user buying in to play in a competition using buy in 1252, a user must agree to terms and conditions 1256 using terms and conditions check mark 1254. For example, terms and conditions can include a person being old enough to play a game, a player not being a professional golfer, and a player agreeing to paying any taxes due to for winnings. In another form, terms and conditions can also be regionally bound based on the location of the competition being played. For example, a hole-in-one competition may be legal in Florida and may be illegal in South Carolina. As such, the terms and conditions can be modified to only allow terms and conditions based on a region and a type of competition a user may be buying into. Due to the state-by-state nature of various laws, mobile application using regional based terms and conditions provides a mobile app provider an advantageous way to present terms and conditions for golf competitions that can be accessed by users and updated within a cloud service allowing for real-time updating of terms and conditions based on a user's location as described in further detail below. Upon a user checking terms and conditions check mark 1254, a user can pay an entry fee using buy in icon 1252. Payment can be in the form of a mobile payment service that may be set up using a payment service such as Apple Pay. Venmo, or other mobile payment. In another form, payment can be set up using a user profile such as account information 522 of FIG. 5A where a user can enter credit card information (not expressly illustrated) and payment for a buy in can be automated within the mobile app.

According to another aspect, payment can be in the form of a digital token obtained by the user through a wagering platform or online marketplace. Specifically, the digital token is purchased by the user or golfer prior to participating in at least one of the performance-based competitions. So, the payment is a prepayment (e.g., before the user arrives at the golf course or the golf hole). The digital token enables the user to buy in and compete in the at least one of the performance-based competitions without further expense. On the wagering platform or online marketplace, the user pays for one or more digital tokens and then these digital tokens are sent electronically to the user (e.g., through text or Short Message/Messaging Service (SMS), email message, etc.). For example, the digital token may be provided as a hyperlink, which when selected by the user allows the user to activate and use the digital tokens. According to another aspect, the digital tokens may also be stored in a digital wallet, such as Apple Wallet, for later activation and use. The digital tokens can only be activated and used on golf courses with available performance-based competitions or games and employing the systems and methods described herein.

According to another aspect, upon a user scanning a QR code to check in to play a hole, payout amount 1242 can be displayed to give a golfer an option to compete prior to taking their shot. For example, when a user scans a golf code using a QR scan, such as QR code 548 of FIG. 513, user interface 1240 can be displayed to a user to allow a user to buy into a daily competition. As such, a user can wait until they actually play the hole to buy in and play in the competition and a QR code and location detection can be used to determine what hole is being played, the buyout for a competition, and the terms and conditions that are unique to the hole being played.

FIGS. 13A-D illustrates a block diagram of a method of providing an autonomous golf competition within a mobile application according to an aspect of the present disclosure. The method can be used to output user interfaces, such as user interfaces 1200 illustrated in FIG. 12, or other user interfaces that can be provided within an application that can be used, in whole or in part, on a mobile phone, tablet, smart watch, golf cart, pull cart, push cart, powered "follow-me" cart, laptop computer, or any other mobile device. It will be appreciated that mobile application with user interfaces 1200 and the method of FIGS. 13A-D may also be installed/embodied/accessible on other devices, such as traditional computers, internet browsers, and the like.

The method begins generally at step 1300 where the method proceeds to display a UI and background processing within a mobile application. A series of decision trees can be activated upon launch the method of FIGS. 13A-D and can be activated by selections within a user interface or processes running within the mobile application. Each decision tree will be described in response to the activation and need not be deployed in the order presented within FIGS. 13A-D and can be deployed in multiple different orders. Additionally, an "A" with a circle illustrate locations to loop "from" and "to" locations within the decision tree sequence illustrated. Other loops can also be used as needed or desired.

According to an aspect, at decision step 1302, if a map view is selected, the method proceeds to block 1312 and displays a map within a user interface that includes locations of where an AI enabled golf course is located. For example, the method can determine the current location of the user and access a database storing a list of golf courses having specific GPS coordinates. During step 1312, the method can determine which golf courses are within a certain distance (e.g. miles, 10 miles, 50 miles, etc.) and display courses using an icon on the map. The method can then proceed to decision step 1314 and determine if any of the golf courses being displayed have competitions available. Competitions can include a variety of skill-based golf competitions with monetary payouts for participants and can include, but are not limited to, closest-to-the-pin (C2P), hole-in-one (HIO), longest drive, first birdie, first eagle, or other games that can be played including on-course competitions, or any combinations thereof. Additionally, a golf course can also include multiple competitions on different golf holes.

If a competition is not available, the map is displayed with courses having only AI enabled capabilities. If a competition is available, the method proceeds to step 1316 and displays a payout only selector that will allow a user to view only those golf courses that have payouts for competitions. This will allow a user to quickly view available competitions. If a user does not wish to view competitions, the method proceeds to display the map with AI enabled courses. At decision step 1318, if a user selects the payout selector, the method proceeds to step 1320 and identifies the courses with payouts, and then to step 1322 and identifies the payout amounts. For example, a HIO competition may have a higher payout than a C2P competition and can display accordingly. Additionally, each of the payouts may change daily based not having a winner on the previous day or, the course or service provider electing to sponsor a higher payout. Upon determining the payouts, the method proceeds to step 1324 and displays the payout amounts within an icon located on the map of where the courses are located. In this manner, a user can obtain a quick view of courses with payouts within a single user interface relative to where the user may be located. User Interface 1202 of FIG. 12 is illustrative of a map view with payouts at golf courses.

At decision step 1304, a list view can be created and presented within a user interface and can proceed to step 1326 and determines a regional location of where the user or mobile device may be located. As described above, a region can be within a radius of the user but can also be presented based on a larger location or country. For example, a region could be Texas, Ireland, Canada, or other regions. Upon identifying a region, the method proceeds to step 1328 and identifies courses within that region. For example, courses can include both AI enabled courses and AI enabled courses having competitions. In other forms, a list of courses not having AI enabled technology can also be provided for users to learn, select, and book tee times as needed or desired. Upon determining AI enabled courses within the region, the method proceeds to step 1330 and creates a list illustrating courses closest to furthest from the users location. User interface 1212 of FIG. 12 illustrates an example of a list view. The method then proceeds to decision step 1332 and detects if a new sort may be selected. For example, a user may want to sort the list to illustrate the highest or lowest payout for a competition, highest or lowest priced buy ins, closest or farthest location to the user, or other sorts as needed or desired. If a sort is selected, the method proceeds to step 1334 and sorts the list of courses, and to decision step 1336 where the method determines if a user want to filter the list. If a sort is not selected, a user may only want to filter the courses and at decision step 1336 a user can select a filter to display a list. For example, a user can elect to not display competitions and would only like to display course without competitions. In other forms, a user can filter based on a variety of factors including, but not limited to, payout levels, competition types, hole difficulty, avg. number to make a 1110, # of HIO this year, distance, price to pay, available tee times, daily fee, avg. distance to pin, of various other sort variables that can be created as needed or desired. Upon creating a filter, the method can proceed to step 1338 and display the list based on the filter selected. As such, an efficient display of specific types of golf courses and experience offerings can be accessed, filtered and displayed to users within a user interface.

At decision step 1306, when a course is selected the method proceeds to step 1340 and obtains course information of the selected course and to decision step 1342 to detect if a competition is available. For example, if a selected course has a competition, the method can access a database of information describing the competition, and to step 1344 to determine which holes have the competition, then to step 1346 to determine the type of competition. The method can then proceed to step 1348 and determine the payout for the competition and to step 1350 to determine the cost to buy in to play the competition. Upon determine the competition information for the selected course, the method can proceed to step 1352 and display the determined competition information to the user within a user interface. User interface 1224 of FIG. 12 illustrate an examples of a user interface provided at step 1352.

At decision step 1308, if play is selected by a user, the method proceeds to step 1354 and displays competition information for the game selected. The method then proceeds to step 1356 and detects the location of the course and competition the user has selected. For example, if a user selects a course in North Carolina having a competition, state laws may restrict the type of game that can be played and the terms and conditions for the course and competition can be updated based on the location. Similarly, if a course and a game is selected in Florida, terms and conditions for playing a Florida competition at a course may be different than North Carolina. As such, the method can determine the location of the competition and proceed to step 1358 and update the terms and conditions based on the location of the competition being played. The method can then proceed to step 1360 and display a check box within a user interface to allow a user to agree to the terms and conditions, and a link for a user to view the terms and conditions that are location based. If at step 1362, a user does not agree to or select the check box, the method proceeds to display the competition information. Upon a user selecting to agree to the terms and conditions at decision step 1362, the method can proceed to step 1364 and enable a Buy In icon within a user interface to allow a user to pay for the competition or game selected. The Buy In or Purchase icon will be enabled when a user agrees to the terms and conditions however in other forms if the terms and conditions are provided in other locations of a user interface, the buy in icon can be active. User interface 1244 of FIG. 12 is illustrative of a user interface that may be created.

At decision step 1368, if a user buys into the competition, the method proceeds to step 1370 and processes the payment. Payment can be in a variety of digital or mobile payment forms as described herein. Upon processing the payment, the method can proceed to step 1372 and detects if a QR code was previously scanned as an indication that the user is at the golf hole. For example, a user may elect to prepay for the competition in advance of getting to the golf course. If so, at step 1372 the method would not initiate a user validation. If at decision step 1372, the user had previously scanned the QR code for the golf hole, the method proceeds to step 1374 and enables to user to take their shot in the selected competition upon validation and activating an AI enabled camera to record the shot.

At decision step 1310, if a user is present at a golf course and scans a QR code at a specific golf hole, the method can proceed to decision step 1375 and detect if a user has already paid for the competition. If a user had previously paid for the competition at the hole, the method can proceed to step 1374 and proceed to countdown and allow a user to take their shot at the hole. A countdown similar to FIG. 5B can be displayed and supporting recorded video recorded accordingly as described herein. If at decision step 1376 a user has scanned in but has not paid for the competition, the method can proceed to step 1354 and allow a user to play in the competition or not. If a user does not wish to play in the competition, the method will proceed to allow a user to have their shot recorded as described above. If a user has elected to play in the competition, the method will detect a user has agreed to the terms and payment has been processed prior to the user taking the shot. As such, a user can elect to pay in advance or pay when they get to the hole as needed or desired.

Figure 14A:
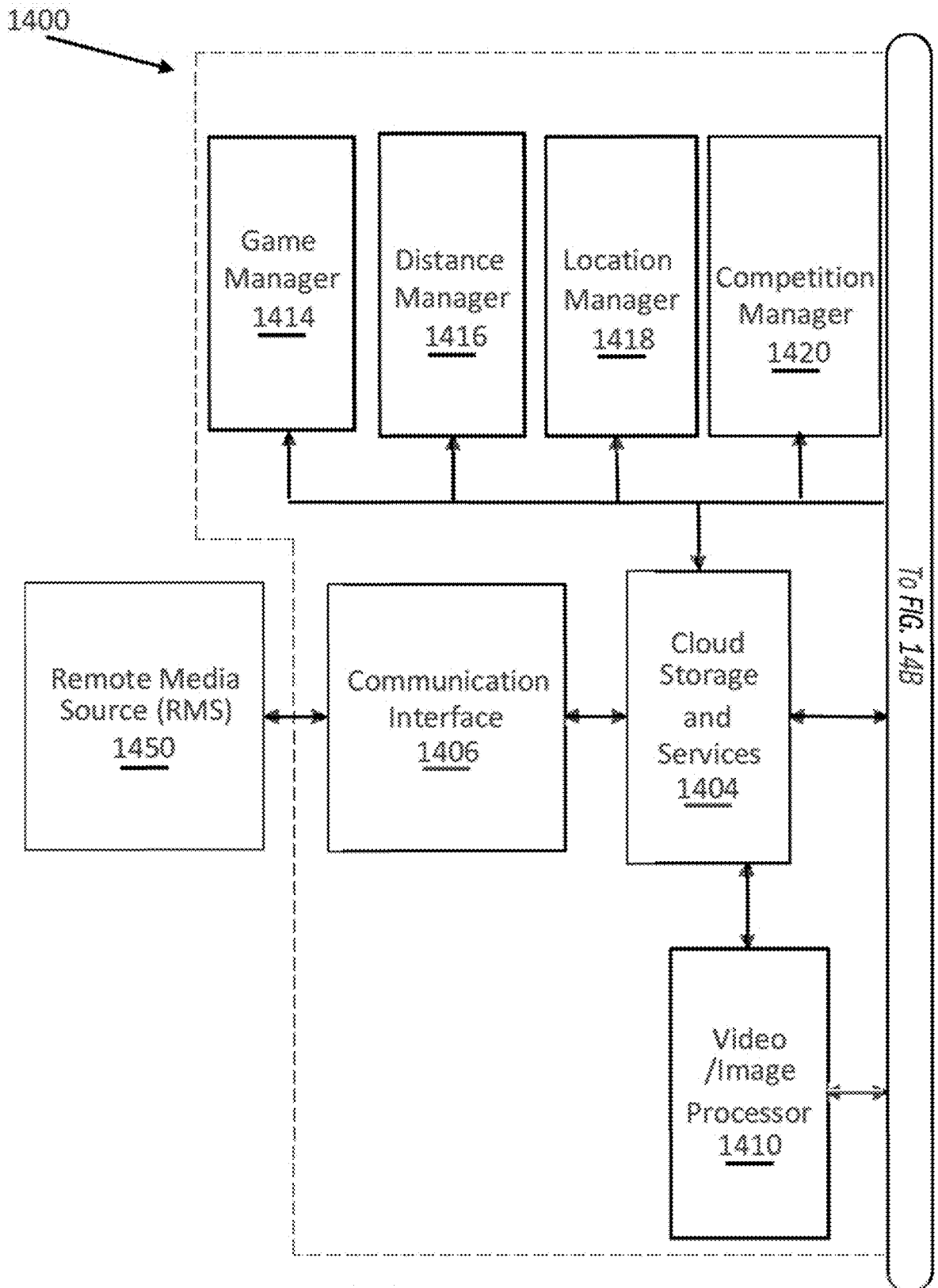
FIG. 14A illustrates a first portion of a block diagram illustrating network media processing and management services incorporating autonomous golf competition services in accordance with an aspect of the present disclosure.
Figure 14B:
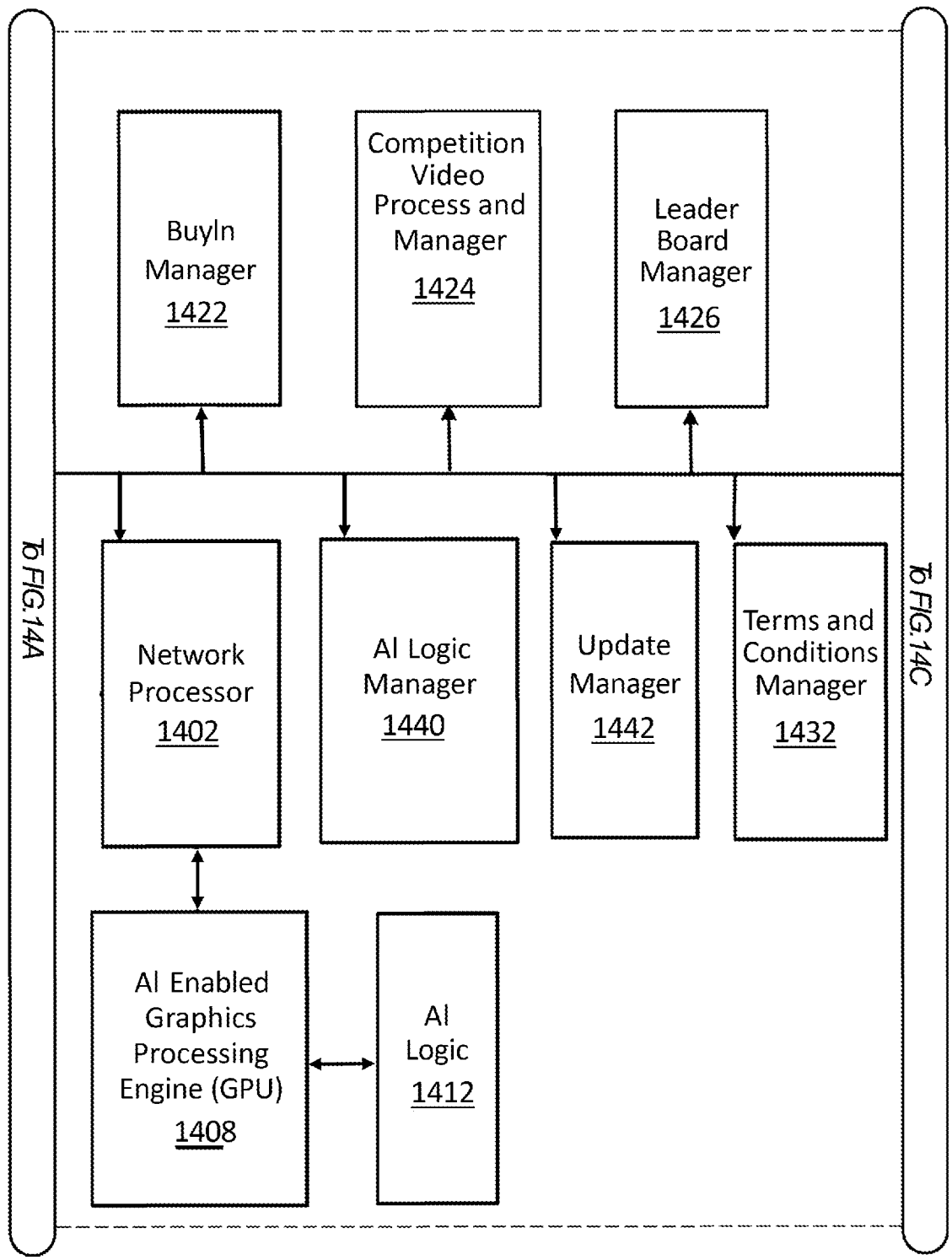
FIG. 14B illustrates a second portion of a block diagram illustrating network media processing and management services incorporating autonomous golf competition services in accordance with an aspect of the present disclosure.
Figure 14C:
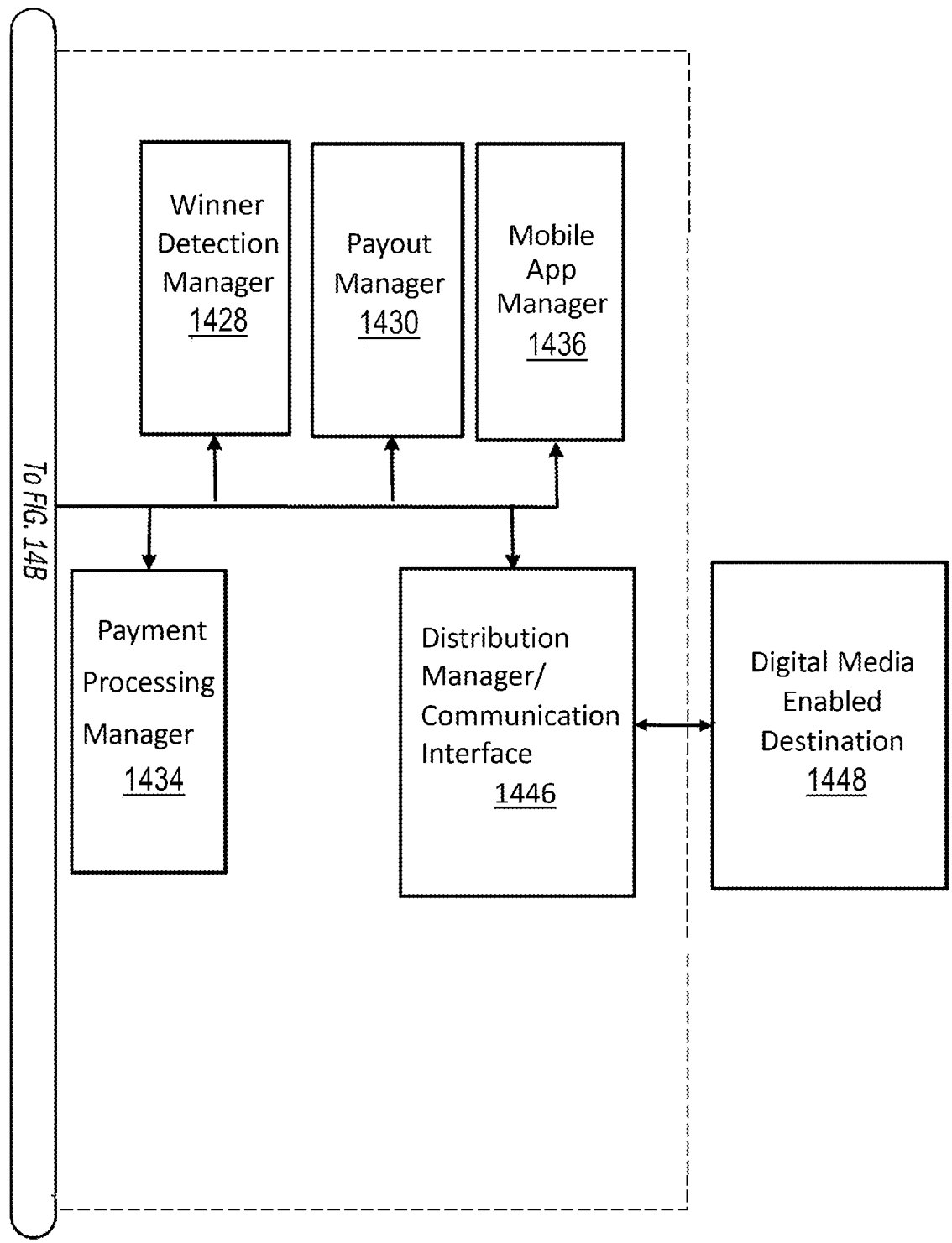
FIG. 14C illustrates a third portion of a block diagram illustrating network media processing and management services incorporating autonomous golf competition services in accordance with an aspect of the present disclosure.

Referring now to FIGS. 14A-C, a block diagram illustrating a competition-based network media processing and management services is disclosed. A competition-based network media processing and management services (CLAMS), generally illustrated at 1400, and can include portions or all of NMS 400 illustrated in FIGS. 4A-4C above. As such, CNMS 1400 is provided to illustrate a competition-based NMS and includes a network processor 1402 connected to cloud storage and services 1404, which is connected to a communication interface 1406 configured to communicate with a remote media system (RMS) 1450 or any other remote video capture system or device configured to communicate video for processing and creating digital media. CNMS 1400 also includes an AI enabled graphic processing engine (GPU) 1408, a video/image processor 1410 and AI logic 1412. Network Processor 1402 can access various module or managers for processing, managing and communicating digital media and resources for supporting one or more competitions at various golf courses. For example, CNMS 1400 can include a game manager 1414, a distance manager 1416, a location manager 1418. CLAMS also includes a competition manager 1420, a buy in manager 1422, and a competition video process and results manager 1424. CNMS 1400 also includes a leader board manager 1426, a winner detection manager 1428, a payout manager 1430, a terms and conditions manager 1432 and a payment processing manager 1434. CNMS 1400 can also output video received from RMS 1450 as digital media to a digital media enabled destination 1448 using a distribution manager communication interface 1446. CNMS 1400 also includes an AI logic manager 1440 and an update manager 1442 to manage various updates.

According to an aspect, game manager 1414 can be used to manage games for each golf course using CNMS 1400 and allow for enabling and disabling competitions on a course-by-course and hole-by-hole basis. For example, game manager 1414 can include a variety of available game that can be regionally provided and used on a specific golf course, including, but not limited to, hole-in-one competitions, closest-to-the-pin competitions, longest drive competitions, lowest score competitions, group competitions, head-to-head competitions, scrambles, Ryder cup competitions, or various other types of competitions, games, betting, and/or gambling competitions that may be realized for golf. Each game can be selected by a game manager interface (not expressly illustrated) that is linked to a specific golf course and enabled and disabled as needed. Additionally, payout or values for each game can be linked to a selected game, and can include a date and time when each game may be activated. Games can also be automatically activated and deactivated on a daily basis.

According to another aspect, game manager 1414 can also maintain public and private games that can be accessed using CNMS 1400. For example, a public game can be provided to allow anyone to play a game being deployed at a specific location. However, in other embodiments, CNMS 1400 can be used for private games that can be invitation only or private access games. For example, a group of twenty players that are playing a course may want to have their own game created and maintained by CNMS 1400. As such, game manager 1414 can create a private game and provide each invitee a link to activate a private game to be played at the specific course. As described below, a private game can also include a leaderboard, that can be a private leaderboard, that may be accessed only by invitees and updated when played.

According to a further aspect, game manager 1414 can also maintain competition information that can be used for each game being played. In addition to providing course, game type, and hole information, game manager 1414 can also maintain the buy in and Payout amounts for each game being played. For example, a daily closest-to-the-pin competition can be set to $100 per day during the week with a $10 buy in, and $500 per day on the weekend with a $20 buy in. In other forms, a course can have a hole-in-one competition that grows daily at a fixed level until somebody makes a hole-in-one. For example, a hole-in-one may cost $10 for a $1000 payout and the payout may increase $100 per day until it reaches $10,000, or when a golfer makes a hole-in-one. Additionally, the buy in can increase from $10 to a higher level, such as $20, as the payout increases. Game manager 1414 can automatically increase the buy in when certain levels are reached. In yet another form, game manager 1414 can set a competition to a certain level, and increase the payout based on the number of participants that played the previous day, provided a golfer did not win. For example, if a hole-in-one competition is being played in Florida, and is set to an initial level of $5,000, it may take 1,000 shots before a hole-in-one is achieved. As such, if 100 golfers pay $10 per day to play, the winnings may grow to as high as $15,000 until the hole in one is achieved. Other levels may also be considered as this is one example of how a payout may be automatically increased based on player buy ins. For example, a golf course or third-party service provider may charge a maintenance fee for providing a competition and the payout can be adjusted accordingly.

In a further embodiment, game manger 1414 can maintain a closest-to-the-pin (C2P) competition that can be varied based on the overall distance to the pin or cup. In a traditional C2P competition, the player who gets closest to the pin wins the competition for that day. However, in other forms, game manager 1414 can allow for setting a minimum distance to the pin in order to qualify as a winner. For example, a minimum distance of 1 foot, 3 feet, 5 feet, etc. can be set for a C2P competition and a value set accordingly. Game manger 1414 can also allow for increasing a daily amount of the winnings until a golfer gets within the distance as detected by CNMS 1400. In this manner, a variety of games can be created and modified as needed or desired.

According to a further aspect, CNMS 1400 also includes distance manager 1416 and location manager 1418 for presenting active games within a user interface of a mobile app such as user interface 1200 of FIG. 12. Location manager 1418 can be used to maintain location of a golf course and/or hole where a competition may be played and distance manager 1418 can detect a distance a mobile device may be from one or more courses having competitions and locations stored with location manager 1418. CNMS 1400 also includes terms and conditions manager 1432 that includes an end user license agreement for use of CNMS 1400. Terms and conditions manager 1432 also includes a repository of agreements that are maintained and updated based for each golf course based on a region or location of the golf course. For example, a hole-in-one competition may not be legal in South Carolina but may be legal in Nevada. As such, a terms and conditions for each state, and an available game that can be used by CNMS 1400 and an end user, can be modified based on whether a game is legal in the region being played. In this manner, terms and conditions manager 1432 can provide a regionally based terms and conditions agreement for users of CNMS 1400. Additionally, buy in manager 1422 can be enabled and disabled based on a regional location, and whether a player has agreed to the terms and conditions. For example, buy in manager 1422 can be used to maintain whether a user has paid to play in a game for a golf course and allow for a user to play in a game at the course. Buy in manager 1422 can work with terms and condition manager 1432 to allow for a payment to be initiated, and to further work with payment processing manager 1434 to process a payment using various processing methods. For example, a user can use Paypal, Venmo, Apple Pay, or various other payments methods. A user can also pay using a credit card, debit card, cash card and the like. Buy in manager 1422 with payment processing manager 1434 can determine if a payment is valid, and allow for a user to play in the competition with the user arrives at a hole or course. If a payment is not valid or has not been paid prior to taking the shot, CNMS 1400 would not mark the captured video as a competition video and will process the video captured using, for example, NMS 400 of FIGS. 4A-4C. If a user has paid for a competition, a user's video will then be marked as a competition video that would need to be processed by CNMS 1400.

According to an aspect, CNMS 1400 processes video for competitions to determine which player wins a competition using video recorded with RMS 1450 and competition video process and results manager 1424. For example, when a user elects to play a game presented at a golf course having a RMS 1450 and an active game or competition, RMS 1450 and CNMS 1400 identify a video as a competition based video that is recorded for a user at a specific golf course and hole. The video data or information for the recorded video can include an identifier of the competition video and utilize CNMS 1400 to determine how the results of how a golfer performed. Using RMS 1450 at a specific hole, a golfer can pay for the buy in and buy in manager 1422 can send a validation to RMS 1450 that the golfer is participating. RMS 1450 then records the golfer's shot and when the video is communicated from the specific RMS, buy in manager and video process and results manager 1424 can validate that the user is the participant. For example, specific objects within a video image captured during a QR code scan can be identified and tagged by RMS 1450 as the competitor. The images of the competitor can be compared to the recorded video to ensure the golfer that paid the buy in actually took the shot.

According to another aspect, each valid user's competition video can be processed by competition video process and result manager 1424 to determine the results of the captured video. For example, a competition video uploaded can include an information file or meta data with the video that identifies the golfer, course, hole and competition being played. Competition video process and result manager 1424 then processes the video to determine the performance of the shot taken. For example, if the shot was during a longest drive, competition video process and result manager 1424 may access a sensor data manager 430, or shot trace manager 426 of FIGS. 4A-4C to determine the total distance travelled. Competition video process and result manager 1424 can also access multiple AI enabled camera video recording to triangulate the distance as required. Upon determining the results of the performance for the individual, leaderboard manager 1426 can be updated and maintained within cloud storage 1404 having a leaders database for each course and game.

In another form, competition video process and result manager 1424 can be used to process competition video to determine if a hole-in-one was achieved. For example, a competition video and information may be marked as being a hole-in-one video recording shot. AI Logic 1412 can be accessed to identify the golf hole at the golf course and to further identify, on a frame by frame basis, if the ball enters the cup for that specific hole. As described above, AI logic can be created for a specific course and compared to a recorded video using video/image processor 1410, GPU 1408, and AI logic 1412. If the shot enters and remains in the cup, the competition video can be marked as being a hole in one within the competition video information of that video. Cloud storage 1404 can be updated accordingly.

In a further form, competition video process and result manager 1424 can be used to process a competition video to determine a distance a stopped ball is from the pin. For example, a competition video and information can be marked as a C2P competition video. RMS 1450 and CN MS 1400 can be used to calculate the distance the ball is from the pin in various ways described herein. For example, RMS 1450 may have multiple AI enabled cameras that can be used to triangulate the distance the ball is from the pin. Upon determining the distance, leaderboard manager 1426 can update a database within cloud storage and services 1404 to provide the distance the ball is from the pin. As the day progresses and additional shots are added, leader board manager 1426 can update the database to add new shots to the leader board. Leader board manager 1426 can also update the sort order of the leader board database from shortest to longest (e.g. smallest distance to farthest distance), and allow leader board manager 1426 to display or output the leader board for a specific course to a specific digital media enabled destination 1448. As such, near real time results of shots taken for a competition can be refreshed, updated, and displayed at select destinations. In one form, in a public competition, the overall distance may not be preferred to incentivize players to participate and only when the round or day is finished will the actual distances be displayed. In other forms, a competition may be a morning competition or an afternoon competition. Results for each would then be posted when the next competition begins or the last competition ends. Various other time intervals for displaying can be provided by leaderboard manager 1426. In another form, if a competition is a private competition, leader board manager 1426 may only allow invitees to view a leader board.

Upon a competition coming to completion, winner detection manager 1428 can access the stored leader boards to determine which player won the competition. For example, leader board manager 1426 can update the leader board database for each course and hole, and when the competition is over winner detection manager 1428 can access each of the games or competitions to determine a winner. Winner detection manager 1428 can initiate a message such as an email, notification, text, etc. to notify the player that they have won the competition.

According to another aspect, leader board manager 1426 having stored a user's name allows for access to a user's profile information, such as user profile 422 to provide payment. At the end of each day or competition, payout manager 1430 can determine if there is a winner and what the payout should be for each winner based on the competition that was played. For example, if the payout for a closest to the pin competition was $1000, payout manager 1430 can access a payment platform (not expressly illustrated) to pay an individual. In one form, a payment may be automatically paid to an account such as a Paypal or Venmo account. In other forms, payout manager 1430 can initiate an event for a paper check payment to be sent to the user. Various other forms of payment can be set up and used by payout manager 1430.

According to another aspect, payout manager 1430 can also deduct taxes associated with winnings. For example, if a winner is entitled to $10,000, payout manager 1430 may flag the winnings as a taxable level and initiate tax withholding for the player prior to paying the winner the winnings. The withholding can then be paid for the winner.

According to a further aspect, payout manager 1430 can also pay parties other than the winner of the competition. For example, if a daily C2P competition is being held at a golf course, and the overall proceeds for playing are collected daily, the fees for playing can be shared between the golf course and a third-party service provider. For example, if the payout was for $100 for the winner, and fees of $500 are collected, payout manager 1430 can calculate the splits for each of the golfer ($100), golf course ($200), and service provider ($200). As such, payout manager 1430 can automatically distribute proceeds without a golf course or third party having to maintain, calculate and distribute winnings. By providing CNMS 1400 with a diverse way of automating video record and competition play, the overall golf experience for golfers can be greatly enhanced while growing interest in the sport.

Figure 15A:
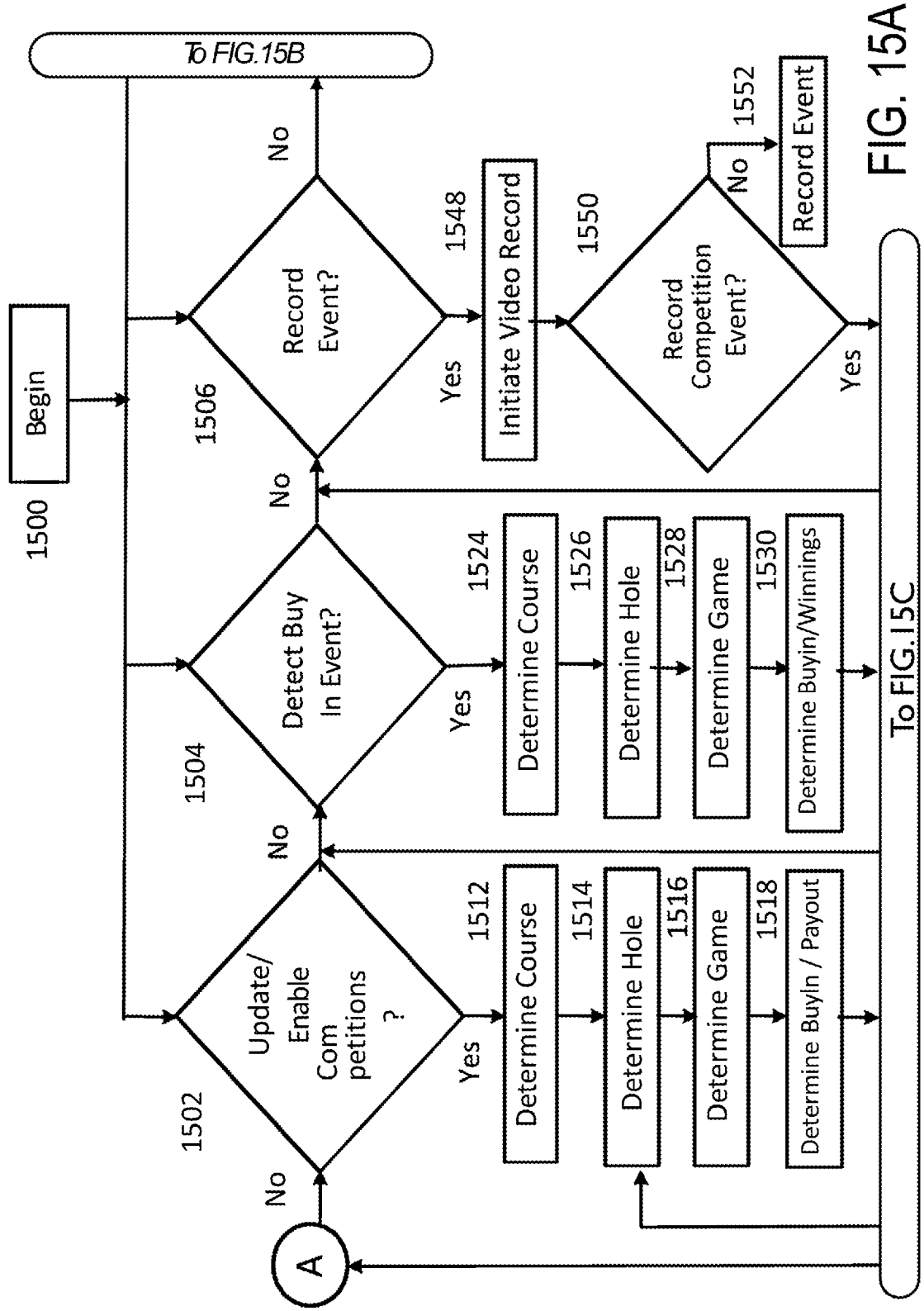
FIG. 15A illustrates a first portion of a block diagram of an autonomous golf competition method according to an aspect of the present disclosure.
Figure 15B:
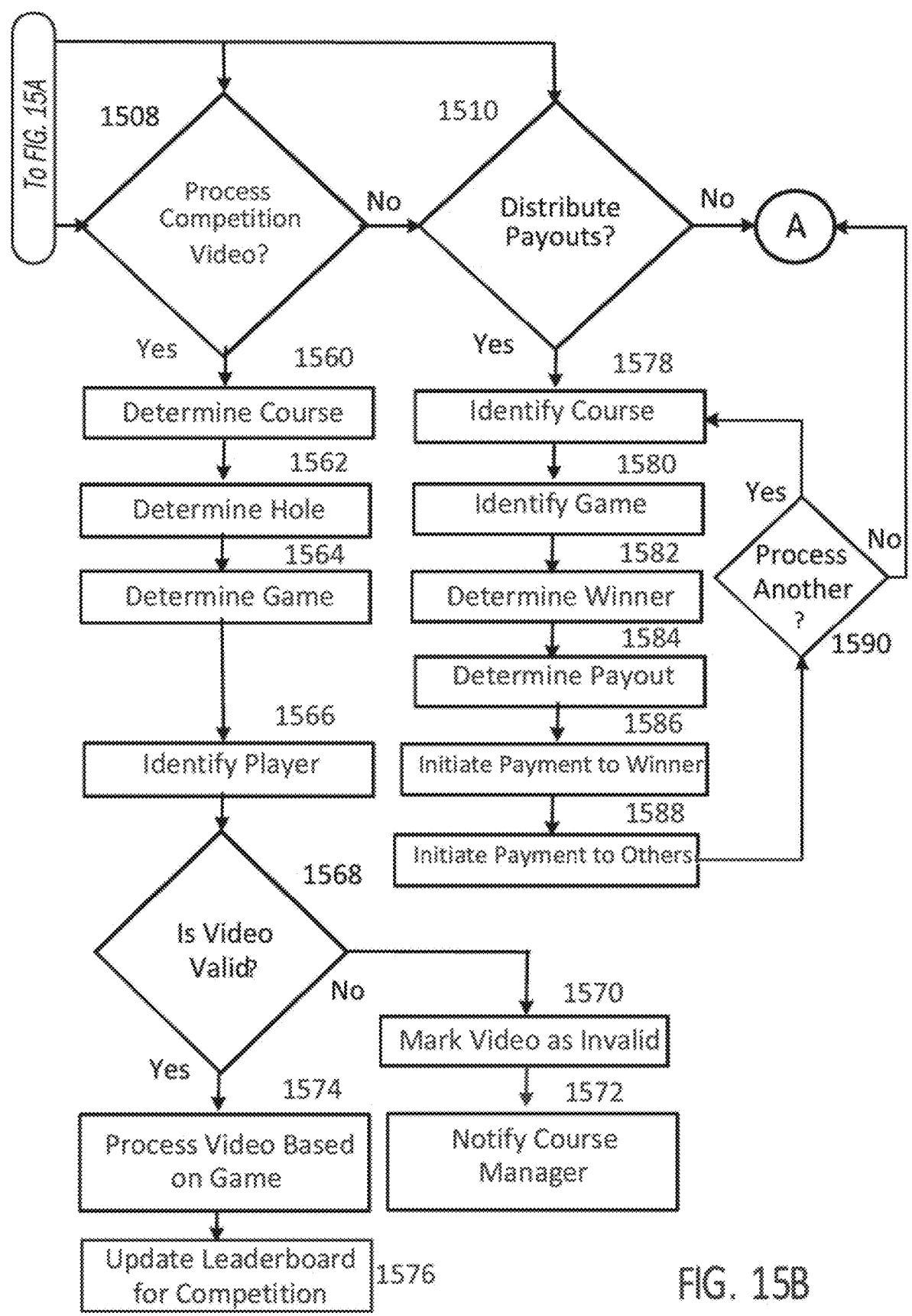
FIG. 15B illustrates a second portion of a block diagram of an autonomous golf competition method according to an aspect of the present disclosure.
Figure 15C:
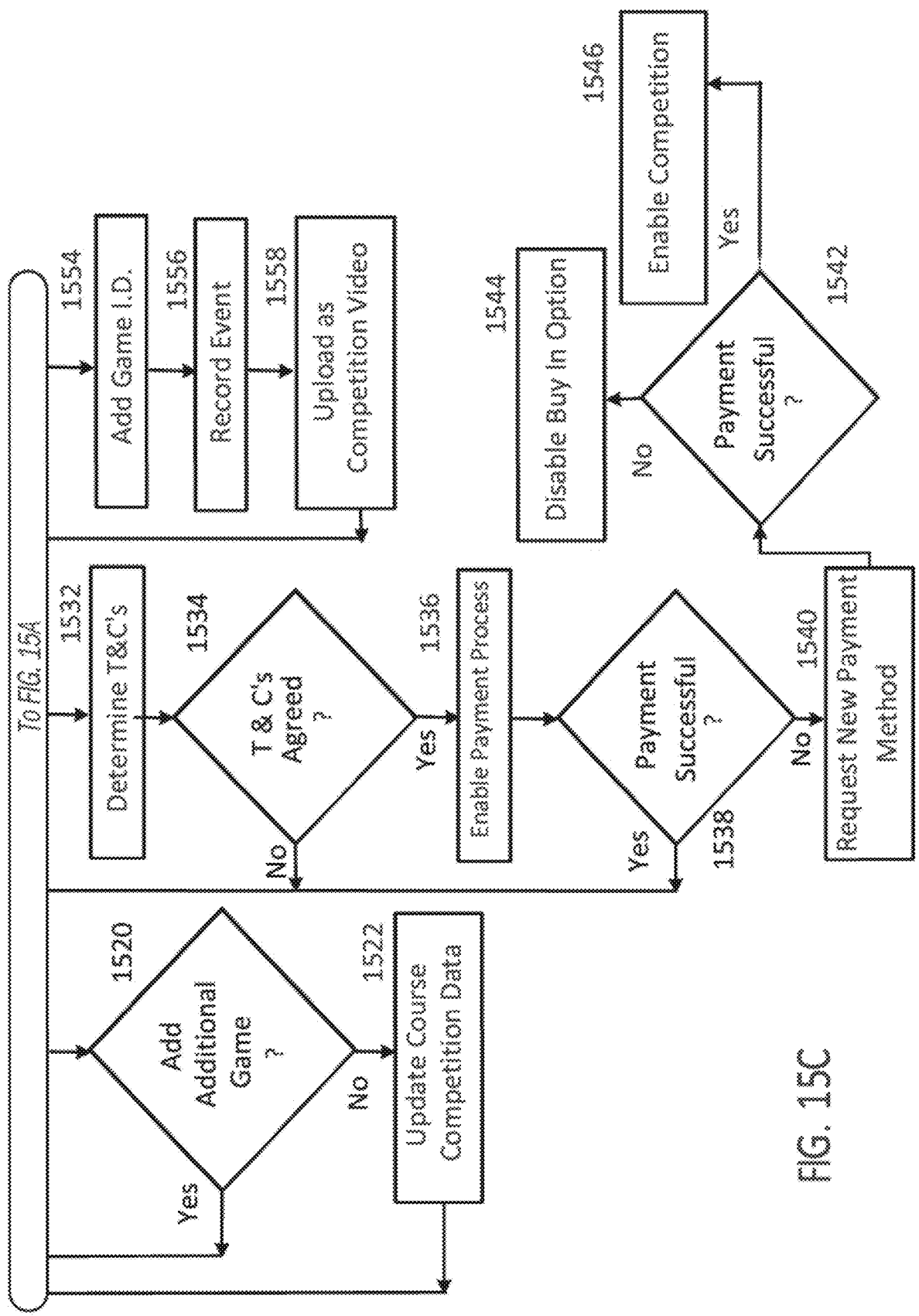
FIG. 15C illustrates a third portion of a block diagram of an autonomous golf competition method according to an aspect of the present disclosure.

FIGS. 15A-C illustrates a block diagram of a method of providing an autonomous golf competition according to an aspect of the present disclosure. The method can be used by AMPS 100 illustrated in FIG. 1, CNMS 1400 illustrated in FIGS. 14A-C, or other systems or devices capable of using the method of FIGS. 15A-C. The method begins generally at step 1500 where a series of decision trees can be activated upon launch the method of FIGS. 15A-C. and can be deployed in multiple different orders and sequences. Additionally, an "A" with a circle illustrate "from" and "to" locations within the decision tree sequence illustrated. Other loops can also be used as needed or desired. Inputs required within the method can originate from previously stored data, new data, information input from a user interface, or various combinations thereof. According to one form, the method of FIGS. 15A-C or portions thereof can be provided as an application program interface (API) with third party access to the method of FIGS. 15A-C.

At decision step 1502, when it is determined to update or enable a competition, the method proceeds to step 1512. Updates to competitions can happen on a regular basis or interval, or can just be a single event or competition that happens on a specific day. If a competition is to be activated, the method proceeds to step 1512 and activates the course, and to step 1514 and determines which hole is being selected for a competition. The method can then proceed to step 1516 and a game can be selected to be played on a specific hole. For example, a par 3 may have a closest-to-the-pin selected. The method can then proceed to step 1518 and a buy in and payout can be determined. For example, a buy in can be at a specific level such as $20 or can be selected or increased automatically. Additionally, a value can be provided for a payout however in other forms a payout can be fixed or automatically determined. Upon determining the buy in and payout for a competition, the method proceeds to step 1520 to determine if another competition or game should be updated or enabled for the course. For example, a golf course may want to have a closest to the pin competition and a hole-in-one competition. Each competition can be provided on separate holes and in one form, can be provided on the same hole. Upon adding or updating a game or games, the method can proceed to step 1522 and update the course competition data for the golf course. Course competition data or information can include the specific details of the competition that is available for play, and can be used to display to a user accessing a user interface configured to access and display the competition information. The method can then proceed to update each golf courses competition as needed or desired.

At decision step 1504, a buy in event can be detected. For example, course and competition information can be accessed by a golfer using a mobile app, mobile device, computer, or various other interfaces capable of accessing a competition. According to one form, the user interface of FIG. 12 can be used with the method of FIGS. 15A-C. If a buy event is detected, the method can proceed to step 1524 where a selected course is determined, and to step 1526 where a hole to be played is also determined. The method can then proceed to step 1528 to determine the game to be played, and to step 1530 to determine a price. The method can then proceed to step 1532 to determine what terms and conditions should be agreed to. Each of the informational elements, including course, hole, game or competition, buy in price, and winnings can be presented to a user within a user interface (not expressly illustrated). Terms and conditions can be presented to a user and at step 1534 the method can detect if a user has agreed to the terms and conditions. If the user has not agreed, the method proceeds to step 1504 and repeats or exits. If a user has agreed to the terms and conditions, the method proceeds to step 1536 where a payment processing is enabled. If at decision step 1538, payment is successful, the method proceeds to allow a user to participate in the competition. IF the payment is not successful, the method proceeds to step 1540 and requests a new payment method and to decision step 1542 to detect if payment was successful. If payment was successful, the method proceeds to step 1546 where the competition is enabled for the user. If the payment is nor successful again, the method proceeds to step 1544 and disables a buy in option for that user, and the competition is no longer available to that user until payments options are resolved.

According to an aspect, if at decision step 1508 a competition video is received, the method can proceed to step 1560 and begin processing the video. For example, the video and video information may have been provided from an RMS or other data source or service, and at step 1560 a course is determined, at step 1562 a hole is determined, and to step 1564 to determine of the game or competition. The method can then proceed to step 1566 and detect or identify a player. For example, the players profile or mobile information can be provided with the video, and in other forms, a image of the golfer can be validated to identify the player within the video. Various other forms of player identification and detection can also be used as described herein. Upon identifying the player, the method can proceed to decision step 1568 to determine of the video is a valid competition video. In one form, the identified player will include a buy in certificate stored within memory for the player buying in to play in a specific competition. As such, the buy in certificate for the identified player can be used to enable processing the video as a competition video. If the video, player, or buy in certificate can not be validated, the method can proceed to step 1570 and mark the video as an invalid competition video, and to step 1572 to notify the course manager or service provider that an invalid video has been sent. In other forms, the method can proceed to process the video for the player as a non-competition based video and distribute the video to the end user. In this manner, the method can be used to only process videos that have been validated thereby reducing the potential for non-players gaining access to games or competitions that they are not entitled to. If at step 1568 a video has been validated as a competition video, the method can proceed to step 1574 and process the video based on the game being played as described herein. The method can then proceed to step 1576 and a leader board for the competition can be updated accordingly.

At decision step 1510, the method can determine if payouts need to be provided and proceeds to step 1578. For example, if a daily competition is being played, at the end of the day the method can proceed to step 1578 and identities the course, identifies the game at step 1580, and determines a winner or winners at step 1582. For example, a leader board for a specific game and a specific course can be maintained in a database and at the end of the day, the leader board for that game can be accessed to determine who the winner is. In some forms, there may be more than one winner depending on the competition being played and multiple winners can be identified. Upon determining a winner, the method proceeds to step 1584 and determines a payout for one or more winners. For example, if only one winner occurs in a competition, that winner would receive all of the winnings. However, if two people win, the proceeds may be split between the winners. In other forms, each winner can win a value of the entire amount. Upon determining the payout, the method can proceed to step 1586 proceeds to initiate payment to the winner. The method can then proceed to step 1588 and if other players or third parties need to be paid, the method will proceed to initiate payment. The method can then proceed to step 1590 and determines if another competition should be processed, and repeats at 1578 to process accordingly.

It will be appreciated that various other additional method steps may be included in the above methods, or the above methods may be modified in accordance with the functionality of the systems and functionality described above. It will be appreciated that such aspects and embodiments are more than an abstract idea performed by a computer or other controller. The above-described aspects are automatically performed based on a variety of inputs that are not easily accessible or determined, and the resulting end product cannot otherwise be provided in the same automatic manner.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range. Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system for operating performance-based competitions, the system comprising:
    at least one AI enabled camera located at a golf course having a golf hole and configured to record video of at least one golfer detected at the golf hole;
    a competition-based network media processor and services (CNMS) including a network media processor configured to:
        receive a request to participate in at least one of the performance-based competitions,
        detect a presence of the at least one golfer at the golf hole corresponding to the at least one of the performance-based competitions, receive a request to activate recording of the video of the at least one golfer in response to the detected presence of the at least one golfer, the request to activate recording the video of the at least one golfer includes a user profile identifier of the at least one golfer, validate the at least one golfer using the user profile identifier and a location of the golf hole, and activate recording of the video of the at least one golfer and the at least one of the performance-based competitions using the at least one AI enabled camera at the golf hole; and a graphical user interface configured to be displayed at a destination, the graphical user interface including:

information associated with the performance-based competitions at the golf hole of the golf course, a selectable terms and condition element configured to be activated by the at least one golfer to agree to participate in at least one of the performance-based competitions at the golf hole, and a submit selector configured to send the request to participate in the at least one of the performance-based competitions;

the CNMS further configured to detect a successful attempt of the at least one golfer related to the at least one of the performance-based competitions.

2. The system of claim 1, further comprising a QR golf code having a unique graphic identifier encoded on a surface of the QR golf code associated with at least one of the golf hole and the golf course and wherein the graphical user interface is further configured to enable the at least one golfer to buy in and compete in the at least one of the performance-based competitions at the golf hole and the golf course associated with the QR golf code in response to the at least one golfer scanning the QR golf code.

3. The system of claim 2, wherein the buy in and competing by the at least one golfer occurs temporally after the at least one golfer plays at the golf hole.

4. The system of claim 1, further including an AI logic installed on the at least one AI enabled camera or at the CNMS configured to detect a specific object or objects in the video.

5. The system of claim 4, further including a radar unit installed at the golf hole and configured to detect movement and send radar data to the CNMS and wherein the network media processor is configured to process frames of the video recording using image processing and the CNMS is further configured to determine a distance a golf ball associated with the at least one golfer is to the golf hole using at least one of the AI logic and the radar data and the image processing, the distance the golf ball is to the golf hole used to detect the successful attempt.

6. The system of claim 4, wherein the at least one AI enabled camera comprises a remote media system (RMS) located at the golf course, the RMS includes a communication interface configured to receive an input to activate recording of the video of the at least one golfer at the golf hole, wherein the video includes a plurality of images of the at least one golfer having objects within the images that are detectable using the AI logic.

7. The system of claim 1, wherein competition rules are automatically determined based on a locality of the at least one of the performance-based competitions.

8. The system of claim 1, wherein payment is automatically initiated to the at least one golfer associated with the successful attempt.

9. The system of claim 1, further including a digital token purchased by the at least one golfer prior to participating in at least one of the performance-based competitions.

10. The system of claim 9, wherein the digital token enables the at least one golfer to buy in and compete in the at least one of the performance-based competitions without further expense.

11. The system of claim 1, wherein the graphical user interface is presented in a golf cart.

12. A method for automatically administering performance-based competitions, the method comprising:

providing information associated with the performance-based competitions at a golf hole of a golf course on a graphical user interface displayed at a destination;

providing a selectable terms and condition element on the graphical user interface, the selectable terms and condition element activated by a at least one golfer to agree to participate in at least one of the performance-based competitions at the golf hole;

receiving a request to participate in the at least one of the performance-based competitions at a competition-based network media processor and service (CNMS) in response to the at least one golfer selecting a submit selector associated with the selectable terms and condition element;

detecting a presence of the at least one golfer at the golf hole corresponding to the at least one of the performance-based competitions;

receiving a request to activate recording a video of the at least one golfer at the CNMS in response to the detected presence of the at least one golfer and the request to participate, the request to activate recording the video of the at least one golfer includes a user profile identifier of the at least one golfer;

validating the at least one golfer using the user profile identifier and a location of the golf hole;

activating recording of the video of the at least one golfer and the at least one of the performance-based competitions using at least one AI enabled camera at the golf hole; and detecting an occurrence of a winning event in the at least one of the performance-based competitions.

13. The method of claim 12, further including the step of detecting a specific object or objects in the video of the at least one golfer using an AI logic installed on the at least one AI enabled camera or at the CNMS.

14. The method of claim 13, further including:

detecting movement and sending radar data to the CNMS using a radar unit installed at the golf hole;

processing frames of the video using image processing using the CNMS; and determining distance a golf ball associated with the at least one golfer is to the golf hole using at least one of the AI logic and the radar data and the image processing, the distance the golf ball is to golf hole used to detect the occurrence of the winning event.

15. The method of claim 14, wherein the determining distance the golf ball associated with the at least one golfer is to the golf hole using the at least one of the AI logic and the radar data and the image processing includes updating a database to record the distance the golf ball is to the golf hole for the at least one golfer.

16. A The method of claim 12, wherein rules of the performance-based competitions are determined automatically based on a locality of the performance-based competitions.

17. The method of claim 12, wherein the detection of the occurrence of the winning event is determined automatically by the CNMS.

18. The method of claim 12, further including enabling the at least one golfer to buy in and compete in the at least one of the performance-based competitions at the at least one of the golf hole and the golf course associated with a QR golf code having a unique graphic identifier encoded on a surface of the QR golf code using the graphical user interface in response to the at least one golfer scanning the QR golf code.

19. The method of claim 12, further including wherein automatically initiating payment to the at least one golfer associated with the winning event.

20. An AI enabled golf course comprising:
   a golf hole having a green, a tee box, and a hole with a flagstick positioned within the golf hole;
   at least one AI enabled camera located at the golf hole and configured to record video of at least one golfer detected at the golf hole;
   a competition-based network media processor and services (CNMS) including a network media processor configured to:
      receive a request to participate in at least one performance-based competitions,
      detect a presence of the at least one golfer at the golf hole corresponding to the at least one of the performance-based competitions,
      receive a request to activate recording of a video of at least one golfer in response to the detected presence of the at least one golfer, the request to activate recording the video of the at least one golfer includes a user profile identifier of the at least one golfer,
      validate the at least one golfer using the user profile identifier and a location of the golf hole, and
      activate recording of the video of the at least one golfer and the at least one of the performance-based competitions using the at least one AI enabled camera at the golf hole;
   a radar unit installed at the golf hole and configured to detect movement and send radar data to the CNMS; and
   a graphical user interface configured to be displayed at a destination, the graphical user interface including:
      information associated with the performance-based competitions at the AI enabled golf course,
      a selectable terms and condition element configured to be activated by at least one golfer to agree to participate in at least one of the performance-based competitions at the golf hole, and
      a submit selector configured to send the request to participate in the at least one of the performance-based competitions;
   the CNMS further configured to detect a successful attempt of the at least one golfer related to the at least one of the performance-based competitions, detection of the successful attempt including determining distance a golf ball associated with the at least one golfer is to the golf hole using the radar data.

21. The AI enabled golf course of claim 20, wherein the at least one AI enabled camera is in communication with the CNMS located remote to the at least one AI enabled camera, the network media processor configured to process frames of the video recording using image processing.

22. The AI enabled golf course of claim 21, further including an AI logic installed on the at least one AI enabled camera or at the CNMS configured to detect a specific object or objects in the video of the at least one golfer, wherein determining distance the golf ball associated with the at least one golfer is to the golf hole further using at least one of the AI logic and the image processing.

23. The AI enabled golf course of claim 20, further comprising a QR golf code having a unique graphic identifier encoded on a surface of the QR golf code associated with at least one of the golf hole and the AI enabled golf course and wherein the graphical user interface is further configured to enable the at least one golfer to buy in and compete in the at least one of the performance-based competitions at the at least one of the golf hole and the AI enabled golf course associated with the QR golf code in response to the at least one golfer scanning the QR golf code.

24. The AI enabled golf course of claim 20, wherein the graphical user interface is further configured to sort and filter the performance-based competitions at the AI enabled golf course in response to corresponding selections by the at least one golfer.

25. The AI enabled golf course of claim 20, wherein competition rules are automatically determined based on a locality of the at least one of the performance-based competitions.

26. The AI enabled golf course of claim 20, further including another golf hole with no performance-based competitions.

27. A method for automatically administering performance-based competitions, the method comprising:
   providing information associated with the performance-based competitions at a golf hole of a golf course on a graphical user interface displayed at a destination;
   providing a selectable terms and condition element on the graphical user interface, the selectable terms and condition element activated by at least one golfer to agree to participate in at least one of the performance-based competitions at the golf hole;
   receiving a request to participate in the at least one of the performance-based competitions at a competition-based network media processor and service (CNMS) in response to the at least one golfer selecting a submit selector associated with the selectable terms and condition element;
   detecting a presence of the at least one golfer at the golf hole corresponding to the at least one of the performance-based competitions;
   receiving a request to activate recording a video of the at least one golfer at the CNMS in response to the detected presence of the at least one golfer and the request to participate, the request to activate recording the video of the at least one golfer includes a user profile identifier of the at least one golfer;
   validating the at least one golfer using the user profile identifier and a location of the golf hole;
   activating recording of the video of the at least one golfer and the at least one of the performance-based competitions using at least one AI enabled camera in communication with the CNMS and processing frames of the video recording using image processing by the CNMS;
   detecting a specific object or objects in the video of the at least one golfer using an AI logic installed on the at least one AI enabled camera or at the CNMS;
   detecting movement at the golf hole and sending radar data to the CNMS using a radar unit installed at the golf hole;

determining a distance a golf ball associated with the at least one golfer is to the golf hole using at least one of the AI logic and the radar data and the image processing;

detecting an occurrence of a winning event in the at least one of the performance-based competitions using the distance the golf ball is to the golf hole; and automatically initiating payment to the at least one golfer associated with the winning event in response to detecting the occurrence of the winning event in the at least one of the performance-based competitions.

\* \* \* \* \*